US008578269B2

(12) United States Patent  (10) Patent No.: US 8,578,269 B2
Osaka et al.  (45) Date of Patent: Nov. 5, 2013

(54) INFORMATION PROCESSING APPARATUS FOR PERFORMING A LAYOUT PROCESSING OF SUB-TEMPLATES, INFORMATION PROCESSING METHOD AND COMPUTER-READABLE MEDIUM

(75) Inventors: Hitoshi Osaka, Yokohama (JP); Satoshi Ota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 13/245,470

(22) Filed: Sep. 26, 2011

(65) Prior Publication Data

US 2012/0036427 A1    Feb. 9, 2012

Related U.S. Application Data

(63) Continuation of application No. 11/358,884, filed on Feb. 21, 2006, now abandoned.

(30) Foreign Application Priority Data

Feb. 28, 2005  (JP) .................................. 2005-054534

(51) Int. Cl.
  *G06F 17/00*   (2006.01)
(52) U.S. Cl.
  USPC ........... 715/253; 715/243; 715/246; 358/1.18
(58) Field of Classification Search
  USPC .................................................. 715/243–53
  See application file for complete search history.

(56) References Cited

U.S. PATENT DOCUMENTS

| 5,379,373 | A  | * | 1/1995  | Hayashi et al. ................ 715/235 |
| 5,381,523 | A  | * | 1/1995  | Hayashi ........................ 715/204 |
| 5,845,303 | A  | * | 12/1998 | Templeman ................... 715/255 |
| 6,161,114 | A  | * | 12/2000 | King et al. .................... 715/202 |
| 6,446,100 | B1 | * | 9/2002  | Warmus et al. ................ 715/246 |
| 6,596,032 | B2 | * | 7/2003  | Nojima et al. ................. 715/247 |
| 6,990,237 | B2 | * | 1/2006  | Lui et al. ...................... 382/187 |
| 7,039,863 | B1 | * | 5/2006  | Caro et al. .................... 715/209 |
| 7,302,438 | B1 | * | 11/2007 | Gauthier et al. ................... 1/1 |
| 7,325,196 | B1 | * | 1/2008  | Covington et al. ........... 715/251 |
| 7,325,197 | B1 | * | 1/2008  | Massena et al. .............. 715/251 |
| 7,380,202 | B1 | * | 5/2008  | Lindhorst et al. ............. 715/204 |
| 7,383,499 | B2 | * | 6/2008  | Kraft et al. .................... 715/246 |
| 7,434,159 | B1 | * | 10/2008 | Lin ................................ 715/243 |
| 7,454,699 | B2 | * | 11/2008 | Altman et al. ................. 715/255 |
| 7,461,332 | B2 | * | 12/2008 | Brintzenhofe et al. ....... 715/205 |
| 7,532,355 | B2 | * | 5/2009  | Gauthier et al. ............. 358/1.18 |
| 7,554,689 | B2 | * | 6/2009  | Tonisson ..................... 358/1.18 |
| 7,656,543 | B2 | * | 2/2010  | Atkins ........................ 358/1.13 |
| 7,949,948 | B2 | * | 5/2011  | Schorr ......................... 715/243 |
| 7,984,374 | B2 | * | 7/2011  | Caro et al. .................... 715/255 |
| 8,381,099 | B2 | * | 2/2013  | Giannetti ...................... 715/253 |
| 2002/0149792 | A1 | * | 10/2002 | Gauthier et al. ............. 358/1.18 |
| 2003/0189727 | A1 | * | 10/2003 | Kloosterman et al. ....... 358/1.18 |

(Continued)

*Primary Examiner* — Laurie Ries
*Assistant Examiner* — Benjamin Smith
(74) *Attorney, Agent, or Firm* — Cowan, Liebowitz & Latman, P.C.

(57) ABSTRACT

An information processing apparatus performs a process of laying out sub-templates to a page to which a repeated page setting is not set. If all the sub-templates are not laid out in the page to which a repeated page setting is not set, the information processing apparatus repeatedly obtains pages to which the repeated page setting is set until all the sub-templates are laid out in the pages.

9 Claims, 51 Drawing Sheets

(56) References Cited

U.S. PATENT DOCUMENTS

| | | | |
|---|---|---|---|
| 2004/0194030 A1* | 9/2004 | Altman et al. | 715/530 |
| 2004/0205602 A1* | 10/2004 | Croeni | 715/517 |
| 2005/0015797 A1* | 1/2005 | Noblecourt et al. | 725/32 |
| 2005/0216832 A1* | 9/2005 | Giannetti | 715/513 |
| 2005/0223320 A1* | 10/2005 | Brintzenhofe et al. | 715/517 |
| 2006/0023238 A1* | 2/2006 | Blaszyk et al. | 358/1.13 |
| 2006/0107204 A1* | 5/2006 | Epstein | 715/517 |
| 2006/0150088 A1* | 7/2006 | Kraft et al. | 715/517 |
| 2006/0174186 A1* | 8/2006 | Caro et al. | 715/500 |
| 2006/0179405 A1* | 8/2006 | Chao et al. | 715/517 |
| 2007/0055690 A1* | 3/2007 | Giannetti | 707/102 |
| 2007/0055925 A1* | 3/2007 | Giannetti | 715/511 |
| 2008/0018935 A1* | 1/2008 | Gauthier et al. | 358/1.18 |
| 2011/0283186 A1* | 11/2011 | Caro et al. | 715/248 |
| 2012/0036427 A1* | 2/2012 | Osaka et al. | 715/243 |
| 2012/0066588 A1* | 3/2012 | Tokunaga | 715/244 |

* cited by examiner

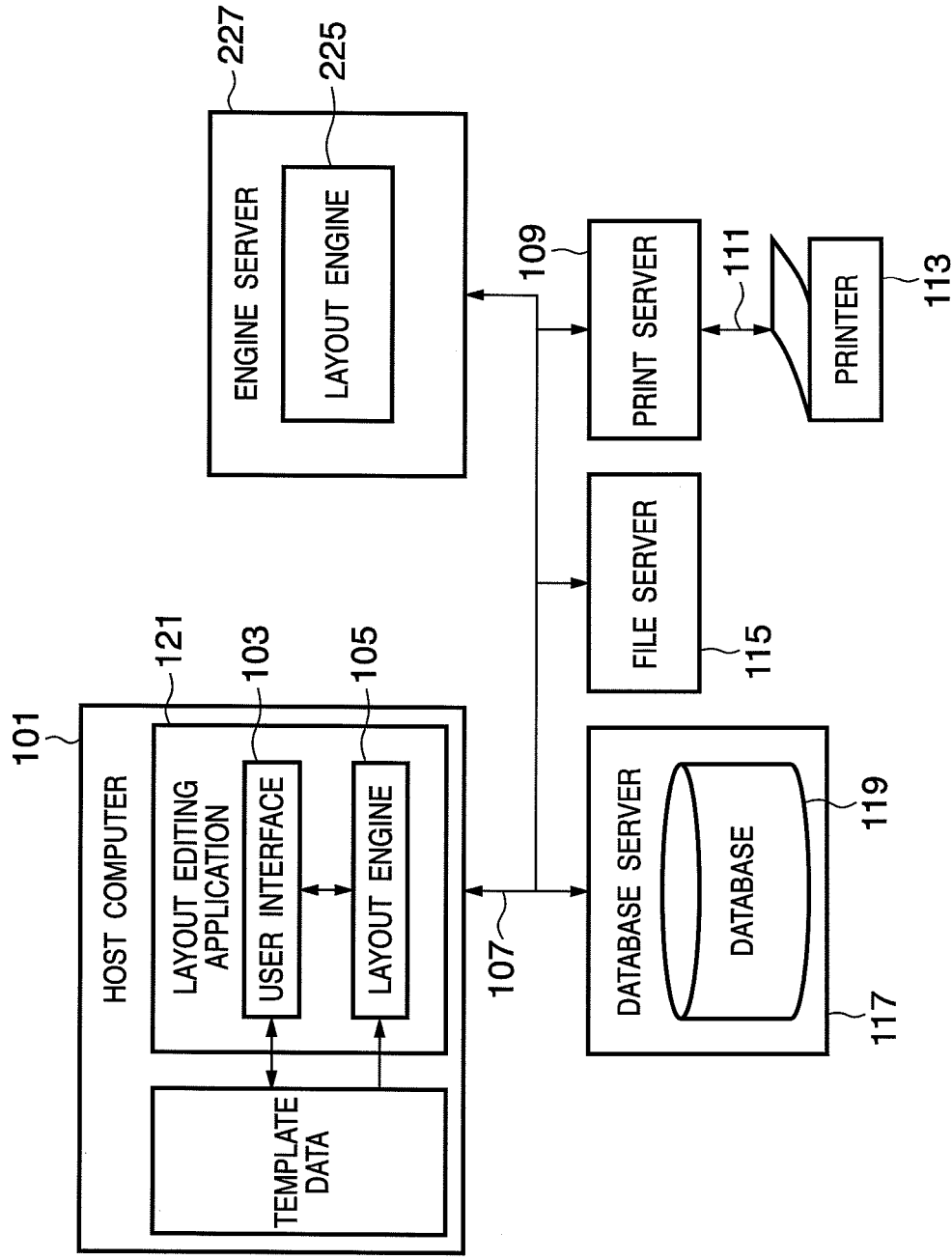

807

808

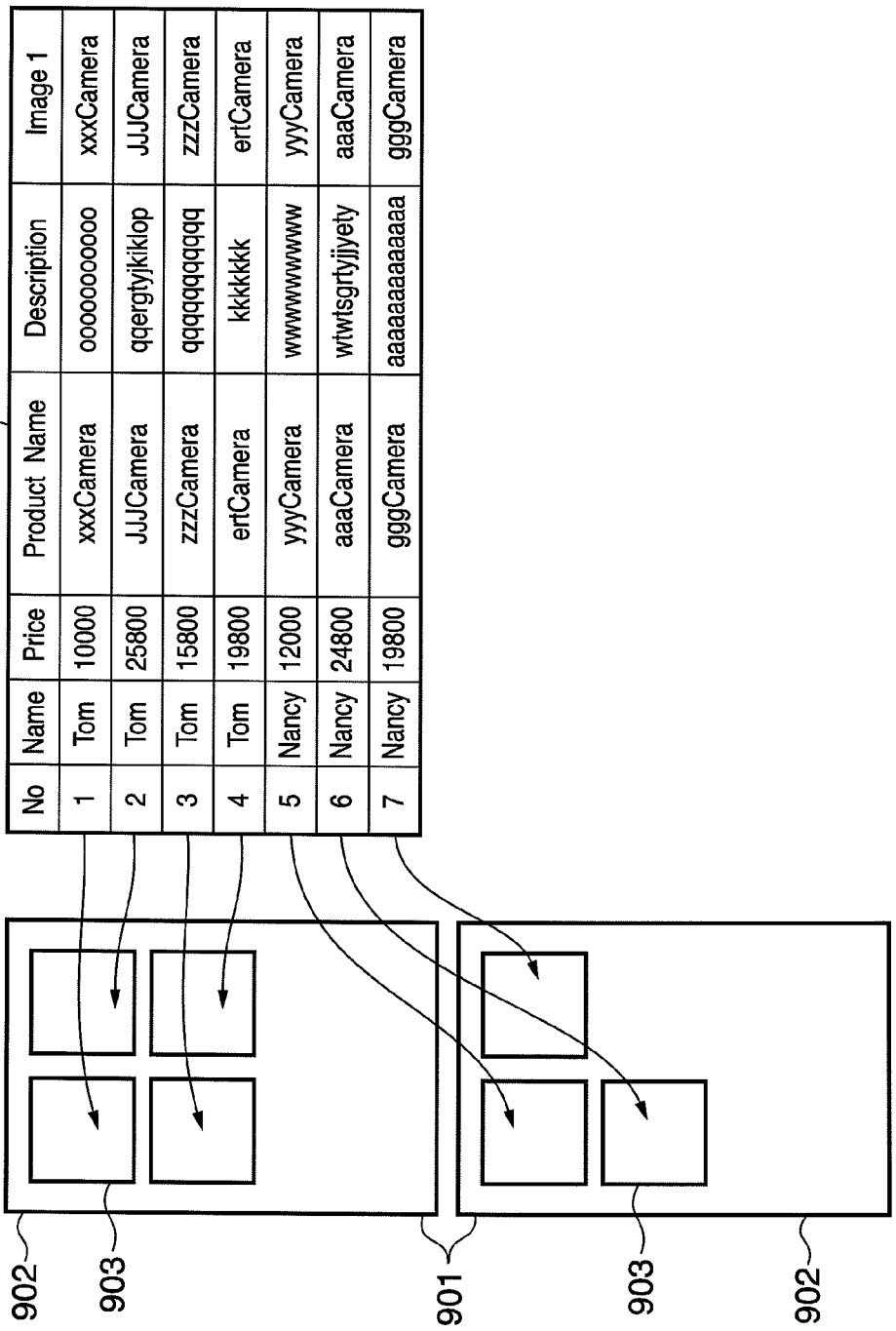

F I G. 20
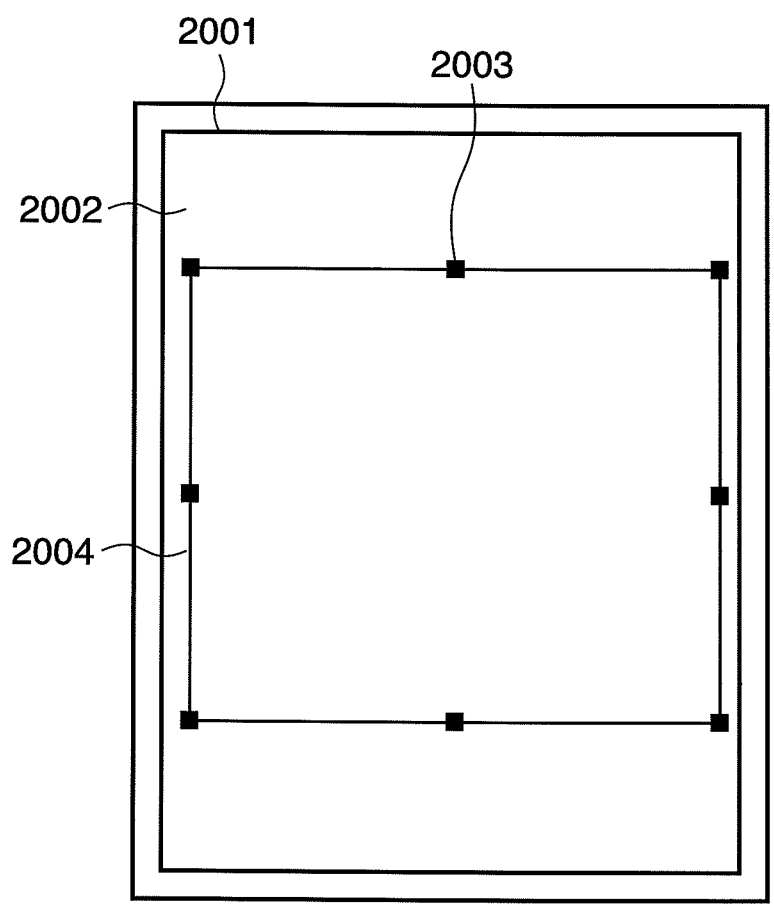

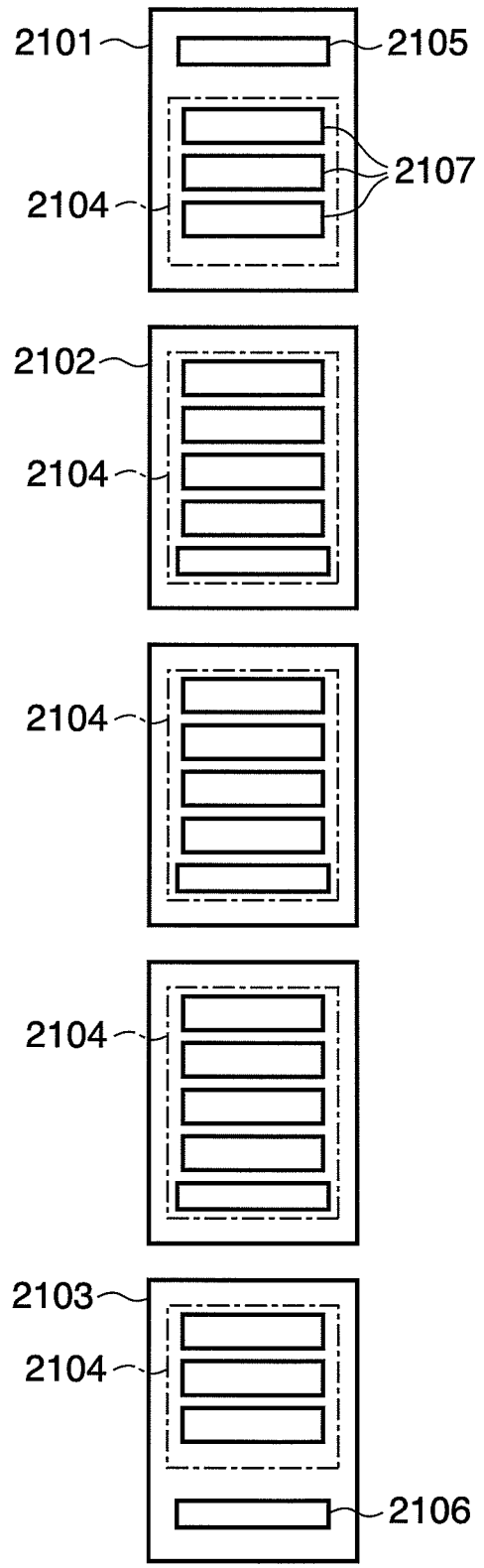

F I G. 30

```
< CONDITIONAL "Conditional 01" >
    < IF >
        < FIELD "Field 01" = "Value 01" AND >
        < FIELD "Field 02" ! = 1000 >
        < FIELD "Sub_Template 01" WITH PageBreak >
    < /IF >
    < ELSELF >
        < FIELD "Field 01" STARTWITH "AAAA" OR >
        < FIELD "Field 02" ENDWITH 1000 >
        < FIELD "Sub_Template 02" WITH PageBreak >
    < /ELSELF >
    < ELSE >
        < USE "Sub_Template 03" WITH PageBreak >
    < /ELSE >
< /CONDITIONAL >
```

INFORMATION PROCESSING APPARATUS FOR PERFORMING A LAYOUT PROCESSING OF SUB-TEMPLATES, INFORMATION PROCESSING METHOD AND COMPUTER-READABLE MEDIUM

CROSS-REFERENCE TO RELATED APPLICATION

This application is a continuation of application Ser. No. 11/358,884, filed Feb. 21, 2006, the entire disclosure of which is hereby incorporated by reference.

FIELD OF THE INVENTION

The present invention relates to a document processing apparatus and a document processing method using an automatic layout function to complete a document by laying out at predetermined positions fields of a record registered in a database for example.

BACKGROUND OF THE INVENTION

In recent years, attention has been given to needs for customer relationship management (CRM) and one-to-one marketing because of shortening of the life cycle of commodities due to the increase in varieties of commodities, consumer's orientation toward customer services as a result of widespread use of the Internet, and other factors. These methods are aimed at increasing the degree of customer's satisfaction and obtaining and retaining customers.

Customer relationship management is a method of improving the degree of customer's satisfaction and, hence, the profitability of a company by adopting measures according to individual needs on the basis of a customer database. One-to-one marketing is a kind of database marketing, i.e., a marketing technique to organize personal attribute information such as customer's ages, sexes, interests, tastes and purchase histories into a database, analyze the information contents and make proposals according to customer's needs. A typical example of application of this technique is variable printing. With the recent development of desktop publishing (DTP) techniques and spreading the use of digital printing apparatuses, variable printing systems capable of customizing documents on a customer-by-customer basis and outputting the customized documents have been developed and a demand has arisen for preparation of documents in which different amounts of contents for different customers are laid out in an optimized fashion.

Conventionally, in variable printing systems, layout frames (also referred to as "container") are formed on a document and a record or a field in a database satisfying a certain condition is associated with each container as a content of the container. An association is established between a layout and a database in this manner to realize variable printing.

In the conventional variable printing systems, however, the sizes of text and image containers are fixed and, therefore, an overlap of texts or clipping of an image occurs when data from a database is inserted in a container, if the amount of data is larger than the size of the container. Also, a space is left if the amount of data is smaller than the size of the container.

Japanese Patent Laid-Open No. 7-129658 discloses, as a technique for solving those problems, a technique of reducing the size of a region adjacent to a certain character region is reduced when the size of the character region is increased. In this document is described a method of increasing the size of a character region and reducing the size of a region adjacent to the character region as characters are input to the character region.

As described above, conventional automatic layout techniques capable of dynamically changing the size of a layout frame (container) according to the amount of input text exist.

Japanese Patent Laid-Open No. 2000-48216 (sections 0025 to 0055, FIGS. 2 and 11) discloses a technique of laying out a plurality of items of merchandise information (merchandise records) in a layout region in a page.

According to this technique, master components (corresponding to the sub-template in the present invention) in which layouts (of names of commodities, images, prices, etc.,) are set in advance are prepared and a setting is made as to which master component should be used with respect to merchandise information items. Data (names of commodities, images, prices, etc.,) included in merchandise information is successively laid out in a layout area designated in a page by being laid out in a predetermined area in the set master component. In this specification, the function of laying out information in one record in conformity with a sub-template and successively laying out a plurality of sub-templates in a flow area is referred to as a multi-record function, and this operation is expressed as "arranging sub-templates in a flow area".

The description of the technique disclosed in Japanese Patent Laid-Open No. 7-129658 includes a description of enlargement of a character area with input of text. However, when the size of a character area is increased, an adjacent area is reduced in order to maintain the spacing between these areas. Therefore, there is a problem that as the amount of text to be input is increased, the adjacent area is made smaller and smaller.

Japanese Patent Laid-Open No. 7-129658 discloses no idea about a variable printing system such as that described above in which contents data is arranged while associating a database and layout areas with each other to prepare documents customized on a customer-by-customer basis.

The technique disclosed in Japanese Patent Laid-Open No. 2000-48216 requires setting in advance which master component should be used with respect to each record. If, for example, the number of records is significantly large, the number of operations for such setting becomes considerably large as the number of record is increased, resulting in a reduction in user operability.

It is thought that some users want to use the same master component for records having data attributes similar to each other. For example, in a case where a document is prepared by using records 1 to 10, and where the same price data is set with respect to records 2 and 5, it is possible that a user wants to prepare a document by using the same master component with respect records 2 and 5 having common attributes in the records.

In such a case, the technique disclosed in Japanese Patent Laid-Open No. 2000-48216 requires setting in advance which master component should be used with respect to each record. It is necessary for a user to keep in memory a master component used for record 2 and to select the master component relying on his/her memory at the time of setting of the master component for record 5. At the time of preparation of an ordinary pamphlet or a catalog, however, the number of records is supposed to be enormously large and an increased number of master components are used. In such a situation, the procedure in which a user selects master components depending only on his/her memory cannot be said to be most suitable.

The technique disclosed in Japanese Patent Laid-Open No. 2000-48216 is unsatisfactory in terms of reliability with which records are contained in a designated layout area, depending on the number of records to be laid out in a layout area. According to this technique, when only a layout area for one page is set, a record can be laid out by being moved to the next candidate layout position. In Japanese Patent Laid-Open No. 2000-48216, however, no description is given of processing in a situation where moving to the next candidate layout position cannot be performed. As a result of this, a problem occurs that failure to lay out data cannot be avoided.

As an ordinary processing to be performed in a situation where all records cannot be laid out, a method of scaling down data to be laid out is conceivable. However, if the size of data to be laid out is changed, there is a possibility of failure to obtain the layout size according to a user demand.

In a case where a user prepares a pamphlet, a catalog and the like favorable to user's customers, techniques limited to the conventional art are not effective in preparing documents satisfying various customer's tastes while providing improved user operability.

Also, in the conventional multi-record printing (the function of printing a document by laying out a plurality of records in one document), only simple one-hierarchical-level division, i.e., dividing a document only when a particular item in a record is changed, can be performed. For example, when the contents of a "customer's name" item is changed, a document is divided with respect to the contents of the "customer's name" item, i.e., on a customer-by-customer basis. Also, when the contents of a "commodity name" item is changed, a document is divided with respect to the contents of the "commodity name" item, i.e., on a commodity-by-commodity basis. In such multi-record printing, a document division (also called a break) cannot be inserted at the desired position, for example, in a case where there is a need to insert page breaks on a commodity-by-commodity basis. That is, it is difficult to prepare an orderly document or a document with desired divisions.

SUMMARY OF THE INVENTION

In view of the above-described problems, an object of the present invention is to provide a document processing method and apparatus having, for the purpose of obtaining various output results according to customer's tastes while maintaining suitable user operability, an automatic layout function of setting a conditional expression with respect to an area on a template, laying out on a plurality of types of sub-templates record data extracted on the basis of the conditional expression, and laying out the sub-templates in a predetermined area.

Another object of the present invention is to provide a document processing method and apparatus having, for the purpose of obtaining output results according to a user demand without reducing the size of data to be laid out, an automatic layout function of automatically generating a page having an area in a case where extracted records cannot be laid out within an area of the same kind.

Still another object of the present invention is to provide a document processing method and apparatus having a multi-record-compatible automatic layout function such as to be capable of improving the degree of freedom of insertion of a document break and thereby realizing an orderly layout or a layout in which a user's will is reflected.

To achieve the above-described objects, according to the present invention, there is provided a document processing apparatus capable of dynamically changing, according to contents data to be laid out, a layout on a template having an area where an extraction condition for extraction of the contents data from a database is set, the apparatus having an obtaining unit which obtains contents data satisfying the extraction condition from the database, a determination unit which determines one or more of a plurality of sub-templates on which groups of contents data obtained by the obtaining unit should be laid out, from association information on association between the groups of contents data and the plurality of sub-templates for layout of the contents data, and a layout unit which lays out the groups of contents data in the area by laying out the groups of contents data on the one or more sub-templates determined by the determination unit, thereby producing output results.

In the above-described arrangement, the database corresponds to a database 119 shown in FIG. 2, and the obtaining unit, the determination unit and the layout unit correspond to a layout editing application 121. In particular, the obtaining unit corresponds to step 1601 in FIG. 16A executed by the layout editing application 121. Also, the determination unit corresponds to step 1602 in FIG. 16A and a procedure in FIG. 16B executed by the layout editing application 121. The layout unit corresponds to steps 1605 to 1607 in FIG. 16A executed by the layout editing application 121.

According to the present invention, there is also provided a document processing apparatus capable of dynamically changing, according to contents data to be laid out, a layout on a template having an area where an extraction condition for extraction of the contents data from a database is set, the apparatus having an obtaining unit which obtains contents data satisfying the extraction condition from the database, and a generation unit which newly generates a page having the area in a case where the contents data obtained by the obtaining unit cannot be laid out in the area.

In the above-described arrangement, the database corresponds to the database 119 shown in FIG. 2, and the obtaining unit and the generation unit correspond to the layout editing application 121. In particular, the obtaining unit corresponds to step 1601 in FIG. 16A executed by the layout editing application 121. Also, the generation unit corresponds to step 2215 in FIG. 22B executed by the layout editing application 121. In step 2215 in FIG. 22B, a page is discarded. This seems to be incompatible with generation means. The page discarded in step 2215, however, is a page having a completed layout. Contents on this page are discarded to secure a blank page, on which a new page is generated.

According to the present invention, there is also provided a document processing apparatus capable of dynamically changing, according to contents data to be laid out, a layout on a template having an area where an extraction condition for extraction of the contents data from a database and a division method are set, the apparatus having an obtaining unit which obtains contents data satisfying the extraction condition from the database, a setting unit which sets one of the division methods, and a layout unit which lays out the contents data obtained by the obtaining unit, by dividing a document by one of the division methods set by the setting unit, when the contents data is laid out in the area, thereby generating document data.

In the above-described arrangement, the database corresponds to the database 119 shown in FIG. 2, and the obtaining unit, the determination unit and the layout unit correspond to the layout editing application 121. In particular, the obtaining unit corresponds to step 2701 in FIG. 27A executed by the layout editing application 121. Also, the setting unit corresponds to a UI in FIG. 26 executed by a UI module of the layout editing application 121. The layout unit corresponds to steps 2706 to 2714 in FIG. 27A executed by the layout editing application 121.

According to the present invention, a conditional expression is set with respect to an area on a template, record data extracted on the basis of the conditional expression is laid out on a plurality of types of sub-templates, and the sub-templates are laid-out in a predetermined area, thereby making it possible to prepare various output results according to customer's tastes while maintaining suitable user operability.

According to the present invention, in a case where extracted records cannot be laid out within an area, a page having a corresponding area is automatically generated, thereby making it possible to prepare a laid-out document according to a user demand without reducing the size of data to be laid out.

Also, the degree of freedom of insertion of a document break is improved to realize an orderly layout or a layout in which a user's will is reflected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram schematically showing a computer modules according to an embodiment of the present invention;

FIG. 9 is a diagram showing the outline of multi-record according to an embodiment of the present invention;

FIG. 20 is a diagram showing an example of a UI for changing the position and size of a flow area;

FIG. 21B is a diagram schematically showing a repeated flow area and a state where data is inserted in the flow area;

FIG. 30 is a diagram showing a format of a conditional expression capable of external reference in a fourth embodiment of the present invention;

DETAILED DESCRIPTION OF THE PREFERRED EMBODIMENTS

[First Embodiment]
<Outline of Embodiment>

A preferred embodiment of the present invention in which the present invention is suitably implemented will be described. The present invention will first be outlined. This embodiment relates to a piece of computer software for implementing by means of a computer a function to form a document in which records in a database or the like are laid out in conformity with a container (a partial region in which data is arranged, and which is also called a field region) defined in a document template (referred to simply as a template), namely, a function called variable printing. A computer in which this piece of software is executably loaded functions as an automatic layout system (or a document processing apparatus). In this embodiment, in particular, is disclosed a piece of software having the function (multi-record function) of completing a document by forming a portion of a document in conformity with a template and inserting the portion of the document in a region separately defined in the template (called a flow area) as well as the function of laying out data in conformity with the template. The number of insertable document portions with respect to one flow area is not limited to one. A technique to distribute a portion of a formed document on a flow area-by-flow area basis under a certain condition in a case where a plurality of flow areas are defined in a template is also disclosed. A template laid out in a flow area is specially referred to as a sub-template. Also, a template including a flow area is specially referred to as a master template.

The automatic layout system in this embodiment has two functional features. The first one is the function of automatically generating a document having a plurality of pages by laying out a record on a new page if a page cannot contain the entire record, for example, in a case where the number of records is significantly large. The second one is the function of laying out each of records by using a form (sub-template) matching with the record to increase the degree of freedom of document layout. Description will now be made of the configuration of a computer system and an application configuration in this embodiment to which the present invention can be applied.

<System Configuration>

Figure 1A:
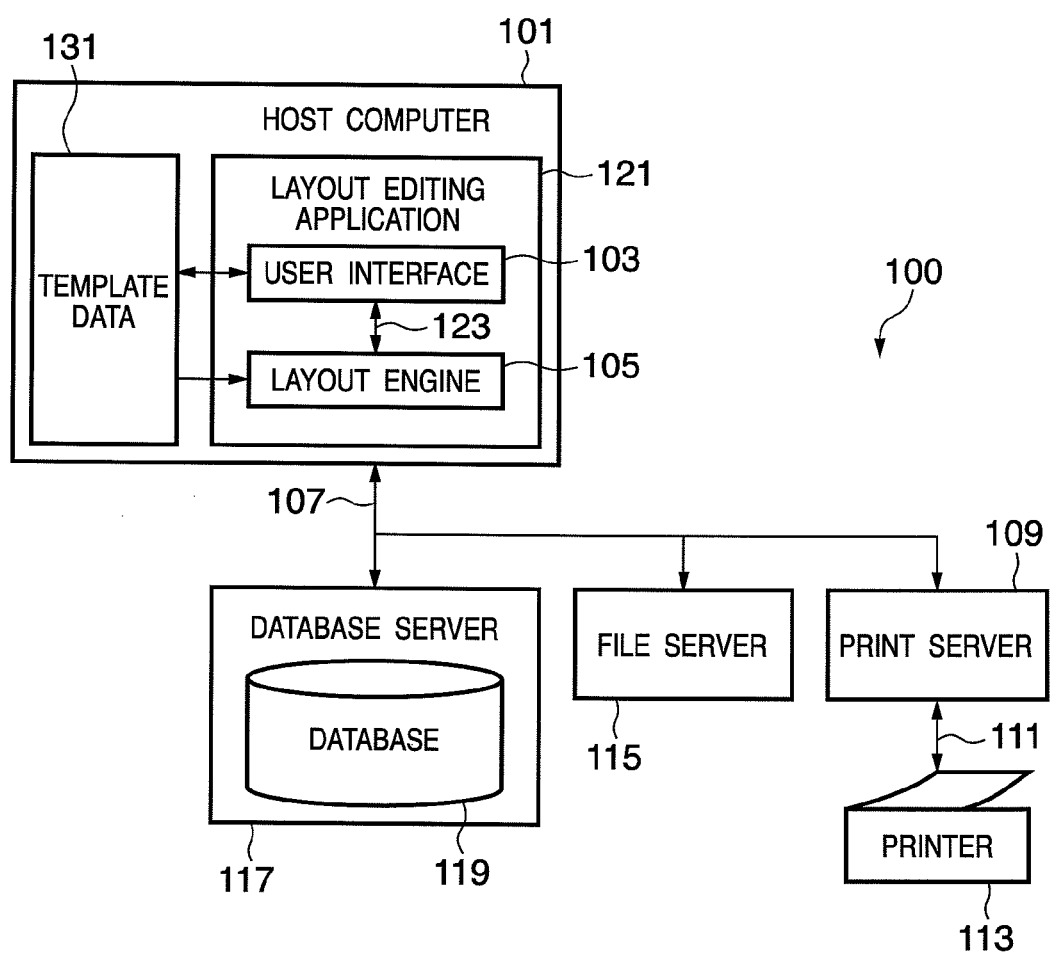
FIG. 1A is a diagram showing the configuration of a computer system according to an embodiment of the present invention.

FIG. 1A shows a system 100 for printing variable data document. A method described in this specification is carried out by executing a predetermined program in a general-purpose computer module 101 described below in detail with reference to FIG. 1B. A process shown in FIG. 1A is executed in the computer module 101 as the whole or part of a piece of software such as a layout editing application program 121 executable on the system 100. In particular, layout editing and printing steps are performed according to instructions from a piece of software executed by the computer 101, which is a document processing apparatus in accordance with the present invention. The piece of software is stored, for example, in a computer-readable medium comprising a storage described below. The piece of software is loaded from the computer-readable medium into the computer to be executed by the computer 101. The computer-readable medium having such a piece of software or a computer program recorded thereon is a computer program product. The computer uses the computer program product to function as an apparatus capable of performing document layout editing and variable data printing.

Input devices such as a pointing device like a keyboard 132 and a mouse 133 are connected to the computer module 101. Output devices including a display 144 and, if necessary according to circumstances, a local printer 145 are also connected to the computer module 101. An input/output interface 138 is capable of connecting the computer module 101 to another computer unit in the system 100 through a network connection 107. A typical example of the network connection 107 is a local area network (LAN) or a wide area network (WAN).

The computer module 101 ordinarily includes at least one processor unit 135, a memory unit 136 constituted by a semiconductor random access memory (RAM) and a semiconductor read-only memory (ROM) for example, an input/output (I/O) interface comprising a video interface 137, and an I/O interface 143 for interfacing to the keyboard 132 and the mouse 133.

A storage device 139 ordinarily includes a hard disk drive 140 and a flexible disk drive 141. A magnetic tape drive, not shown in FIG. 1B, may also be used. A CD-ROM drive 142 is provided as a nonvolatile data source. The computer module 101 uses the components (indicated by reference numerals 135 to 143) included in the computer module 101 and communicating with each other via a mutual connection bus 134 under the control of an operating system such as GNU/LINUX (trademark) or Windows (trademark) from Microsoft Corporation or by a method using a conventional operation mode for computer systems.

Figure 1B:
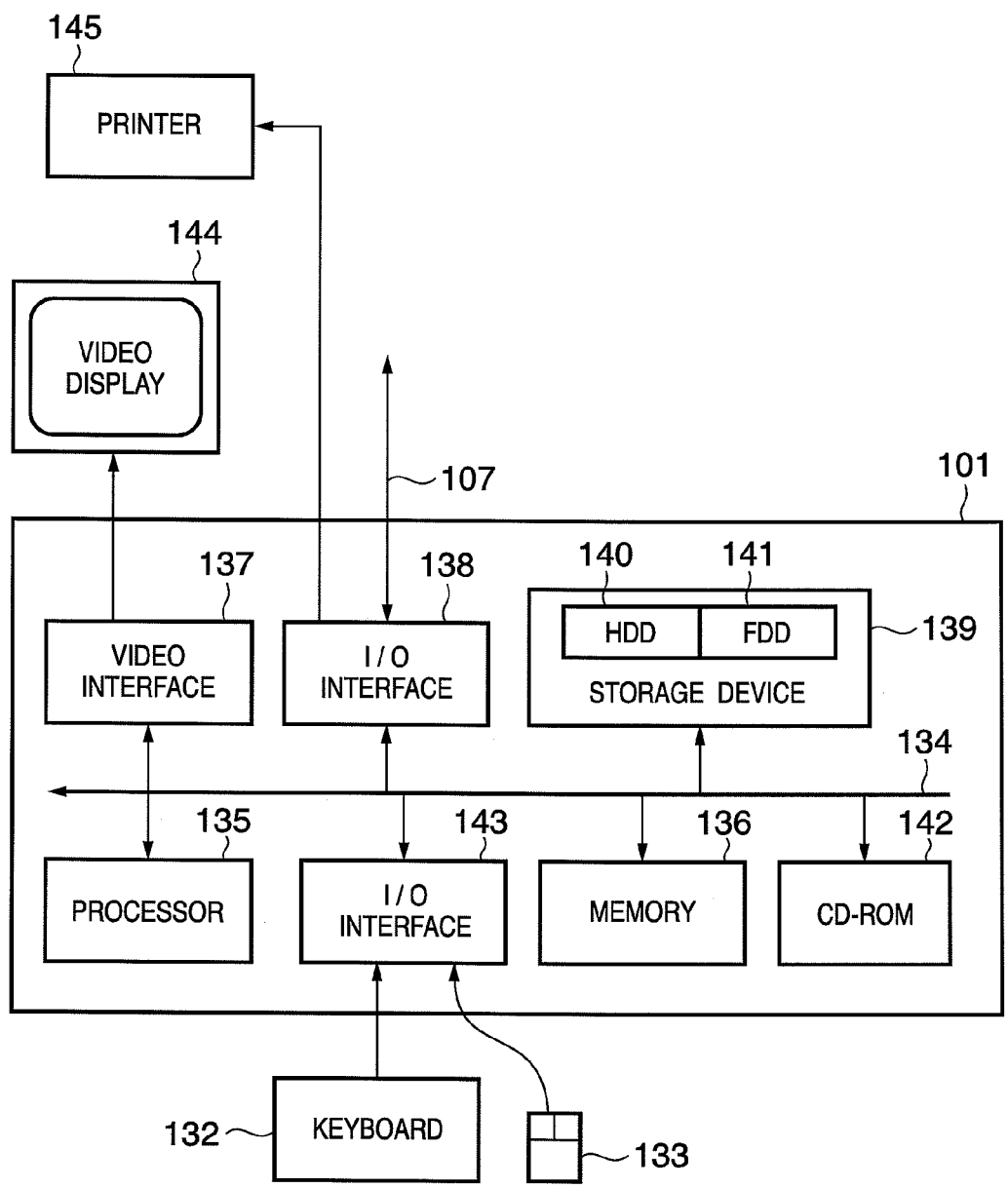
FIG. 1B is a diagram showing the configuration of a computer system according to an embodiment of the present invention.

The layout editing application program 121 shown in FIG. 1A is ordinarily resident in the hard disk drive 140 shown in FIG. 1B and is executed, read and controlled by the processor 135. In some instances, the layout editing application program 121 is encoded on a CD-ROM or a flexible disk and is read through the compatible flexible disk drive 142 or the CD-ROM drive 141 to be provided to a user. The application program 121 may alternatively be read by the user through the network connection 107 according to another method. Further, a piece of software may be loaded into the computer module 101 from a different computer readable medium of a suitable size comprising a magnetic tape, a ROM, an integrated circuit, a magneto-optical disk, wireless communication, infrared communication between the computer module 101 and another device, a computer readable card such as a PCMCIA card, E-mail communication, an Internet medium having recording information on a Web site, or an intranet medium. The above-described mediums are an only an example of an associated computer readable medium. Some other computer readable medium may be used.

The layout editing application 121 has an instruction to perform variable data printing (VDP) and includes two software components. The first one of the software components is a layout engine 105. This is a software component for computing the positions of a rectangle and lines constituting a container according to a restriction and a size given with respect to a rectangular container. The layout engine 105 is also capable of computing, for example, the positions of objects other than containers. The layout engine 105 functions as an application for determining the size and position of each of partial regions (e.g., containers) to output drawing information to a printer driver not shown in the drawings, thereby enabling the printer driver to perform image drawing processing on a variable data document and generate printing data.

The second component is a user interface 103, which enables a user to prepare a document template and provides a mechanism for association with a data source in the document template. A document template is data forming a model for a document on which a sentence in standard form and the above-described container on a document are laid out. Data such as a texts and images taken from a database is arranged in a predetermined region of a document template, e.g., a container to complete a document.

The user interface 103 and the layout engine 105 communicate with each other over a communication channel 123. A data source for document generation is ordinarily an ordinary database 119 on a database server 117 constituted by a different computer operating a database application. The host computer 101 communicates with the database server 117 through the network connection 107. The variable data printing application 121 generates a document template to be stored in the host computer 101 or in a file server 115 constituted by a different computer. The variable data printing application 121 also generates a document constituted by data and a merged document template. Documents generated by the variable data printing application 121 are stored in a local file system for the host computer 101, stored in the file server 115 or directly printed by a printer 113. The printing server 109 is a computer which provides a network function in a printer not directly connected to the network. The printing server 109 and the printer 113 are connected to each other via an ordinary communication channel 111.

Template data 131 is also called a document template, i.e., model data for a document in which a region called a container, where a record read out from a database or the like is embedded, fixed data, and so on are defined. The construction of this data will be described below with reference to FIGS. 23 and 24.

Figure 34:
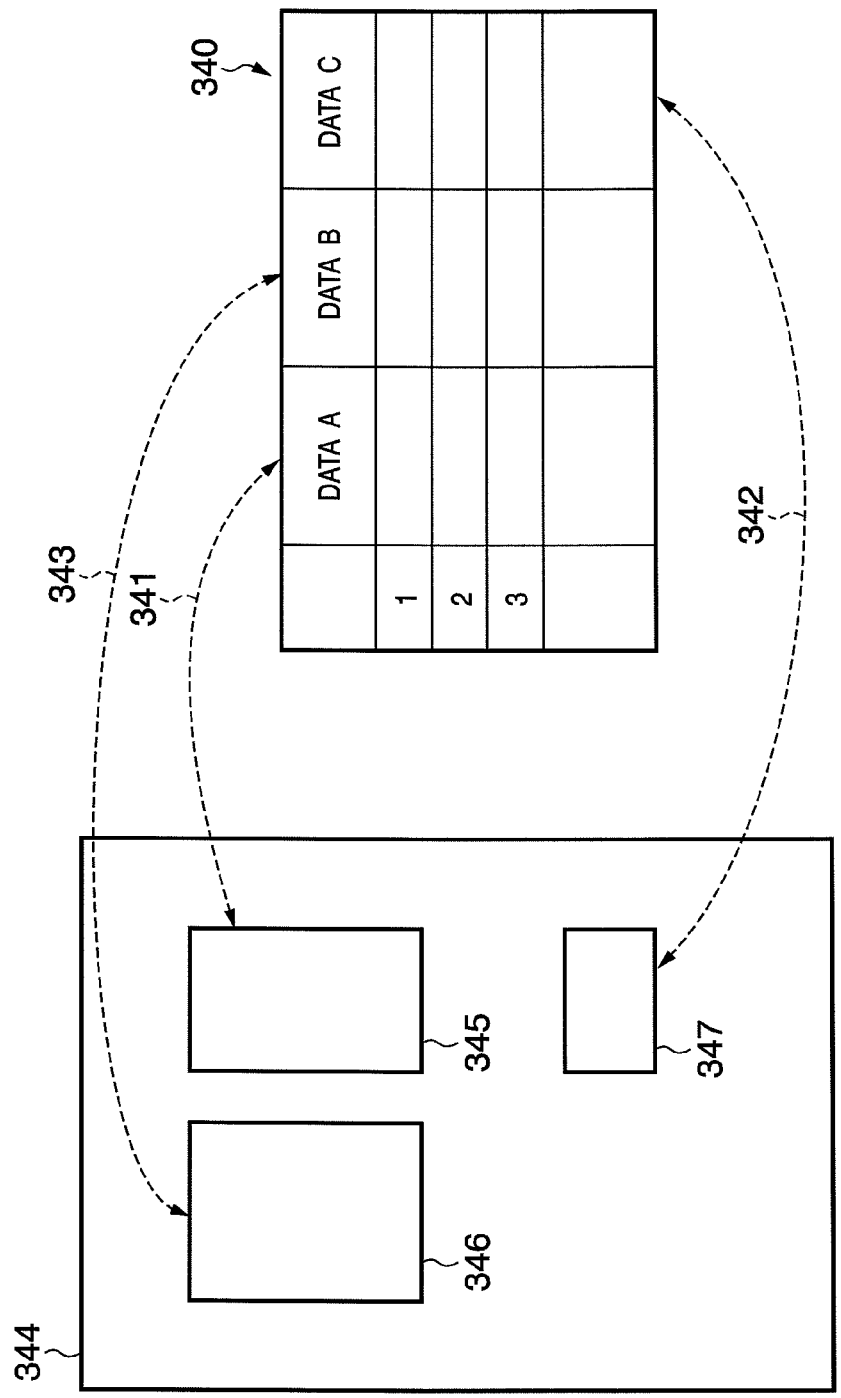
FIG. 34 is a diagram showing an example of variable printing.

FIG. 34 is a diagram for outlining variable data printing according to this embodiment. The user interface (module) 103 of the layout editing application 121 lays out a plurality of containers 345 to 347 on a page according to an operation instruction from a user and imposes restriction conditions with respect to the position and size of each container, thereby generating a document template 344.

The user interface 103 establishes association between the document template 344 and a data source 340 and further establishes associations between the containers and data fields in the data source 340. Information on the associations between the containers and data fields in the data source 340 is described in the document template, and the document template is stored in the HDD 140 or the memory unit 136.

The data source 340 is a file on which article data (variable data) is described on a record-by-record basis. The data source 340 is stored in the HDD 140. The layout engine 105 reads associated variable data from the data source 340 according to a printing instruction or a preview instruction from a user, arranges the data on a record-by-record basis in the containers 345 to 347 of the document template (for example, arranges data fields A to C of a data record 1 in containers 345 to 347), and adjusts, for example, the size of each container according to the size of data to be arranged (layout adjustment). A method of layout adjustment will be described below.

When a preview instruction is provided, a layout-adjusted document image is generated and output to be displayed as a preview on the screen of the video display 144. When a printing instruction is provided, a document image generated by using the layout engine 105 or the printer driver is output as printing data to the printing server 109. Data records 1, 2, 3, . . . are successively processed to realize variable data printing.

A data source (340) for document generation may be, for example, the ordinary database 119 on the database server 117 constituted by a different computer operating a database application. In such a case, the host computer 101 can obtain the data source by communicating with the database server 117 through the network 107. A document template (344) for variable data printing generated by the layout editing application 121 is stored in the host computer 101 or the file server 115 constituted by a different computer. As described above with reference to FIG. 1A, the layout engine 105 of the layout editing application 121 generates a variable data document constituted by data and a merged document template. Documents generated by the variable data printing application 121 are stored in a local file system for the host computer 101, stored in the file server 115 or transmitted to the printer 113 to be printed. The printing server 109 is a computer which provides a network function in a printer not directly connected to the network. The printing server 109 and the printer 113 are connected to each other via an ordinary communication channel 111.

FIG. 2 shows a configuration for enabling an engine server 227 to execute a layout engine 225 independently provided on the configuration shown in FIG. 1A. The engine server 227 is an ordinary computer. A document template stored in the file server 115 can be coupled by the layout engine 225 to data stored in the database 119 to generate a document to be printed or used for some other purpose. Such an operation is requested through the user interface 103, or a request is made to print only a particular record.

<Application Configuration Diagram>
(Main Window)

Figure 3:
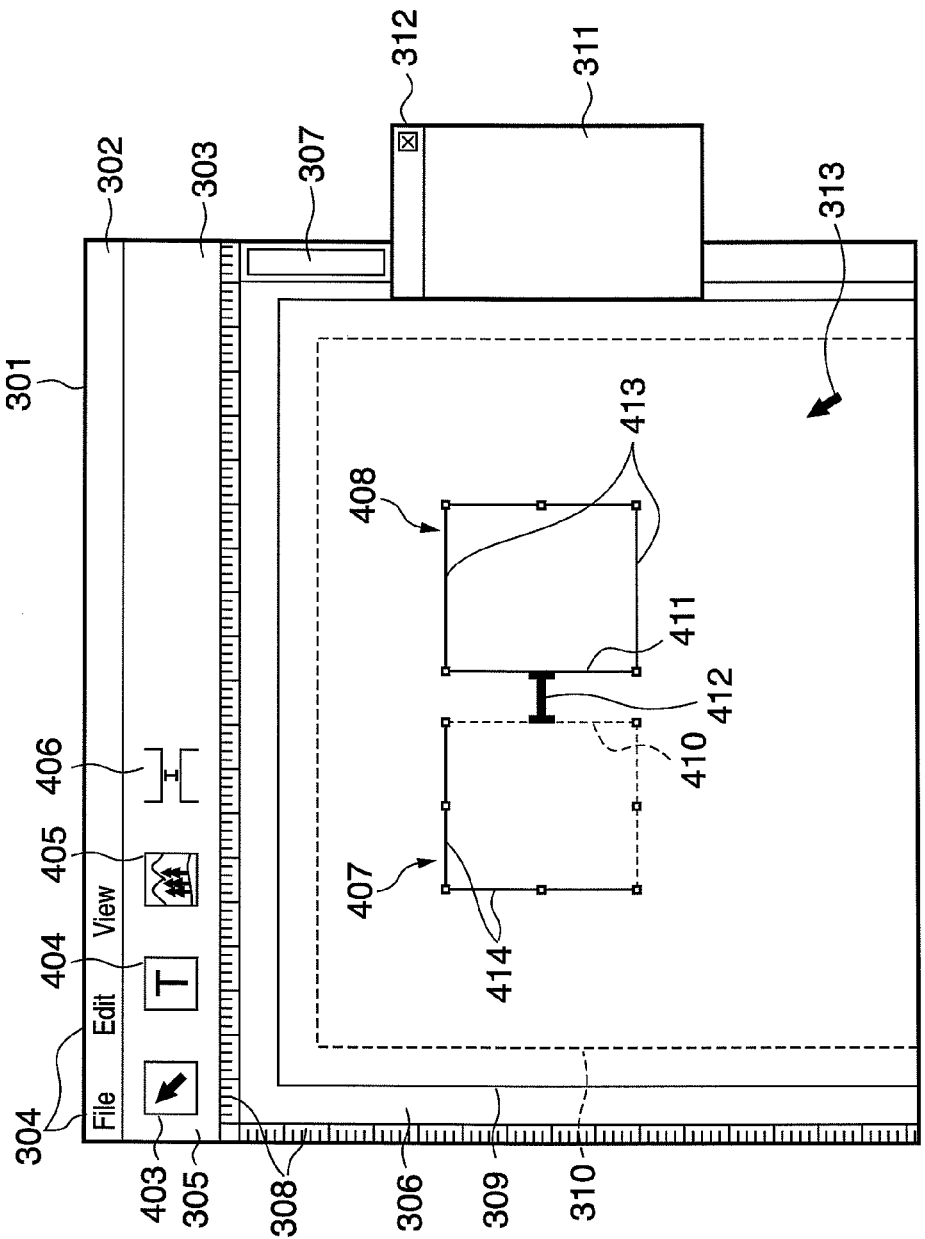
FIG. 3 is a diagram showing a main window of a typical application having a menu bar, a tool bar, a work area, and a floating palette and an example of typical containers having an inter-container link.

Referring to FIG. 3, the user interface 103 comprises a user interface formed by an application window 301 displayed on the video display 144 when operated. The window 301 is characterized by a menu bar 302, a tool bar 303, a work area 306 the position of which can be moved according to the position and operation of the mouse 133, an optional pallet 311, and a cursor/pointer device 313.

The menu bar 302 is a well-known art. The menu bar 302 has a number of menu items 304 spread out under the hierarchical level of menu options.

The tool bar 303 has a widget 305 such as a number of tool buttons each of which can be displayed or display-inhibited according to a special mode of the application. An optional ruler 308 can be used to indicate the position of a pointer, a page, lines, a margin guide, a layout frame (i.e. a container) or an object in the work area. The pallet 311 is used to access an additional function such as a library for reading and displaying variable data. The pallet 311 has a window control 312 for moving, resizing and closing.

The tool bar area 303 has at least the following user-selectable "buttons".

(1) Selecting tool button 403 used to select an edge of a container, to make a movement, to make a size change, or to perform resizing, locking or lock release. A plurality of containers can be selected by dragging a selection box around the containers or by continuing pressing the CTRL key while selecting the containers.
(2) Image container tool button 404 used to make a container having a static (fixed) or variable image.
(3) Text container tool button 405 used to make a container having a static (fixed) or variable text.
(4) Link tool button 406 used to establish a link for association between containers and to control the distance through which containers are linked.

Each of these buttons is implemented as a tool chip for an icon which changes according to an operating condition, as in a well-known art.

The application window 301 of the layout editing application 121 shown in FIG. 3 is capable of determining a basic layout by laying out containers and links in a page. A basic layout is a layout on which variable data printing is based. If each of containers in a basic layout is a fixed container, results of printing of all records are identical in layout to each other. If each of containers in a basic layout is a variable container described below, the size and position of the container changes within a range according to a restriction described below, depending on the amount or size of data read on a record-by-record basis. Thus, a document template made by the layout editing application 121 is only for determining a basic layout. If a variable container is contained, the layout of a final print is adjusted according to read data.

(Document Template)

The Work area 306 is used to display and edit a document template design. By using the work area 306, a user can design the outline of a document printed in a preparatory step and can understand how the merged document changes on the basis of the amount or size of variable data.

If an external data source (e.g., a record in a database or the like) is linked to a template, a variable text and an image are displayed in a container to enable the present document to be previewed.

An object which can be a visual clue to depiction of the structure of a document and a container for variable data is displayed always when the cursor is moved onto the container or when the container is selected.

The work area 306 is characterized by a scroll bar 307, an optional ruler 308 and a document template 309. The document plate 309 may show that there are several pages.

A page size of a given document template is designated by a user using a well-known technique. For example, when "page setting" is selected from a menu "file", a dialog for setting the page size is displayed. A page size designated by a user is reflected in the dialog. There is a possibility of the actual number of pages in each document being changed by variable data. If containers cannot be set within one page, and if the basic layout includes no restriction to set containers within a page of a predetermined sheet size, an additional page is automatically formed. A boundary line in each page is a freely-selected page margin 310 indicating the maximum width of a printable object on the page.

FIG. 3 also shows an example of objects which can be displayed on the one-page document template 309. They have a plurality of containers 407 and 408, an unfixed edge 410, a link 412 and a slider 413. The function of each object will be described below.

(Container)

A container is a space depicted by arranging fixed or variable text or image in a document template and laid out while interacting with other containers or objects. A container is indicated in the user interface shown in FIG. 3, moved, size-adjusted and remade by using the pointer 313. The pointing device 133 is operated to use the pointer 313.

To be precise, a container has a group of settings, a visual expression, and interaction and editing operations. The definition of a container will be described.

(1) Fixed or variable contents are arranged in a container. Variable contents are obtained from a data source (e.g., a record in a database). Variable contents are dynamic in a sense that the container size is changed for the contents among different documents according to different groups of data. Variable contents include no contents formed by animation or contents formed by a different method so as to be variable with respect to time, because such contents are not suitable for printing. Fixed contents are displayed in the same fashion in all documents formed by using one template. In a case where a link is set between fixed contents and variable contents, however, there is a possibility of the position of the container containing the fixed contents being changed among documents according to a change in position or size of the container containing the variable contents.
(2) A container has an ornamentation function such as a function of making a text setting, e.g., a background color applied to the contents, a border setting or a font style setting. Such a setting is called a container attribute. Container attributes can be set on a container-by-container basis. However, a setting can also be made such that some containers have the same container attribute.
(3) A container is merged with data from a data source when a document is generated. Variable contents are obtained as particular data from a data source, and displayed or printed. Contents contained in a container are, for example, printed, displayed on the screen 144 or output both by printing and by display.
(4) A container has a user interface. For example, a container has an interactive graphical user interface (GUI) for editing of the container and for display setting. Elements of the user interface are ordinarily displayed on the screen 144. The user interface 103 displays several ones of the functions of setting ornamental elements such as a background color and a font, and also has the function of editing a container setting and the function of displaying containers. An example of a target of the user interface functions is a border, a corner icon for changing and displaying the size and position of a container in a dialogic manner, or the number of overcasts, lines, an icon and text for indicating the operation of a container when data from a data source is merged with the container. Such elements, however, are not printed on a document.

(Restrictions of Container)

A container has restrictions to perform control as to how contents to be displayed or printed on each document are contained in the container (that is, the container is definable). These restrictions are chief means of connecting fixed and variable contents to a container and enabling a user to control a number of documents by one document template. An example of restriction is "the height of these contents in the container is 4 inches at the maximum". Another example of restriction is "the left edge of contents in the container must be displayed at the same horizontal position in documents". The contents of the description made herein are various methods for displaying and editing such restrictions by using a GUI.

A contents placeholder which designates a layout of fixed contents so that an image has a defined place on a page is well known in the digital printing art. In the following description, containers have positions and sizes and can be edited and displayed by methods known in well-known art. Description will be made below by focusing on display and editing in variable data printing.

A user can designate the size and position of contents in a document by designating the position, size and restrictions of containers. Since a plurality of documents are generated from one document template, there is a need to use a user interface for designation and display of designable settings and restrictions of containers. Each container is also used as such a user interface.

<Template Generation Mode (Container Display/Editing)>

The procedure of generating a document to be printed in a variable printing manner can be divided into two phases: template generation processing (template generation mode) for generating a template and document generation processing for generating a document by inserting contents in a generated template (referred to specially as a preview mode with respect to preview display of a document). The template generation mode will first be described.

(Method of Generating New Container)

Containers are described as two kinds: "text container" and "image container". A text container has (contains) a text and an embedded image. An image container has (contains) only an image. "Variable" signifies "variable on a record-by-record basis", as mentioned above.

Each of a new text container and a new image container is generated on the document template 309 by dragging a rectangular area with the text container tool 404 or the image container tool 405 selected from the widget 305 by clicking with the mouse 133.

Alternatively, a container may be simply generated by clicking on the document template 309 after activating the suitable tool 404 or 405. In such a case, a container of a default size may be inserted or a dialog box for setting the size of a new container may be provided. Another different method of providing a container may be conceived. The position and size of a rectangle designated on the user interface by a user are stored directly as the position and size of a container on the template in a hard disk or the like when the document template is stored as a document template file.

(Container Display Method)

An edge of a container defines a virtual boundary of associated contents at the time of display of the contents in a document. When a container is used as a user interface, the left edge of the container is treated as the leftmost edge at which associated contents can be displayed in any document. Similarly, the height of the container may be grasped as a limit to the height at which associated contents can be displayed in a generated document. According to the present invention, it is assumed that the edges or the size of a container is changed through the user interface 103.

(Definition of User Interface)

The definition of several rules of the relationship between a user interface and a layout used to limit a layout of contents will next be described. Examples of layout shown in the accompanying drawings are also displayed according to the definition.

(1) If the left and right edges of a container are solid lines, the width of the container is fixed. If the width of the container is fixed, a width assigned to associated contents is constant in all documents. However, there is a possibility of the height of the container being changed.

(2) If the upper and lower edges of a container are solid lines, the height of the container is fixed. If the height of the container is fixed, a height assigned to associated contents is constant in all documents.

(3) If restriction in terms of distance is fixation, a designated distance is set constant in all documents.

(4) If a solid-line edge of a container and another container are associated with each other by using a link described below, there is a possibility of the container having the solid-line edge being changed in position by being pushed by the another container associated by the link. A change in position in the vertical direction is caused through a link on the upper and lower edges, while a change in position in the horizontal direction is caused through a link on the left and right edges. The contrary of "fixed" is "variable" signifying that there is a possibility of the edges, position or document restrictions being changed among documents. The following are an example of rules of the relationship between a user interface and a layout for realizing variation.

(5) If the left and right edges of a container are dotted lines, the width of the container is variable. If the width of the container is variable, a width assigned to associated contents is variable among documents.

(6) If the upper and lower edges of a container are dotted lines, the height of the container is variable. If the height of the container is variable, a height assigned to associated contents is variable among documents.

(7) If restriction in terms of distance allows variation, there is a possibility of a designated distance being changed among documents. A setting of restriction in terms of distance enables layout to be performed while adjusting the distance between containers within maximum and minimum limits.

(8) If a dotted-line edge of a container and another container are associated with each other by using a link described below, there is a possibility of the container having the dotted-line edge being changed in position while pushing (or by being pushed by) the another container associated by the link. A change in position in the vertical direction is caused through a link on the upper and lower edges, while a change in position in the horizontal direction is caused through a link on the left and right edges.

Figure 4:
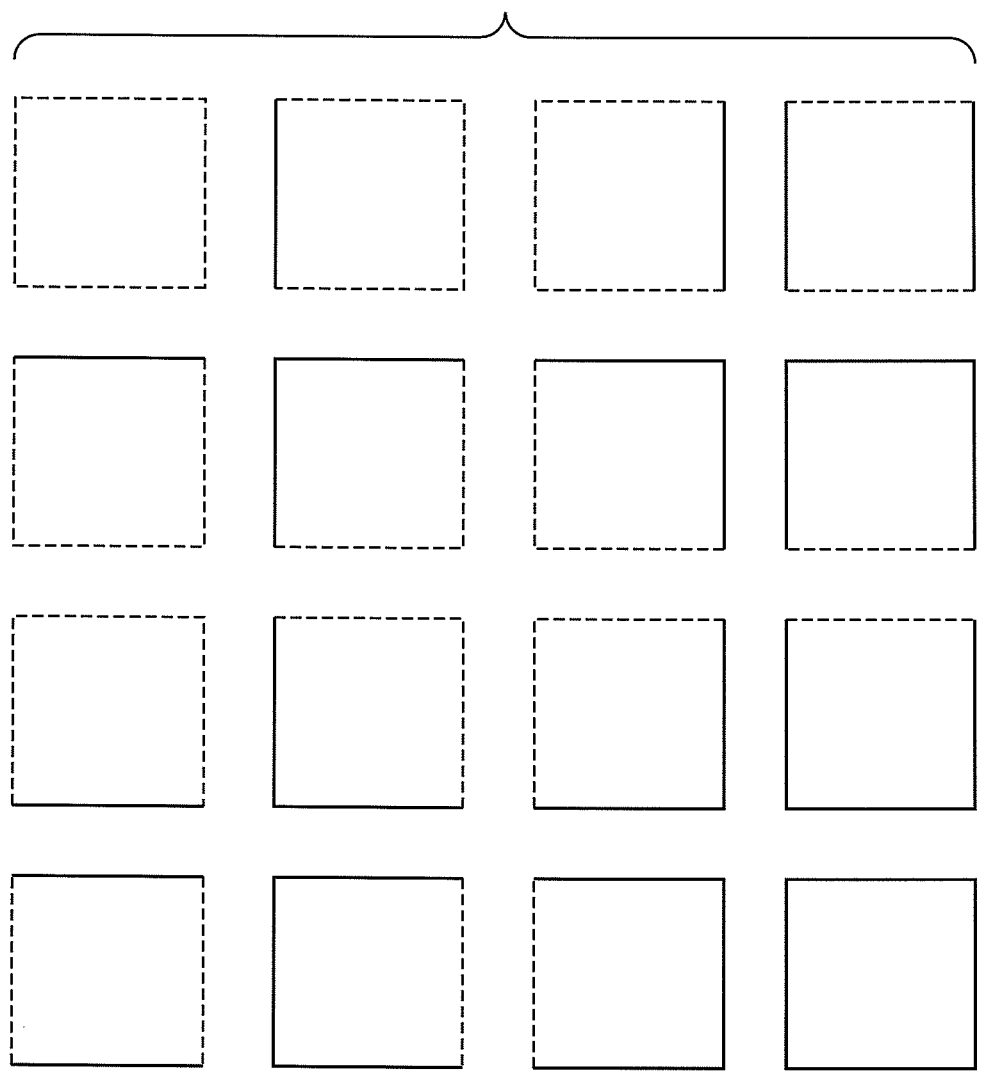
FIG. 4 is a diagram showing an example of sixteen patterns of expression of a container based on an example of an interface according to an embodiment of the present invention.

FIG. 4 shows the states of the edges of a container based on the above-described rules. In ordinary cases, the states of the edges of a container are not depicted on a print, since they are an element displayed as assistance to designing of a document template. The set values of the maximum and minimum of the width and height set as restriction of a container are displayed in the secondary dialog window 311 (FIG. 3).

Display on a user interface and restriction of a container itself or restriction between containers have been described from the viewpoint of a user using the user interface. The causal sequence from the viewpoint of the program executed to implement the user interface is reverse to that described above. The above-described rules are rewritten below from the viewpoint of the program.

(1) If a data setting is made such that the width of a container is variable, the left and right edges of the container are displayed as solid lines.
(2) If a data setting is made such that the height of a container is fixed, the upper and lower edges of the container are displayed as solid lines.
(3) A distance designated as a fixed value is set constant in all documents.
(4) If a data setting is made such that the width or height of a container is fixed, and if a distance to another container (restriction of container) is set with respect to the corresponding fixed edge, the position of the container fixed in width or height is determined according to conditions including the size of the another container.
(5) If a data setting is made to such that the width of a container is variable, the left and right edges of the container are displayed as dotted lines.
(6) If a data setting is made such that the height of a container is variable, the upper and lower edges of the container are displayed as dotted lines.
(7) If a data setting is made such that restriction in terms of distance between containers allows variation, layout can be performed while adjusting the distance between the containers within maximum and minimum limits.
(8) If a data setting is made such that the width or height of a container is variable, and if a distance to another container (restriction of container) is set with respect to the corresponding variable edge, the position of the another container is determined according to the width or height of the container variable in width or height.

Figure 5A:
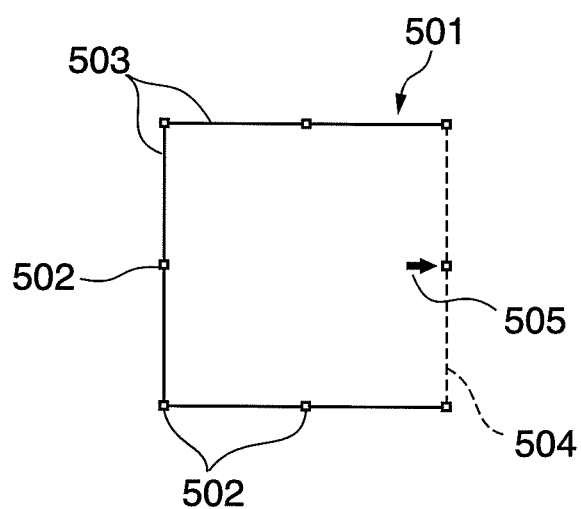
FIG. 5A is a diagram showing an example of a typical container rule according to an embodiment of the present invention.
Figure 5B:
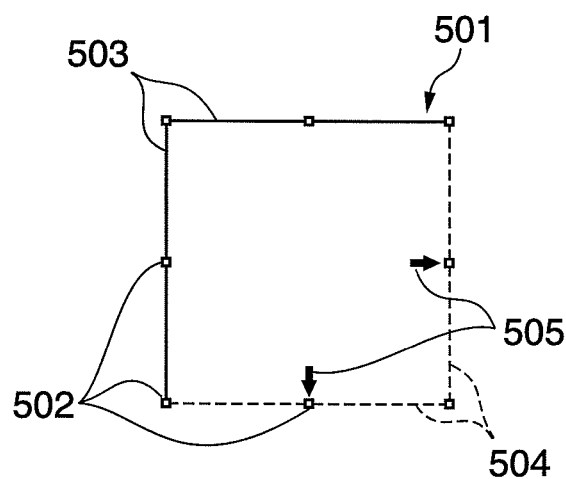
FIG. 5B is a diagram showing an example of a typical container rule according to an embodiment of the present invention.
Figure 5C:
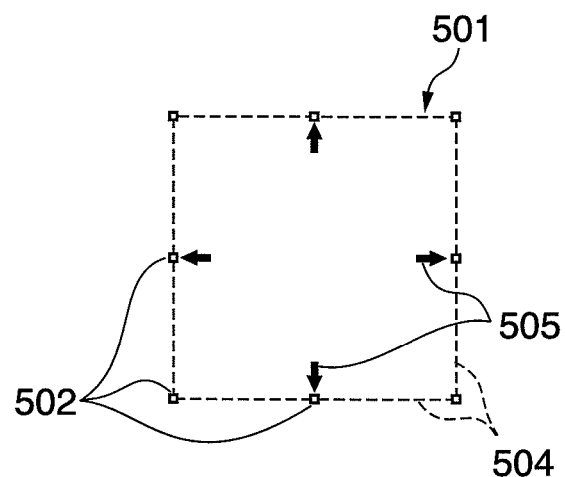
FIG. 5C is a diagram showing an example of a typical container rule according to an embodiment of the present invention.

Referring to FIG. 5A, the width of a container 501 is variable. In this case, an edge 503 is expressed by a solid line, while a variable edge 504 is expressed by a dotted line. An enlargement/reduction icon 505 is an optional indicator indicating that the edge 504 adjacent to the icon is variable. Referring to FIG. 5B, the container 501 is variable both in the direction of width and in the direction of height. Referring to FIG. 5C, the container 501 is also variable both in the direction of width and in the direction of height, and handles 502 for operating the edges are also displayed on the user interface.

<Example of Data on Document Template>

Figure 23:
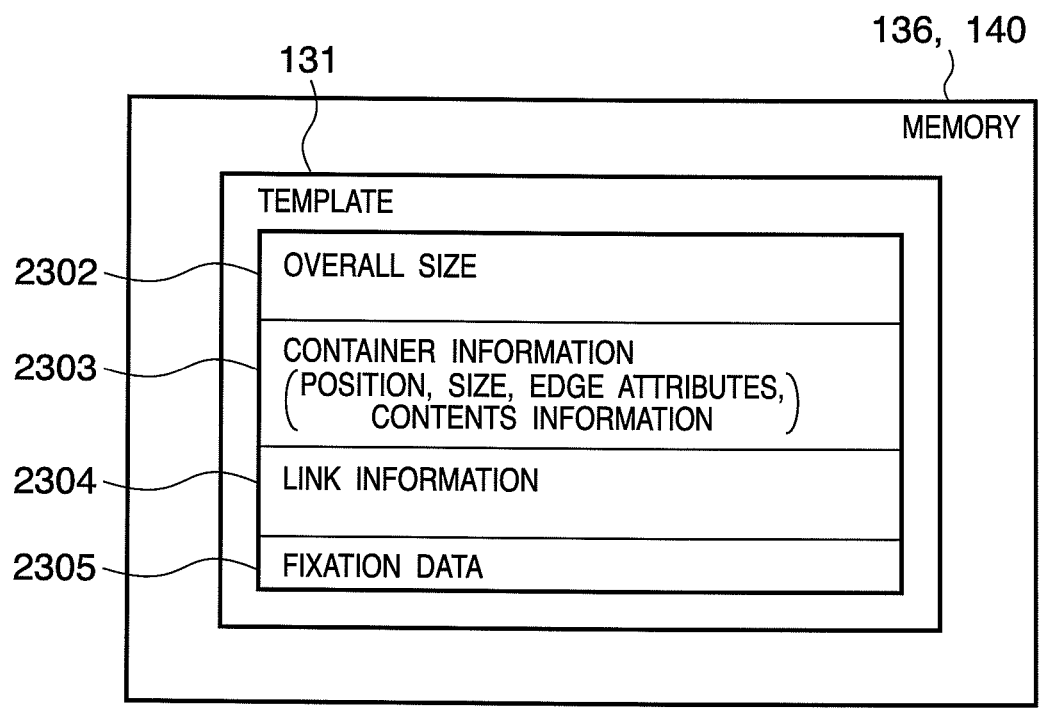
FIG. 23 is a diagram showing an example of a configuration of template data.

FIG. 23 shows an example of data on a document template (referred to as template data) 131. Referring to FIG. 23, template data 131 is stored in the memory 136 or the hard disk 190. The template data includes elements described below.

(1) Overall Size 2302

This data indicates the page size of the entire template. The size is indicated, for example, by vertical and horizontal dimensions or a standard sheet size.

(2) Container Information 2303

This information includes, with respect to each of containers laid out on a template, identification information for identifying the container, a reference position of the container (position information), the lengths of the vertical and horizontal edges (size information), and attributes of the edges and points constituting the container (attribute information), information on contents associated with the container or the like. Position information and size information are defined at the time of preparation of the template according to a designation through the user interface shown in FIG. 4. Position information is a reference position of a container set by a user at the time of preparation of the container. In the case of a container variable in position, the size is changed according to the size of contents (an image size, an amount of text) arranged in the container, and the position is dynamically changed according to the sizes of this and other containers. A container fixed in position has fixed position information. For example, if a container fixed in position has information from which the positions of its diagonal points, its position and size can be determined. Needless to say, information on the positions of all points on the template may be provided. Information on the position of one point on the template and information on the positions of other points relative to the position of the one point may alternatively be provided. That is, a container can be defined by one point and the size of the container. Also, a variable point may be defined by a position relative to a fixed position while the fixed position is defined by a position on the template.

Attribute information indicate attributes of the edges and axes of a container, points of intersection thereof, or the like, described above with reference to FIGS. 3 and 5A to 5C. The upper edge, lower edge, left edge, right edge, horizontal axis, vertical axis, corner points, center point, width and height of one container are determined from a position and a size for example. Definition as to whether each element is variable or fixed is defined by attribute information. In a case where a document template is prepared by the user interface shown in FIG. 9, an operator selects a desired one of menu items "Fix" and "Make variable" or the like displayed in the pallet 311 after selecting an edge, a point or an axis of a container. One of attributes "fixed" and "variable" is thereby written to container information 2303 in correspondence with the selected point or edge. All default values immediately after generation of a container are made "variable" for example. In this example, "fixed" with respect to of one side or axis means that not the length or the position in the longitudinal direction of the side or axis but the position in the direction perpendicular to the longitudinal direction is fixed. If from setting of an attribute of a point or edge an attribute of another point or edge is automatically determined, the automatically determined attribute is also written. For example, a designation to make a corner point "fixed" is given, the edges containing the corner point are also fixed. The same can also be said with respect to the converse of this. Also, for example, if a designation to make the position of a center point "fixed" is given, "fixed" is written as an attribute of the center point "fixed" is also written as attributes of the horizontal and vertical axes. In this case, if the width and height are left variable, the attribute "variable" of the width and height is maintained.

Information about associated contents (contents association information) includes, for example, information indicating the kind as to whether the contents are a text container or an image container and association information such as an identifier for a data source inserted in the container, e.g., part or the whole of a database name, a record name, a field name, and so on, and a conditional expression for extraction of the contents. With respect to a text container, contents association information includes information about fonts, e.g., the kinds and sizes of fonts, character modification information such as colors, italics, boldfaces and underlines. A number of groups of container information 2303 corresponding to the number of containers provided on the document template are held.

(3) Link Information 2304

A link is an object for association between containers and is one of restrictions of containers. Link information is information about making constant the distance between two containers connected by a link (fixed link) or making the distance variable (flexible link). Link information includes, for example, identifiers for two containers with respect to the horizontal and vertical directions, information indicating the existence of a link set between the edges of the containers facing each other, and the distance between the containers in the direction along the link. Link information is held with respect to each of defined links. As a form of link information, the positions of the edges of containers in the horizontal and vertical directions may be respectively held. Also, information indicating the existence of links set between the edges may be held.

(4) Fixation Information 2305

This information includes information for defining a fixed portion other than a variable portion. For example, a sentence, an image or the like common to all documents (all records) generated by applying the template can be defined. For a sentence or an image, only information on the location of the sentence or the image, not including the data for the sentence or the image itself, may be defined. Needless to say, this information includes information for defining a position at which the sentence or the image is laid out on the template.

Figure 24:
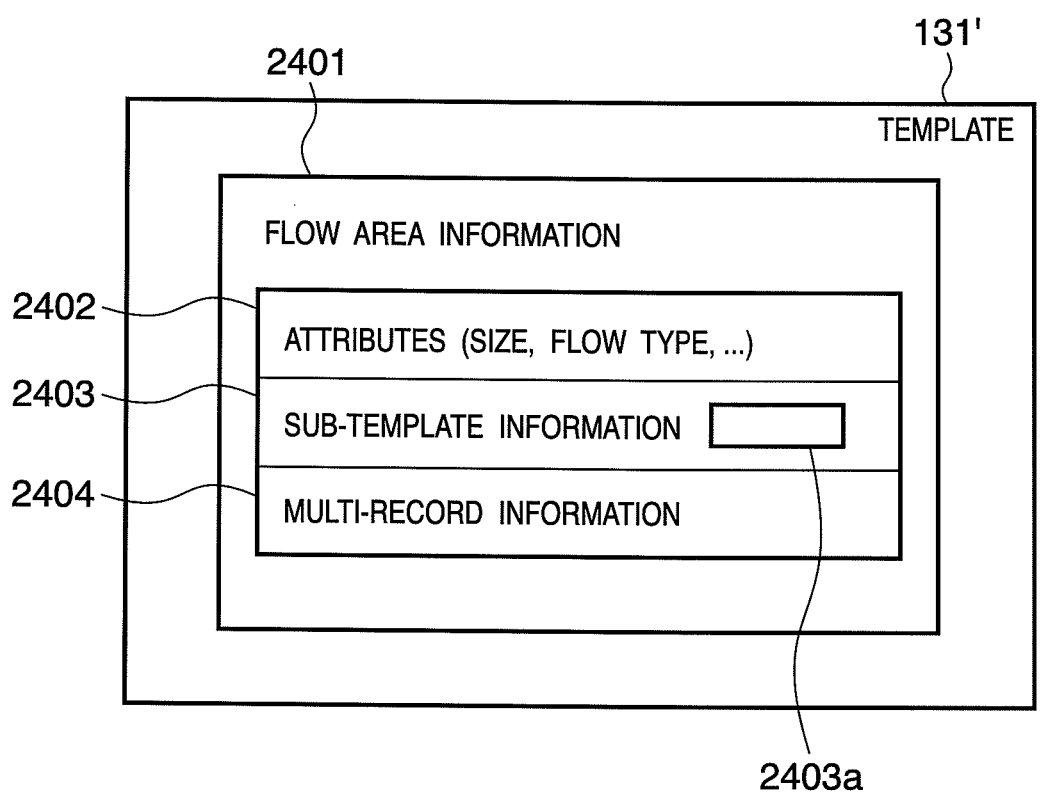
FIG. 24 is a diagram showing an example of a configuration of multi-record template data.

FIG. 24 shows an example of template data 131' used for the multi-record function. This data is, of coarse, stored in the memory or the like. Referring to FIG. 24, in a document template, an area which is called a flow area, and in which another template can be arranged as a sub-template, is defined. A number of sub-templates corresponding to multiple records are arranged in one flow area. Template data 131' shown in FIG. 24 includes flow area information 2401. Items of flow area information corresponding to a number of flow areas contained in the template are held in the template data. Flow area information 2401 includes elements described below.

(5) Flow Area Attribute Information 2402 Indicating the Position and Size of the Whole, a Flow Type and so on.

The position and size are as described above with reference to FIG. 23. A flow type is a symbol defining a pattern in which sub-templates are arranged in a flow area. The number of sub-templates arranged in a flow area is determined by key columns of multiple records and is variable. Accordingly, a flow type is provided as information defining a layout of sub-templates in a flow area according to the number of sub-templates arranged in the flow area.

(6) Sub-Template Information 2403

Sub-template information 2403 includes layout information indicating association between contents laid out on a sub-template and a flow area in which the contents laid out according to the sub-template (referred to as laid-out contents in this specification) are arranged. For example, sub-template information 2403 is information for identifying a sub-template inserted in a flow area. This information includes, for example, a name of a file of template data (template file). Sub-template information 2403 may also include layout conditions for layout of laid-out contents and a flow-type for designation as to in what order the laid-out contents should be inserted. As layout conditions, a condition for search (search expression) for a database from which an object to be laid out according to the sub-template is obtained and other conditions are held. A flow-type is designated in a prepared choice of types such as Z-, N- and V-types, and an identifier indicating the designated flow-type is held. Alternatively, laid-out contents may be inserted in a flow area corresponding to the value of a layout condition coinciding with the value of a layout information field provided in a record in a database.

As information specific to this embodiment, condition information 2403a for determining a sub-template to be inserted in a flow area is included. For example, condition information 2403a on matching of different sub-templates with the value of a particular field in a record in a database associated with one of the sub-templates may be held as sub-template information. This information enables the sub-template corresponding to the value of the field to be used for the corresponding record.

(7) Multi-Record Information 2404

Multi-record information 2404 includes identifiers such as a name of a database associated with a flow area and a field name in each of records. A record having the same value as a designated field name is fetched (read) from the database to be laid out in one flow area. In some case, the number of records to be fetched is significantly large with respect to the size of a flow area. Then the flow area is expanded over a plurality of pages for layout of the records.

<Link Setting Method>

Figure 6A:
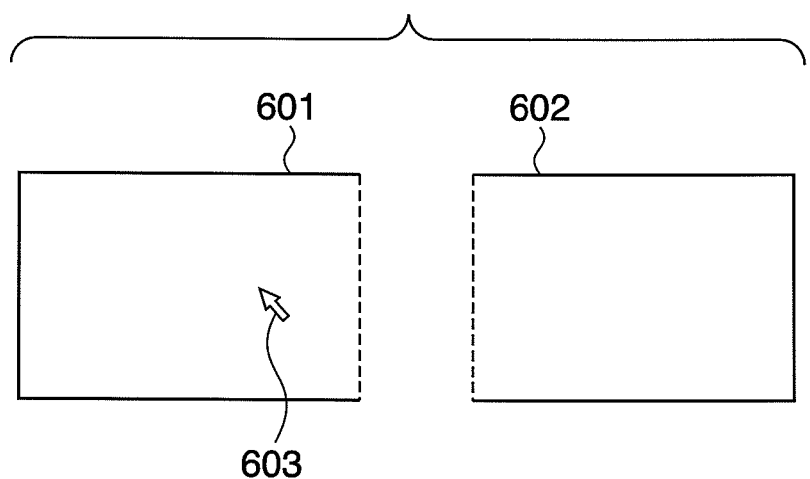
FIG. 6A is a diagram showing an example of a UI for forming a link according to an embodiment of the present invention.
Figure 6B:
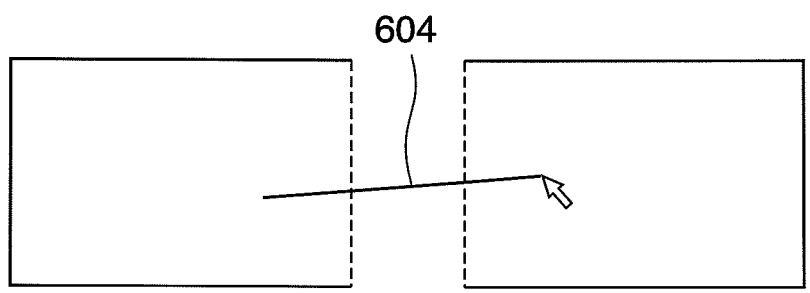
FIG. 6B is a diagram showing an example of a UI for forming a link according to an embodiment of the present invention.
Figure 6C:
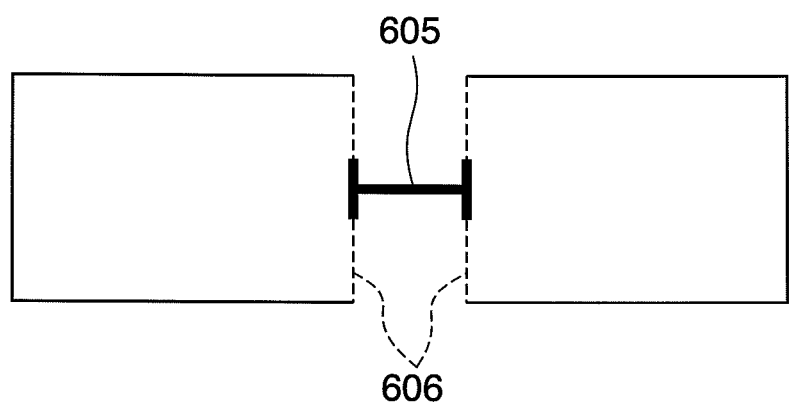
FIG. 6C is a diagram showing an example of a UI for forming a link according to an embodiment of the present invention.

FIGS. 6A to 6C show an example of a user interface (UI) according to a link setting method. First, to set a link, (at least two) containers between which a link is set are prepared. The following is an example of a case where two containers are prepared and a link is set. Subsequently, the above-mentioned link tool is selected. FIGS. 6A to 6C show operations to set a link from a state where prepared containers exist and the link tool is selected. Description will be made with successive reference to FIGS. 6A to 6C.

Lines 0601 and 0602 in FIG. 6A represent fixed edges similar to the edges 407 and 408 described above with reference to FIG. 3. An icon 0603 represents a mouse pointer. First, one of the containers on which a link is to be set is selected by clicking. Subsequently, the mouse pointer is moved to the other container and clicked, as shown in FIG. 6B. In FIG. 6B, a line connecting the position at which the mouse pointer is clicked and the position to which the moved mouse pointer is moved is indicated by 0604. This UI shows to the user at which positions a link is set. After the second click in the state shown in FIG. 6B, a link UI indicated by 0605 is displayed in the set place, and the containers are in the state shown in FIG. 6C. Dotted lines represent variable edges 0606, as are those in the above. In this design, the left container 0601 is variable in size rightward. Also, the right container 0602 is variable in size leftward. The link therebetween enables the left and right containers to be operated so as to variably adjust their sizes while maintaining the distance therebetween.

This processing will be described again from the viewpoint of data processing shown in FIG. 23. For example, container information 3303 is defined by preparing containers. The layout editing application 121 then stores link information indicating that a link has been established between the selected two containers, and, if necessary, changes the attributes of the edges of the linked two containers facing each other. For example, if one of the edges facing each other is variable, there is no need to change the attributes of the edge. However, both the edges are fixed, the meaning of setting a link is lost. Therefore, at least one of the edges is made variable. In the example shown in FIGS. 6A to 6C, both the edges are made variable. If a change is made in the attributes of the edges, the layout editing application 121 rewrites the attribute information corresponding to the edge having its attribute changed in container information 3303.

While an expression "facing each other" is used in the above description, a link can also be set between lines extended from the lines representing the edges, as in the case where the edge lines face each other, if the extended lines face each other while the edge lines do not face each other. In this specification, the expression "facing each other" is used with respect to containers associated with each other by a link even in a case where only extended lines face each other. That is, a link can also be set, for example, between small containers placed at diagonal corners of a template.

Thus, in a case where one of edges facing each other of containers associated with each other by a link is variable while the other edge is fixed, there is a possibility of the variable edge being moved according to the size of contents. The container on the fixed side itself is translated according to the amount of movement of the variable edge (in a case where no anchor exists). The distance between the containers defined by the link (the distance in the direction along the link) is maintained. If the two edges are variable, each of the two containers is variable in size according to the size of contents. The distance between the containers is also maintained in this case.

<Preview Mode (Layout Computation)>

Figure 7A:
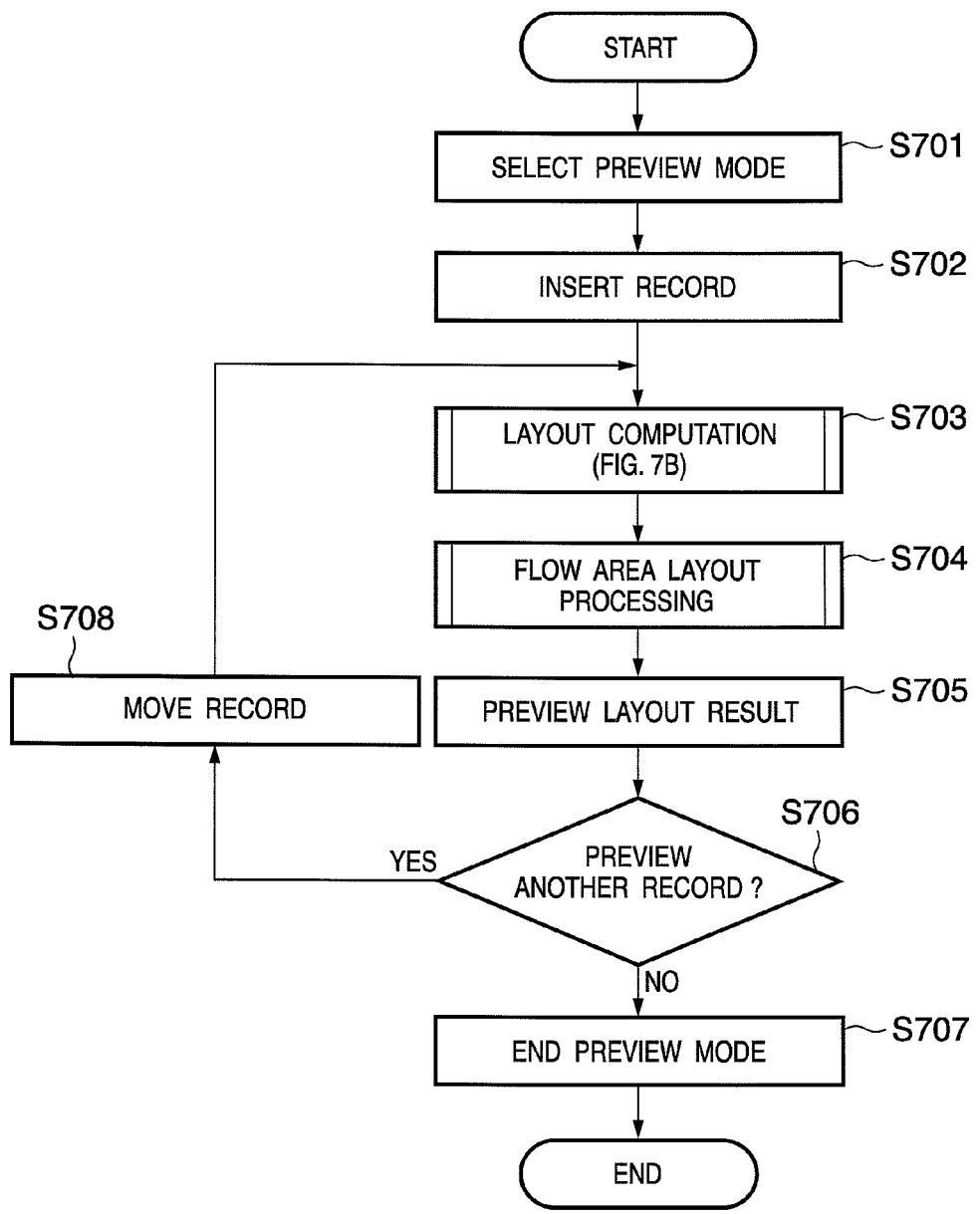
FIG. 7A is a diagram showing an example of a flow of computation of layout according to an embodiment of the present invention.

FIG. 7A shows the flow of layout computation in the preview mode. Layout computation is processing for recomputing the container size and the container layout according to the data size of a container in a document template and other factors when actual data is inserted in the container. Referring to FIG. 7A, a document generated by inserting contents in a template is displayed on the display 144 since an example of processing in the case where the preview mode is selected is shown. However, when the printing mode is selected, a printout of the document is made in place of preview display. Processing steps shown in the flowchart according to the present invention are executed by the processor 135 in the information processing apparatus (host computer).

Referring to FIG. 7A, the layout editing application 121 first recognizes that the preview mode is selected (step 0701). Operating modes according to the automatic layout system in this embodiment include a layout setting mode of generating a document template in which a layout is defined by preparing containers and establishing associations among the containers, and the preview mode of inserting records in the generated layout (template) and previewing the layout results after actually inserting the records.

In the preview mode, actual records are inserted and a layout is computed. Processing in the preview mode is computation of a layout as seen on the display. Also in the case of actually printing layout results, a layout is also computed after inserting records. The computation method in the case of actual printing is the same as that in the preview mode.

After selection of the preview mode, the layout editing application 121 recognizes that a record to be previewed has been selected (step 0702). A record designated by an operator may be selected or records may be successively selected from a specified database. After selection of a record, the layout editing application 121 performs computation for layout of the record in conformity with a template (step 0703). If a flow area is contained in the template, the layout editing application 121 lays out the data in conformity with a sub-template with respect to the flow area (step 0704). The layout editing application 121 lays out the record according to the results of computation in steps 0703 and 0704, displays the laid-out record (step 0705) and determines whether or not preview should be performed with respect to another record (step 0706). This determination may be made according to an instruction from the operator or determination may be made as to whether or not preview with respect to a range designated in advance is completed. If the layout editing application 121 determines in step 0706 that there is no need to perform preview with respect to any other record, it ends processing in the preview mode (step 0707).

If preview should be performed with respect to another record, the layout editing application 121 selects another record, again performs layout computation, lays out the record and performs preview of the layout results (step 0708). In the case of printing not in the preview mode, layout computation is performed with respect to all records to be printed, as the records are successively selected. Steps 0701 and 0707 are not included in processing in this case. In step 0706, determination is made as to whether or not printing of all the records to be printed is completed.

(Layout Computation Procedure)

Figure 7B:
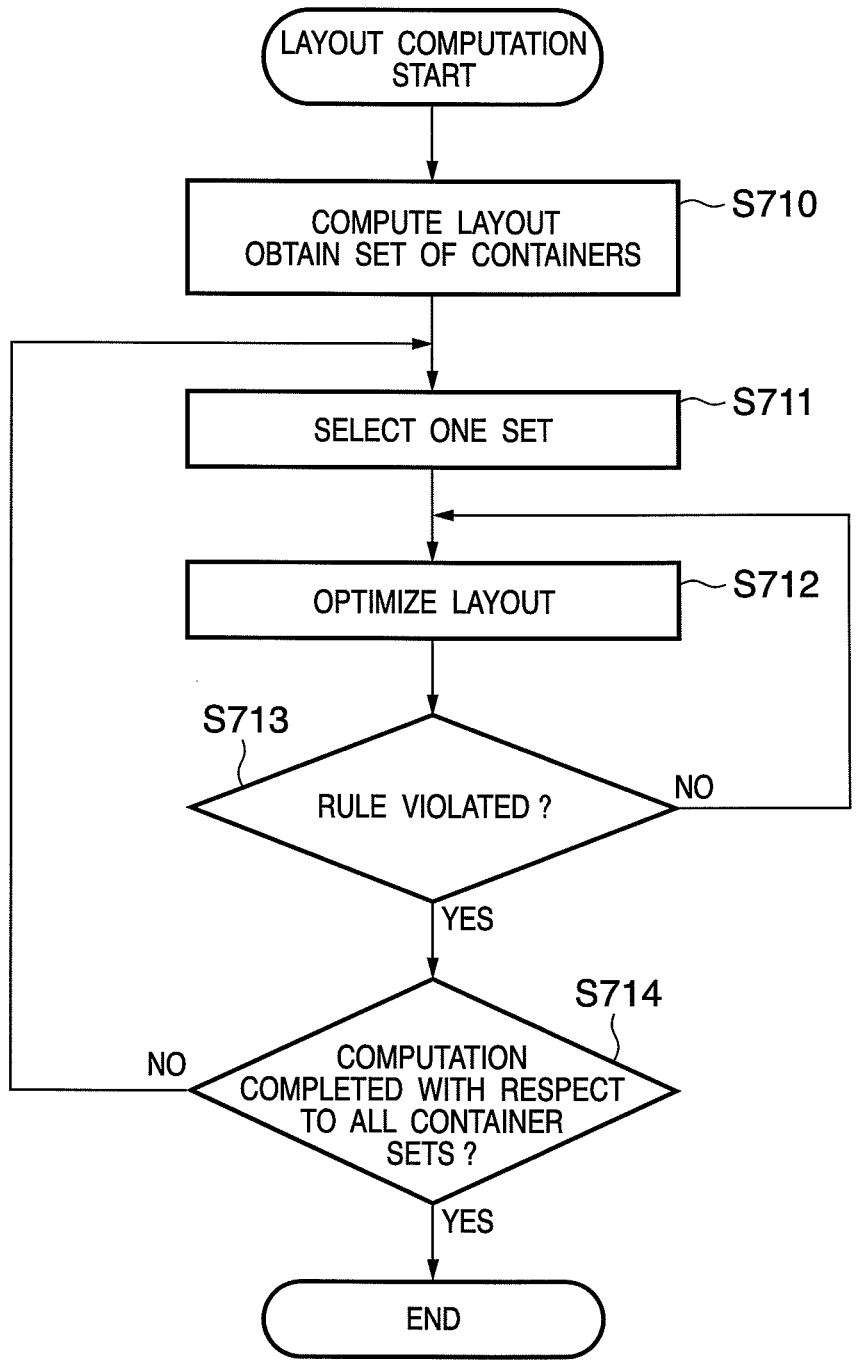
FIG. 7B is a diagram showing an example of a flow of computation of layout according to an embodiment of the present invention.
Figure 8A:
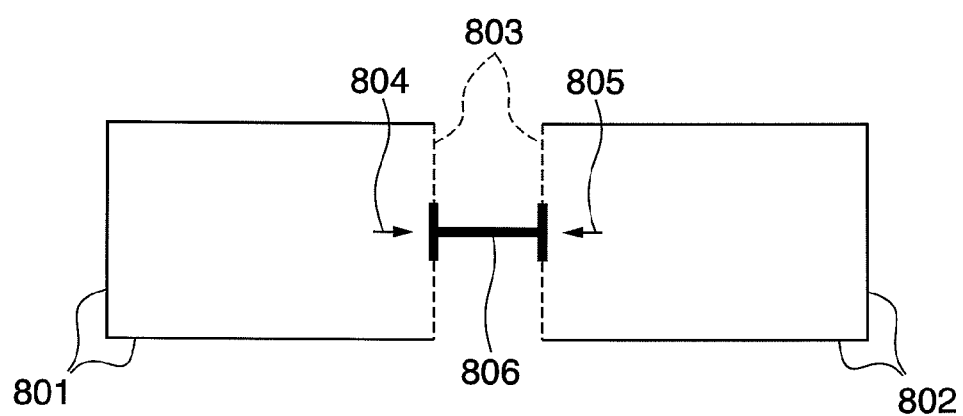
FIG. 8A is a diagram showing an example of a UI corresponding to the flow in FIG. 7 according to an embodiment of the present invention.
Figure 8B:
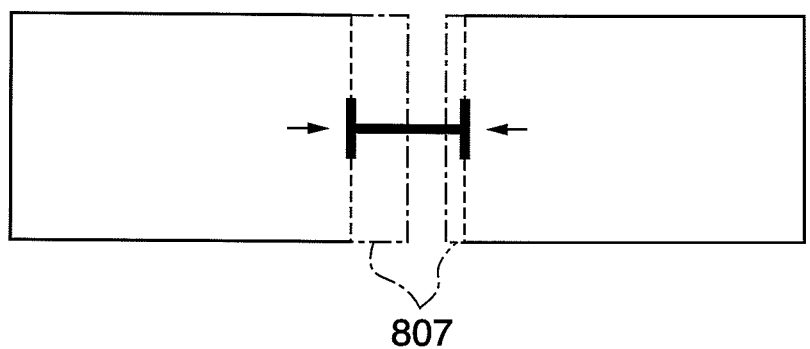
FIG. 8B is a diagram showing an example of a UI corresponding to the flow in FIG. 7 according to an embodiment of the present invention.
Figure 8C:
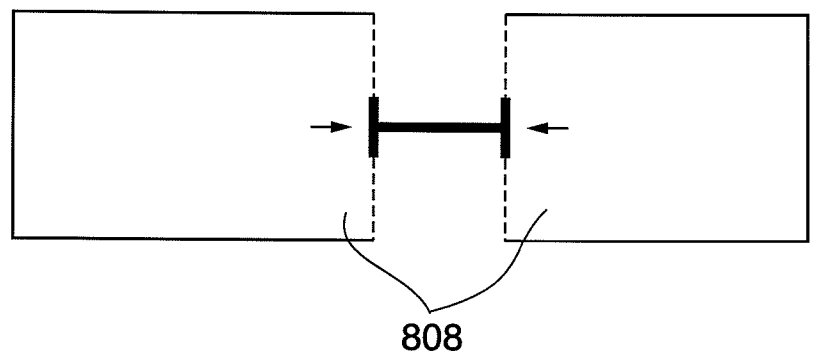
FIG. 8C is a diagram showing an example of a UI corresponding to the flow in FIG. 7 according to an embodiment of the present invention.

FIG. 7B in a flow diagram showing details of layout computation in step 0703 shown in FIG. 7A. FIGS. 8A to 8C are diagrams showing an example of a UI display relating to the computation. Processing shown in the flowcharts including FIG. 7B is executed by the computer shown in FIG. 1A, 1B or 2.

Figure 32:
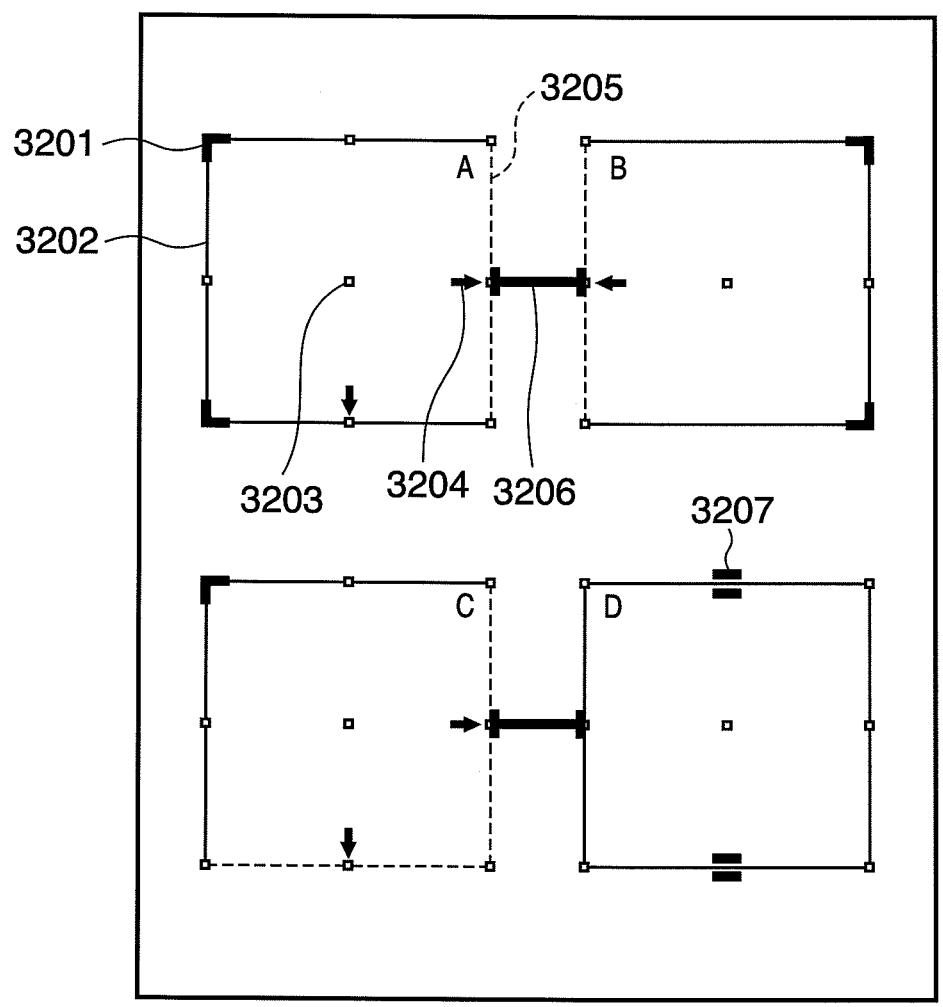
FIG. 32 is a diagram for explaining a set of containers at the time of layout computation.

The layout editing application 121 first obtains sets of containers on which layout computation will be performed (step 0710). Layout computation is performed by treating, as one set, containers associated with each other by a link. For example, referring to FIG. 32, four containers are laid out on a page and associations are established among the containers. In this case, containers A and B are associated with each other by a link and containers C and D are also associated with each other by a link. Accordingly, containers A and B are treated as a set 1, while containers C and D are treated as a set 2. That is, template data link information 2304 shown in FIG. 23 is referred to and a group of containers associated by a link is determined as one set of containers.

Subsequently, the layout editing application 121 selects one of the sets of containers obtained in step 0710 to perform layout computation on the selected set of containers (step 0711). The sets of containers may be selected, for example, according to the order of appearance in the template data link information. The layout editing application 121 performs layout computation on the selected set of containers. In this processing, layout optimization is performed so that the size of each laid-out container is closer to the actual size of contents in the container as possible (step 0712).

With respect to containers associated with each other so as to be dynamically variable in size, layout optimization is performed so that, in each container in which contents are inserted, the size of the inserted contents and the size of the container are closer to each other. In a case where the size of a container is fixed, contents are enlarged or reduced in size when set in the container, or part of the contents are set in the container. Also in a case where three or more containers are included in a container set, the container size (i.e., the length of a variable edge) according the size of contents is computed and the position at the distance defined in link information from the mid-point of the edge is determined as the position of the edge. With respect to a container having its fixed edge linked, the position of the container is moved according to the movement of the corresponding edge of an associated container.

Thus, containers associated by a link are treated as one group, the container variable in size has its size determined, and the container variable in position has its position determined.

Layout optimization computation is performed in the above-described manner. If a nonconformity occurs between the computation results and rules, the layout editing application 121 again performs computation so that conformity to the rules is achieved (step 0713). The rules are restrictions set by the user at the time of preparation of the template, e.g., restrictions on the size and position of the containers and the length of the link. Such restrictions are defined by information and link information on the attributes of edges and points or the like included in container information in template data.

In particular, items for "fixed" values and link information in attribute information are restrictions on layout. After the completion of layout computation in step 0712, comparison is made between the computation results and the container information in the temple data with respect to the positions and sizes after the computation of the edges and points of the containers and other items having attributes defined as "fixed". If there is noncoincidence in some of the items, it is determined that a restriction violation has occurred. Also, if the link length (distance between containers) included in the link information and the distance after layout computation in step 0712 of the containers between which a link has been set are different from each other, it is determined that a restriction violation with respect to the link has occurred.

If the layout is computed so as to avoid nonconformity with the rules, the layout of the container set is completed. The layout editing application 121 performs steps 0711 to 0713 on all the sets of containers on the page, thereby computing the layout of the entire page (step 0714).

In a case where flow area information is included in the template data, there is a need to perform layout of a sub-template in a flow area in layout computation in step 0704. This processing will be described below with reference to FIGS. 10, 14, 16A and 16B and other figures. These figures show processing not in the preview mode but in the template generation mode. However, the corresponding preview display is also performed in the template generation mode, so that the same processing for preview display is performed.

FIGS. 8A to 8C show an example of UI at the time of layout computation. FIG. 8A shows a state in which a certain record is inserted to determine a layout. Reference numerals 0801 and 0802 denote fixed edges; reference numerals 0803, variable edges; and reference numerals 0804 and 0805, arrows indicating directions in which the variable edges are moved; reference numerals 0806, a link. In this state, the record is changed and contents of different sizes are inserted. In FIG. 8B, the sizes of the new contents are shown by being superposed on the state shown in FIG. 8A. Lines 0807 indicate the sizes of the contents respectively inserted in the containers. Layout computation is performed after insertion of the contents. FIG. 8C shows the results of layout computation. The sizes of the containers are computed so as to be different from each other, as are the sizes of the contents actually inserted, and so as to avoid nonconformity with the rules such as that described above. As shown in FIG. 8C, the same difference as the difference between the contents sizes 0807 of the inserted contents shown in FIG. 8B is preserved as the difference between the contents sizes 0808 after computation.

Figure 33:
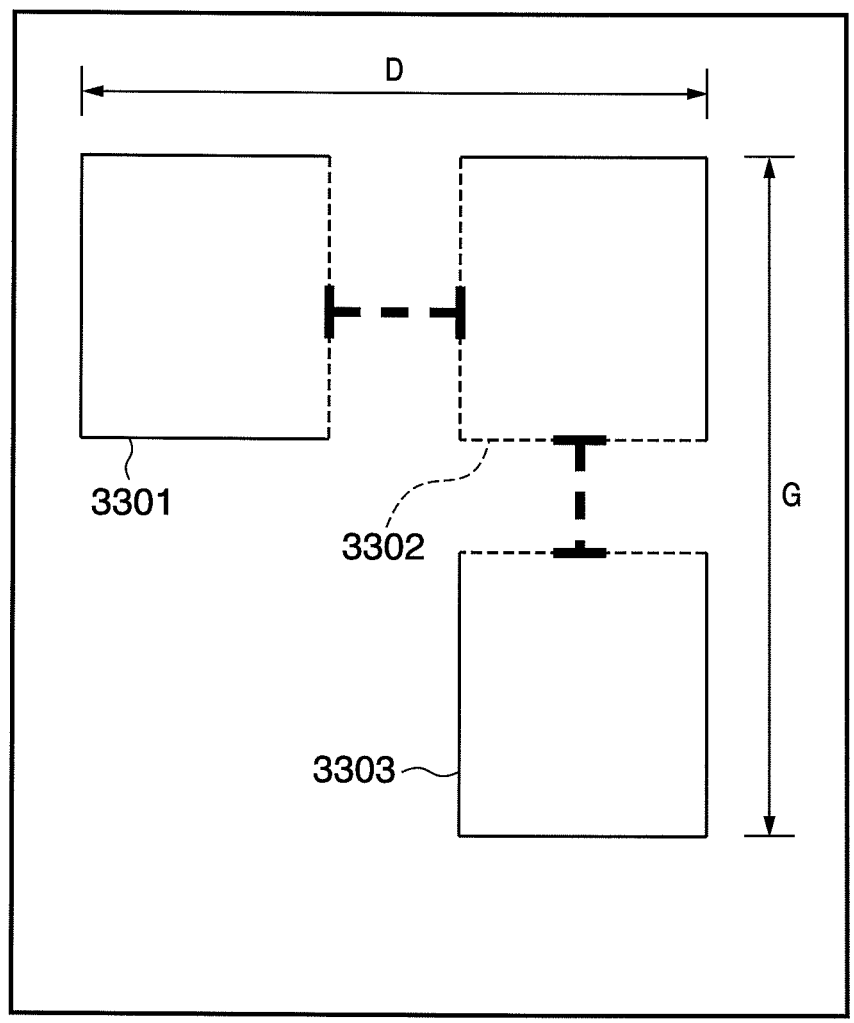
FIG. 33 is a diagram for explaining layout optimization processing.

However, if the container sizes are simply changed by preserving the same difference, there is a possibility of failure to suitably adapt the containers in a case where there is a need to perform layout computation by considering the vertical and horizontal directions, as in the case of layout shown in FIG. 33, although there is no problem with layout computation with respect to the horizontal direction only, as in the layout shown in FIGS. 8A to 8C. In the case of two-dimensional layout in the horizontal and vertical directions shown in FIG. 33, adjustment in the horizontal direction is first performed by using the layout computation method shown in FIG. 7B and adjustment in the vertical direction is thereafter performed by using the same method. That is, layout adjustment between containers 3301 and 3302 may be performed by the above-described procedure so that the containers are within a range defined by a set value. D, and layout adjustment between containers 3302 and 3303 may be thereafter performed so that these containers are within a setting G. However, a layout by the method of first performing adjustment in the horizontal direction and thereafter performing adjustment in the vertical direction is thought to depart from the basic layout according to the user's need.

A method for minimizing the deviation from the basic pattern (aspect ratio) with respect to each container may therefore be adopted in which the sum of the square of the difference between the width of the basic pattern and the width after layout adjustment and the square of the difference between the height of the basic pattern and the height after layout adjustment is obtained with respect to all the containers, and the layout editing application 121 performs layout adjustment by computing the widths and heights of the containers so that the total of the sums of the squares of the containers is minimized.

By layout adjustment using this method of least squares, a final layout well balanced can be determined without largely departing from the basic layout initially set by the user. Since the flexible link described below is set between the containers, the link size is changed according to the size of arranged contents data, as described below. The layout editing application described in this specification has such a layout adjustment unit to make it possible to adjust the laid-out positions of a plurality of partial display areas (containers) according to assigned data sizes.

<Multi-Record (Multi-Data) Function>

A multi-record will be outlined. While one record corresponds to one document on an ordinary document template, a multi-record compatible with a sub-template has records arranged until a break at which a reference item is changed occurs. Therefore a multi-record is one document containing a plurality of records. It is, therefore, desirable to prepare a data base containing variable data corresponding to an ordinary document template and a multi-record database containing variable data corresponding to a sub-template.

FIG. 9 shows an example of a multi-record and the outline of a method for laying out a multi-record. Reference numerals 0901 denote a document; reference numerals 0902, a page; reference numerals 0903, a sub-template; and reference numerals 0904, a database. The table showing the database indicated by 0904 contains data groups Nos. 1 to 7. In the case of one record-one document variable printing, seven documents are generated since there are seven records. In variable printing supporting a multi-record in multi-record-one document form, however, processing described below is performed. First, a user freely designates a column with which a multi-record is designated. This designation is performed at the time of preparation of a template for example. Information for identifying this designated field is stored as a portion of multi-record information 2404 shown in FIG. 24. It is assumed that "Name" is designated in this example. It is then determined that records having the same value as the value of the designated field are to be laid out on one document. These records are laid out by using a sub-template separately designated (stored in sub-template information shown in FIG. 24) to be arranged in one flow area. In the example shown in FIG. 9, the value of the field "Name" of the records Nos. 1 to 4 is "Tom" and the records Nos. 1 to 4 are therefore arranged in one flow area and laid out on one document. The value of the field "Name" of the records Nos. 5 to 7 is "Nancy" and the records Nos. 5 to 7 are therefore laid out of a different document while using the same template as that used with respect to "Tom". That is, a document "Tom" is first completed and a document "Nancy" is thereafter completed. Thus, a new document is generated in response to a change in data in a designated column.

More specifically, a page break is made, for example, after adding a footer (not shown) or the like to the document "Tom"

according to a setting in the template data. The document "Tom" is thereby completed. Subsequently, a header (not shown) or the like for the document "Nancy" is added to the new page by using the same template data. Also, the records with the Name field value "Tom" are laid out by using the sub-template also set as sub-template information and arrange in the flow area defined in the template. This is an ordinary multi-record.

While in this embodiment the same template data is used with respect to Nancy and Tom, the same sub-template is not necessarily used for individual records. A sub-template according to a condition separately designated may alternatively be used.

<Overall Flow of Processing in Template Generation Mode>

Figure 10:
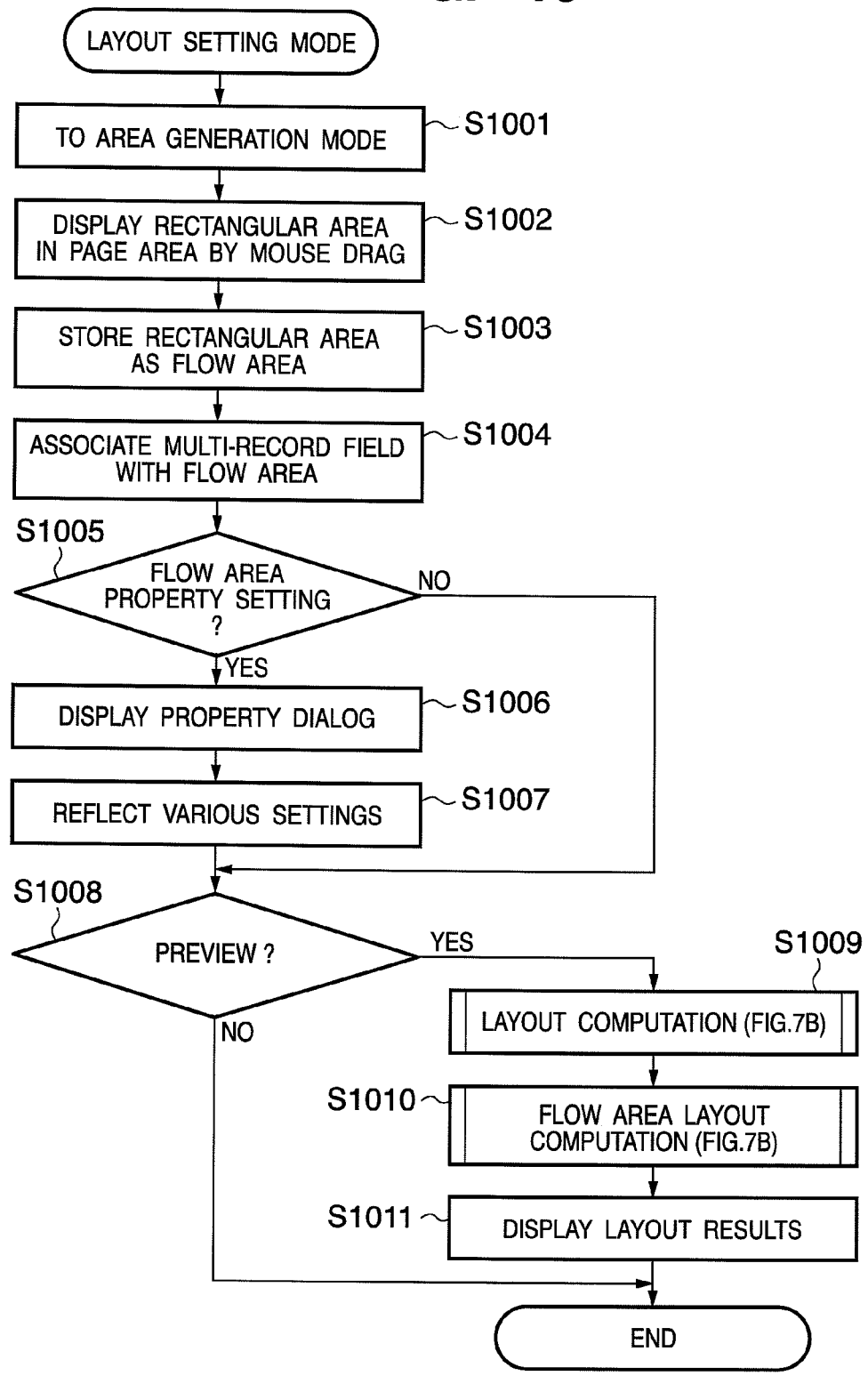
FIG. 10 is a diagram showing the overall flow in a first embodiment of the present invention.
Figure 11:
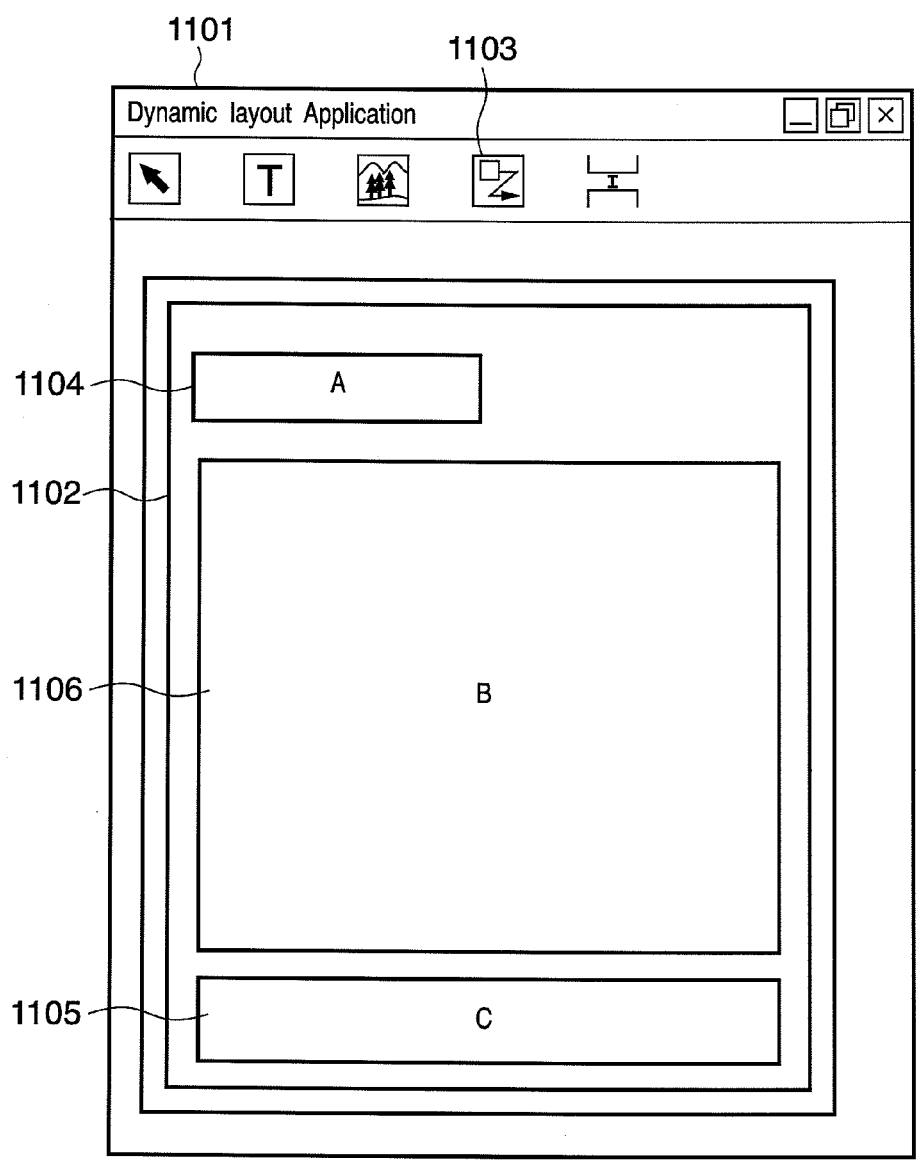
FIG. 11 is a diagram showing an example of a UI corresponding to FIG. 10 in the first embodiment of the present invention.

FIGS. 10 and 11 show the flow of processing in the template generation mode in the layout editing system in accordance with the present invention and an explanatory UI relating to the processing. Steps in the flow shown in FIG. 10 will be described with reference to the UI diagram of FIG. 11. The layout editing application 121 is executed and a user inputs an instruction to generate a new template. An on-screen image shown in FIG. 11 (not including rectangles 1104, 1106, and 1105) is thereby displayed. The procedure shown in FIG. 10 is a procedure in the layout editing application executed from this state according to an instruction from the user.

The layout editing application 121 first recognizes that an icon 1103 shown in FIG. 11 is clicked, thereby makes a transition to the flow area generation mode (S1001), and depicts a rectangle as a flow area by according to user's dragging operation with a mouse in an area 1102 of the page margin (S1002). The layout editing application 121 stores the position and size of the depicted rectangle as the position and size of flow area 1106 and as a portion of template data in the memory unit 136 (S1003). Containers 1104 and 1105 are text container and an image container defined outside the flow area 1106. These containers are irrelevant to processing for arranging contents in the flow area. However, they may be provided as a header and a footer for example. The input positions and sizes of these containers are also stored as a portion of the template data in the memory unit 136. A rectangular UI characteristic such as the color or the kind of line for the flow area 1106 is made different from that of the other containers to make the flow area 1106 easily visually recognizable by the user.

Subsequently, the layout editing application 121 associates a multi-record field with the generated flow area (S1004). This is, for example, processing for inputting identifiers such as a name of a database and a name of a field in records associated with the flow area. Operations for this processing are, for example, determining the target flow area by clicking the flow area and inputting such necessary information according to a certain operation flow. The information is stored in the memory unit 136 as multi-record information in the template data shown in FIG. 24. The information can be input simultaneously with properties input in steps 1006 and 1007.

The layout editing application 121 thereafter determines whether or not various settings will be made on the generated flow area (S1005). In the case of setting properties, the layout editing application 121 recognizes, for example, a click of the mouse pointer on the flow area and displays a property dialog (S1006). The layout editing application 121 then recognizes a setting made by using the displayed property dialog and sets the corresponding property (S1007). The property dialog and the setting method will be described below in detail. Various set information items are stored in the memory unit 136. After the completion of flow area generation and setting, the layout editing application 121 checks whether or not the layout should be previewed (S1008). If the case of preview, the layout editing application 121 makes a transition to the preview mode and performs layout computation (S1009). This layout computation is the same as the flow shown in FIG. 7B.

The layout editing application 121 performs layout computation with respect to the set flow area (S1010). This processing will be described in detail with reference to FIG. 17. The layout editing application 121 finally displays the layout results (S1011). Steps 1009, 1010, and 1011 correspond to steps 0703, 0704, and 0705 in FIG. 7A.

(Flow Area Property Setting)

Figure 12:
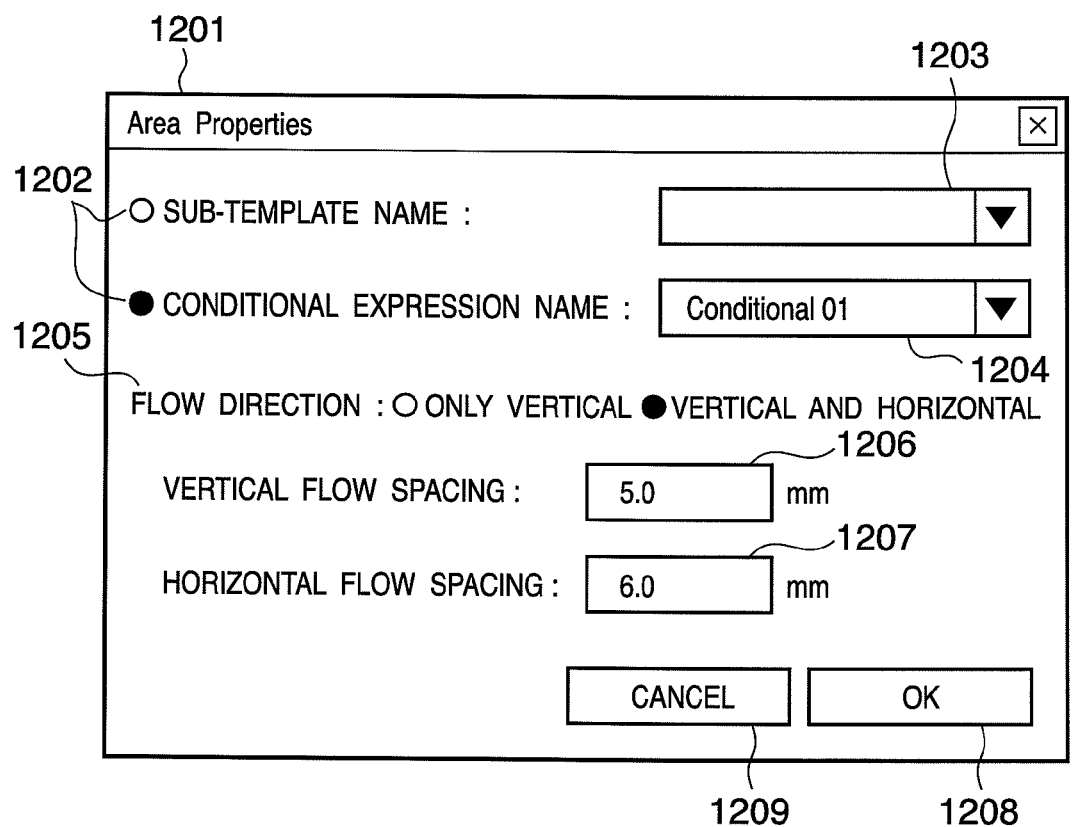
FIG. 12 is a diagram showing an example of a UI for a flow area setting dialog in the first embodiment of the present invention.

FIG. 12 shows an example of a setting dialog for making various settings (property settings) of a flow area. This dialog is displayed in step 1006 of the flowchart of FIG. 10. This is an example of a dialog UI through which details of settings are reflected in S1007. A sub-template and a conditional expression in the following description will be described after the description of the flowchart.

The user first selects a sub-template or a conditional expression as an item associated with the flow area by the radio button 1202. If association of a sub-template is selected, the user designates from a list box 1203 a sub-template to be used in the flow area. Alternatively, if association of a conditional expression is selected, the user designates from a list box 1204 a conditional expression to be used for the flow area. A sub-template and a conditional expression can be separately generated in a document template during editing based on the document template or a predetermined place outside the template by special UI means. Also, a conditional expression can be generated by a UI described below with reference to FIG. 15. A different method may also be used in which conditional expressions are stored in a separate file and the file may be designated from the setting dialog to enable selection from the file. In this embodiment, a plurality of sub-templates and a plurality of conditional expressions can be generated with respect to a flow area in a document template. However, also for a characteristic reason that selection from a list box is made, sub-templates and conditional expressions should be designed so as to have unique names and to be discriminable from each other. Through the setting dialog, a flow direction in which the sub-template is arranged in the flow area (i.e., a direction in which contents are arranged) is also selected from a selection section 1205. A spacing between contents can be set in a setting section 1206 with respect to the vertical direction and in a setting section 1207 with respect to the horizontal direction.

To accept settings made as described above, an OK button 1208 is clicked. When the OK button 1208 is clicked, the settings presently made are stored in the memory unit 136 as flow area information 2401 shown in FIG. 24. For example, flag information as to whether the target flow area is associated with a sub-template or with a conditional expression and information indicating a sub-template name or a conditional expression name (a name of a conditional expression file) in correspondence with the flag information, a flow direction and a spacing are stored as sub-template information 2403 and attribute information 2402. If a cancel button 1209 is clicked, all the designated settings are canceled without being stored.

(Example of Layout on Sub-Template)

Figure 13:
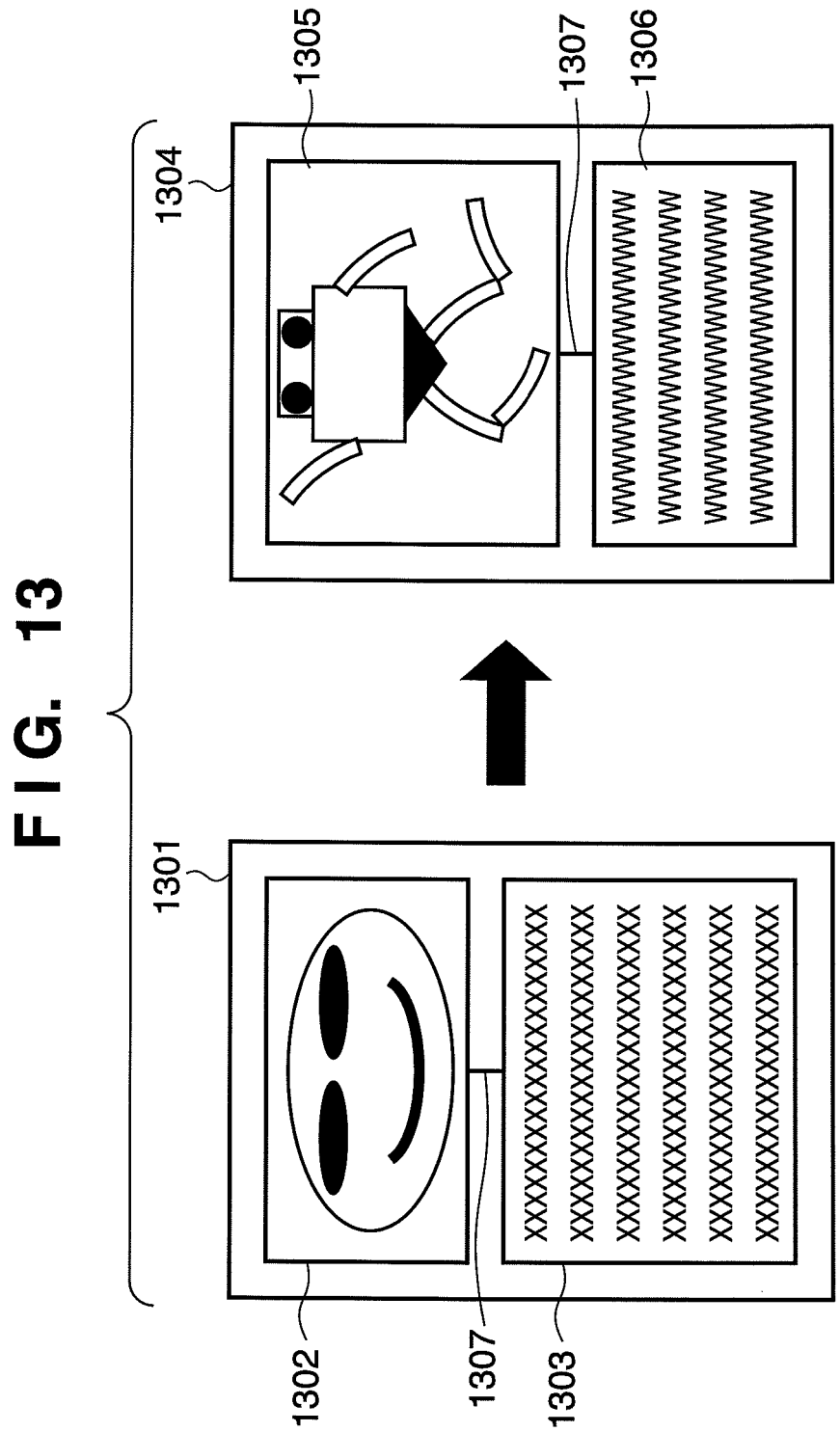
FIG. 13 is a diagram showing an example of a layout on a sub-template in the first embodiment of the present invention.

The above-mentioned sub-template will be outlined. FIG. 13 shows an example of a layout on a sub-template ("a layout on a sub-template" is a layout of data made by using a sub-template, referred to in the same sense below). A sub-template is data on a layout of a certain number of image containers and a certain number of text containers selected as desired and on a setting as to which data (field) in a record is assigned, the data being stored as a template. Such a sub-template is convenient in the case of using one layout a number of times in one document. Containers laid out in a sub-template are the same as the above-described image and text containers, and a link can be set between the containers. Accordingly, the layout computation method shown in FIG. 7B may be applied to containers laid out in a sub-template to change the layout side in an optimum way.

FIG. 13 shows an example of a layout on a sub-template. Reference numerals 1302 and 1305 denote image containers; reference numerals 1303 and 1306, text containers; and reference numerals 1307, links.

Referring to FIG. 13, the sizes of images and texts respectively arranged in the containers laid out in the sub-templates 1301 and 1302 are different from each other. Therefore, the layout is changed by computing an optimum layout with respect to each of records. Therefore, the layouts in the sub-templates 1301 and 1302 have different container (partial display area) positions and sizes, although the same sub-template is used. In the method of layout in the sub-templates, layout adjustment is performed by using the processing described above with reference to FIG. 7B.

(Sub-Template Conditional Expression)

A sub-template conditional expression is capable of selectively assigning a plurality of types of sub-templates to one flow area. The conditional expression is also an expression for extracting contents meeting a condition from a database. In the present invention, therefore, it may be referred to as an extraction condition, and a template having a flow area with which such a conditional expression (extraction condition) is set is generated. One of a sub-template and a conditional expression can be associated with a flow area. If a sub-template is associated with a flow area, an obtained record is arranged in the associated sub-template. A method may also be adopted in which a conditional expression is set at the time of association of a sub-template and only records which meet the conditional expression are arranged in the sub-template associated with a flow area.

Figure 15:
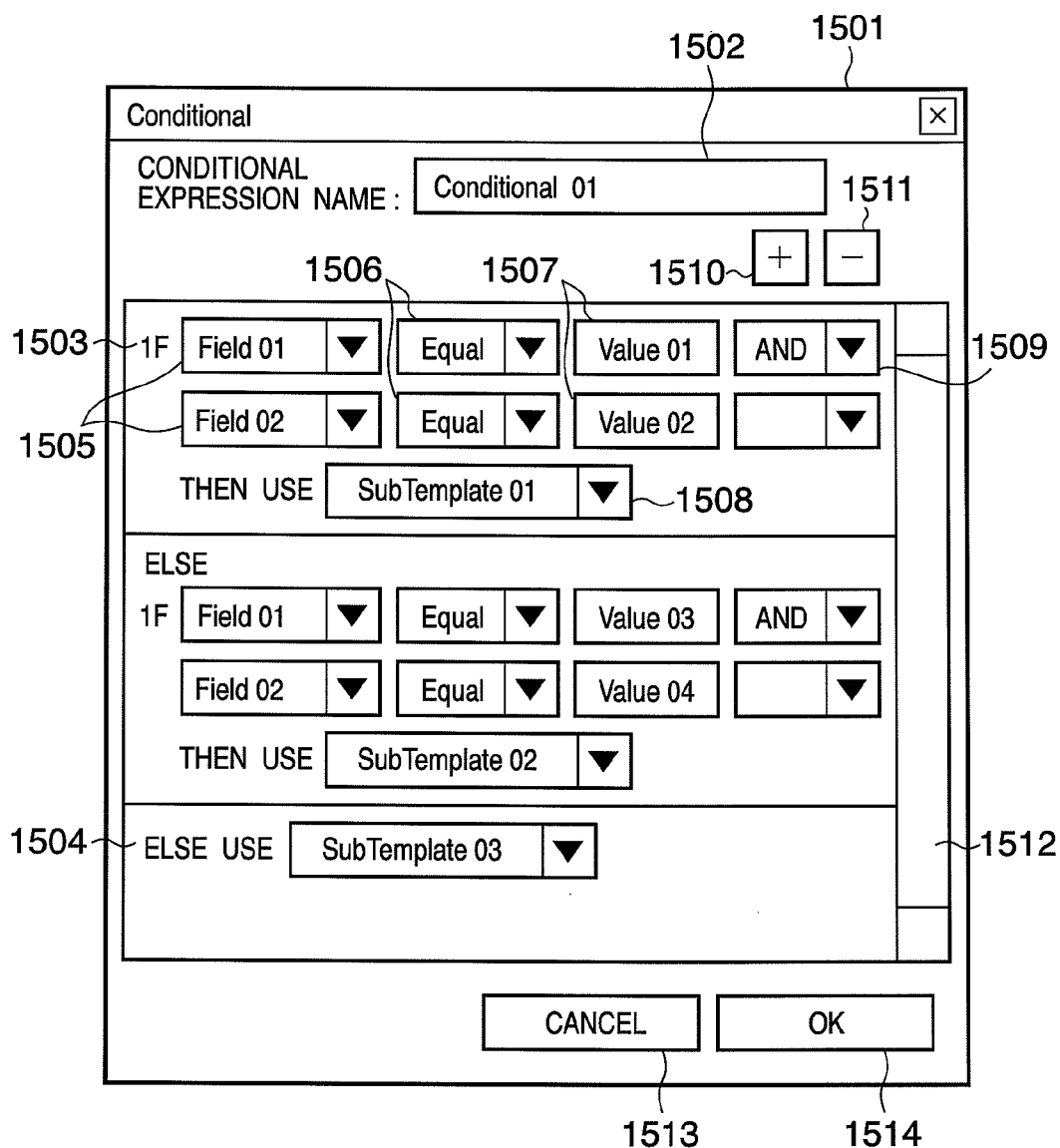
FIG. 15 is a diagram showing an example of an UI for setting a conditional expression in the first embodiment of the present invention.

A conditional expression includes information for identification of a sub-template applied at the time of condition meeting. FIG. 15 shows an example of a UI for setting a conditional expression. Records which meet a conditional expression set for a flow area are associated with a sub-template associated with the conditional expression and are arranged in containers. The sub-template in which the records are arranged is laid out in the flow area.

This input area has at least a text box 1502 in which a conditional expression is named and a pair of IF statement 1503 and ELSE statement 1504, which are elements constituting the most basic conditional decision. An input area for the IF statement includes a list box 1505 for selection from fields to be checked in conditional decision, a list box 1506 for setting logical expressions for decision, a text box 1507 for inputting values used for decision, a THEN_USE processing statement 1508 for determining an operation, i.e., determining a sub-template for insertion of the corresponding record, when the conditional decision result is correct, and an ELSE_USE statement 1504 for determining a sub-template for insertion of the corresponding record when the conditional decision result is incorrect. As logical expressions 1506 for decision, variable conditions such as "EQUAL", "NOT_EQUAL", "LESS_THAN", "LARGER_THAN", "START_WITH" and "END_WITH" are prepared.

To set a complicated conditional expression, an AND/OR conjunction statement combo box 1509 for setting a composite condition in the IF statement is provided. If an AND or OR composite condition is selected in this combo box, a one condition row is added in the IF statement. Only when all of a plurality of conditions are correct in the case of AND, or only when one of the conditions is correct in the case of OR, the result of IF statement decision is true. To set a more complicated conditional branch, an ELSE_IF statement addition button 1510 is provided. When the button 1510 is clicked, an ELSE_IF statement is newly added and inserted between the above-mentioned IF statement and ELSE statement. The contents and operation of ELSE_IF statement are the same as those of the IF statement. Decision processing is performed in sequence as described below. When the result of decision with the IF statement is incorrect, decision with the immediately subsequent ELSE_IF statement is made. When the result of decision with this statement is incorrect, decision with the further subsequent ELSE_IF statement is made. This operation is repeatedly performed and decision with the ELSE statement is finally made. Reference numerals 1511 denote a deletion button for deleting the selected ELSE_IF statement. In a case where the number of ELSE_IF statements is increased, a list of conditions can be displayed by using a scroll bar 1512. If the result of decision with one of the IF and ELSE_IF statements is true, a corresponding USE processing statement is executed. A sub-template name is input (selected) to the USE processing statement. Thus, a sub-template meeting a condition can be automatically selected by means of a conditional expression with respect to each of records taking various values, and various layouts can be realized by means of one conditional expression. This conditional expression is associated with a flow area to enable a plurality of types of sub-templates having various layouts to be laid out in the one flow area.

The user inputs the condition and finally clicks the OK button 1514. When the OK button 1514 is clicked, the information indicating the sub-template condition set in the UI is stored in the memory unit 136 as a portion of sub-template information 2403. As this sub-template conditional expression, information enabling determination of a condition and a sub-template when the condition is satisfied, e.g., a text file in which the text described (selected) in the UI shown in FIG. 15 is stored in its very form may suffice. In the case of the example shown in FIG. 15, "IF field01 EQUAL value01 AND field02 EQUAL value02 THEN USE subtemplate01 ELSE IF field01 EQUAL value03 AND field02 EQUAL value04 THEN USE subtemplate02 ELSE USE subtemplate03" is stored as information indicating a sub-template conditional expression. Since the information is described in conformity with a simple grammar, and since it is input through a UI such as shown in FIG. 15, it is not susceptible to grammatical error or the like even if it is stored in its very form. Therefore the description of the condition can be parsed to by a simple program to determine a sub-template which meets the condition.

Thus, a condition for extracting contents data to be laid out from a database and a sub-template which is used if it meets the condition are stored in a conditional expression while being associated with each other. Therefore the conditional expression is held in the memory unit 136 as association information as to in which subtemplate extracted contents data should be laid out. Also, since a plurality of conditional expressions can be set as described above, sub-templates respectively associated with extracted contents data items exist. As a result, a plurality of types of sub-templates in which contents data items are laid out are laid out in a flow area.

<Flow Area Layout Method>

Figure 17:
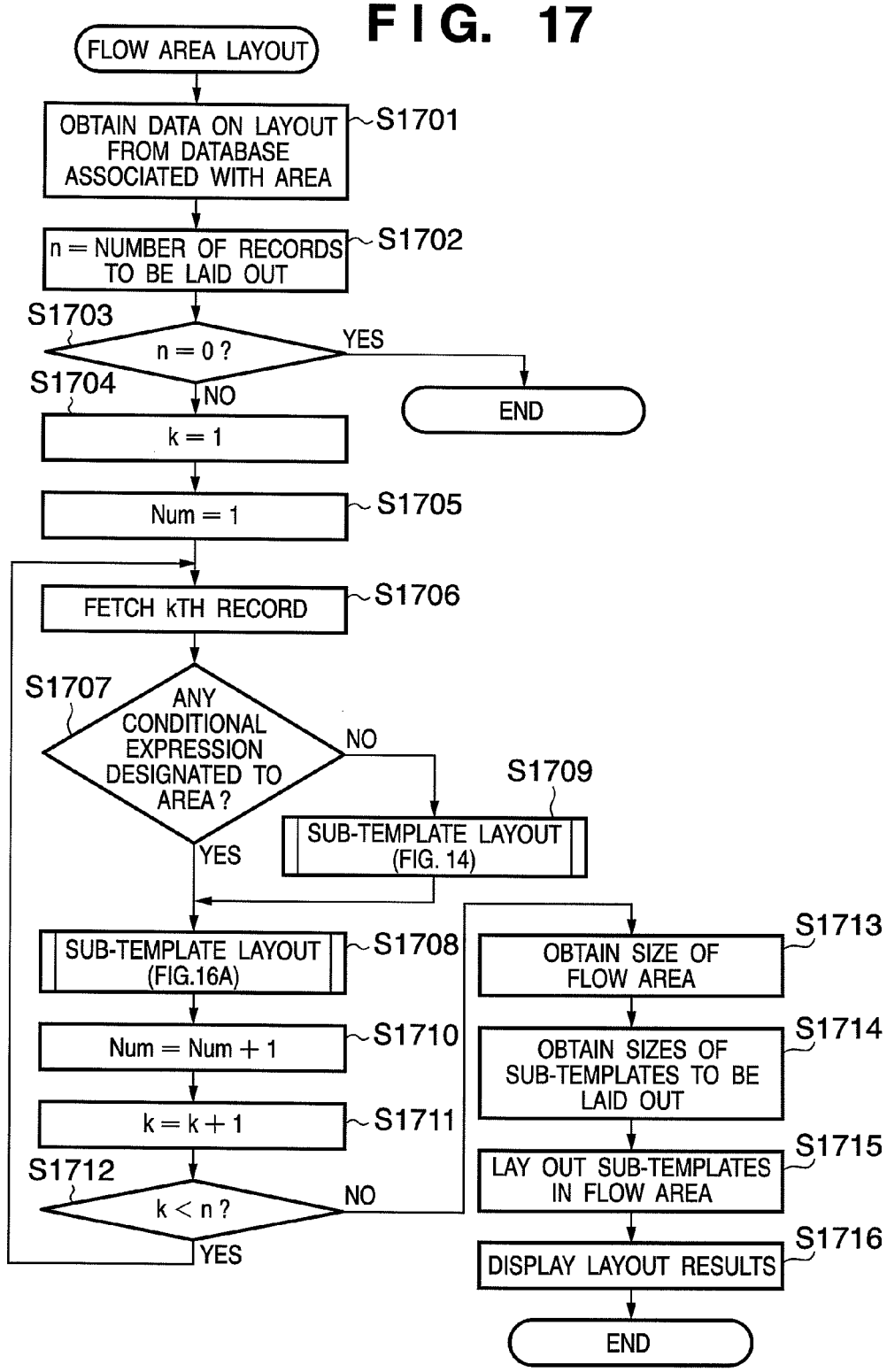
FIG. 17 is a diagram showing an example of a flow of computation of layout in a flow area in the first embodiment of the present invention.

FIG. 17 shows the flow of computation for layout in a flow area by the layout editing application program 121. The procedure shown in FIG. 17 is executed in step 1010 shown in FIG. 10 and step 0704 shown in FIG. 7A. Description will be made of a case where one flow area is set. With respect to a template in which a plurality of flow areas are set, the procedure from S1701 to S1715 may be repeated with respect to each flow area.

The layout editing application program 121 obtains data for layout from a database associated with a flow area (S1701) and substitutes for n the number of records to be laid out (S1702). More specifically, a user interface which is one of the modules constituting the layout editing application communicates with the database containing records to be laid out to recognize the number of records to be laid out.

If the number of records to be laid out is 0, there is no need for layout processing and, therefore, the process ends immediately (S1703). Subsequently, the layout editing application 121 substitutes 1 for a variable k for checking records to check the records from the first record (S1704). The layout editing application 121 also substitutes 0 for a variable Num for the number of sub-templates to be laid out (S1705). The layout editing application 121 then reads out data in the kth record from the database (S1706). Contents data in the record read out is temporarily stored in the memory unit 136.

The layout editing application 121 determines whether a sub-template is associated or a conditional expression is associated, by referring to flow area information 2401 relating to the target flow area (S1707). If a conditional expression is associated, the layout editing application 121 lays out the kth record in conformity with a sub-template based on a flow chart of FIG. 16A described below (S1708). According to the procedure shown in FIG. 16A, if a sub-template is associated with the flow area, the corresponding sub-template information is read out. If a conditional expression is associated, it is evaluated in step 1708, a sub-template thereby obtained is read out, and the kth record is laid out in conformity with the sub-template read out. On the other hand, if it is determined that no conditional expression is associated with the flow area, the kth record is laid out in conformity with a sub-template associated with the flow area according to the flowchart shown in FIG. 14 (S1709). The data laid out in conformity with the sub-template in step 1708 or 1709 is stored in the memory unit 136 before it is arranged in the flow area. The relative positional relationship between containers and the size and contents of the containers after arranging the contents, obtained as layout computation results, are stored. For example, a suitable coordinates origin point is determined on the sub-template, and information on the positions and sizes of the containers indicated on the coordinate system is stored. Information on the positions of the contents on the same coordinate system and data laid out at the corresponding positions to include in the container is stored together with the information on the container positions and sizes. These items of information will be referred to as contents-laid-out sub-template information.

After the completion of layout in the sub-template, the layout editing application 121 increments the variable Num by one (S1710) and increments the variable k by one to advance the process to processing on the next data (S1711). The layout editing application 121 then compares k with the number of data groups n to be recorded (S1712). If k is smaller than n, the process advances to step 1706 to repeat processing on the kth data. If n is equal to or larger than n, the layout on the sub-template is completed and the process advances to processing for laying out sub-templates laid out in the flow area.

To lay out the sub-templates in the flow area, the layout editing application 121 obtains the size of the flow area from flow area information 2401 (S1713) and obtains the sizes of the sub-templates to be laid out (S1714). More specifically, since each sub-template on which contents data should be laid out is determined by processing shown in the flowchart of FIG. 16 described below, and since the results of execution of processing for optimization of layout in the sub-template are stored in the memory unit 136, the sizes of the sub-templates to be laid out can be obtained. In this embodiment, the size of the external frame of each sub-template is determined by the sizes of containers in the sub-template. That is, because of processing of free layout in each sub-template, the size of the sub-template after layout in the sub-template varies depending on the contents of records. Since the results of layout of records arranged in the sub-templates are held in the memory unit 136 as described above, the layout editing application 121 can obtain the sizes of the sub-templates to be laid out. Some user may want to make constant the external frame sizes of sub-templates. Therefore selection as to whether the external frame sizes of sub-templates are fixed or made variable may be enabled by predetermined processing.

The layout editing application lays out in the flow area the laid-out sub-templates having contents data laid out by applying the flow direction and the flow spacing set in flow area information 2401 (S1715). The flow direction is a method of laying out the sub-templates and the flow spacing is a spacing between the sub-templates. Layout in the flow area is performed according to the contents-laid-out sub-template information stored in step 1708 and step 1709. That is, to be more specific, the positions and sizes of containers and the positions and details of contents relatively defined on the coordinate system in each contents-laid-out sub-template are converted into coordinates in the coordinate system of the flow area. At this time, if one or more of the contents-laid-out templates cannot be accommodated in the flow area, there is a need to make size reduction conversion of the sub-templates. If it is undesirable to make size reduction conversion of the sub-templates, a page repeat function described below may be used to avoid the reduction conversion.

(Layout on Sub-Template (Without Conditional Expression))

Figure 14:
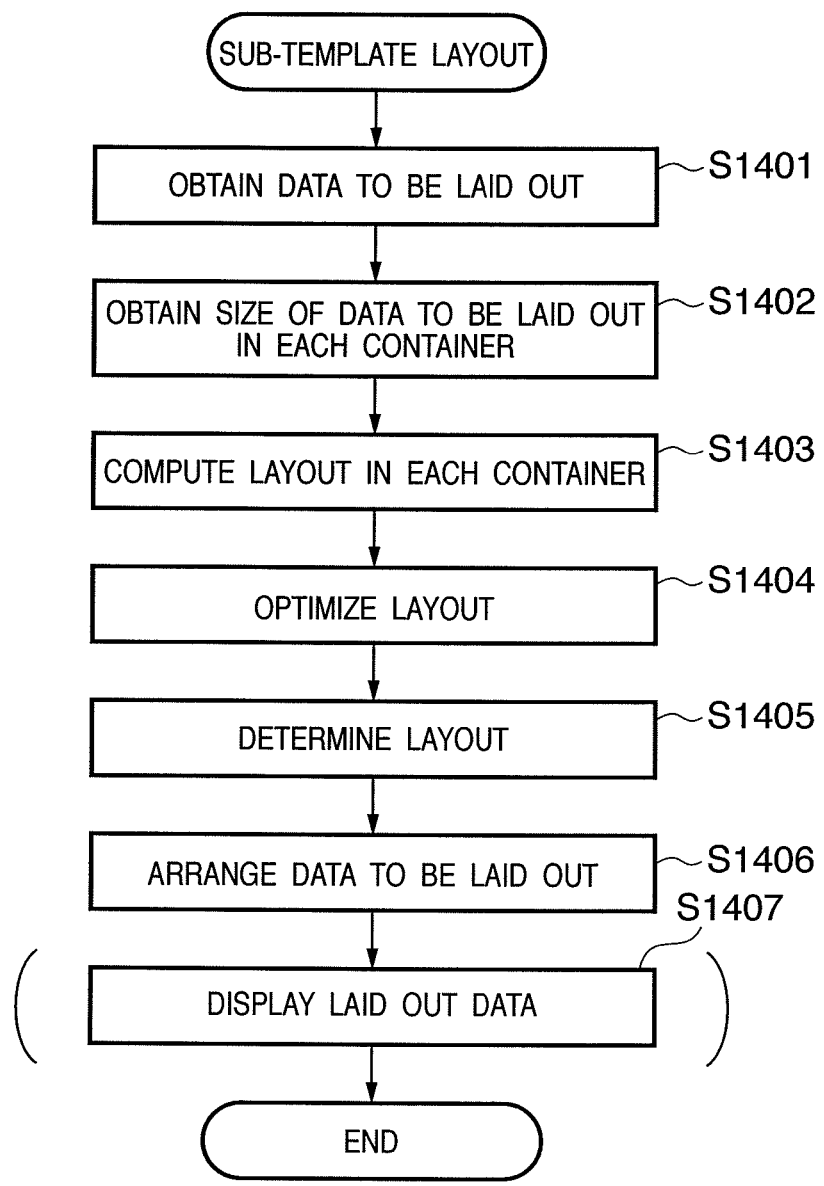
FIG. 14 is a diagram showing an example of a flow of layout on a sub-template in the first embodiment of the present invention.

FIG. 14 shows the flow of processing for layout on a sub-template performed in step 1709. Referring to FIG. 14, the layout editing application first obtains data for layout from the database (S1401) and obtains the size of contents data to be laid out in each of containers in the sub-template (S1402). More specifically, a user interface which is one of the modules constituting the layout editing application 121 performs processing for association with a database to enable reference to data in the database. The size and so on can be obtained by interpreting the data. Operations in steps 1401 and 1402 may be performed simultaneously with each other. In processing in step 1402, the layout editing application 121 analyzes information in the data obtained in step 1401. The obtained size of the contents data is held in the memory unit 136.

The layout editing application performs layout computation with respect to each container on the basis of the data sizes obtained in step 1402 (S1403) to optimize the layout (S1404). A method for optimization is executed by using the processing shown in FIG. 7A, as described above.

The layout editing application 121 determines the layout optimized in step 1404 (S1405), arranges the data to be laid out (S1406) and displays the laid-out data (S1407). The layout determined in step 1405 is temporarily stored in the memory unit. If display in step 1407 is performed at a time when the document is completed, step 1407 is unnecessary.

(Layout on Sub-Template (with Conditional Expression))

Figure 16A:
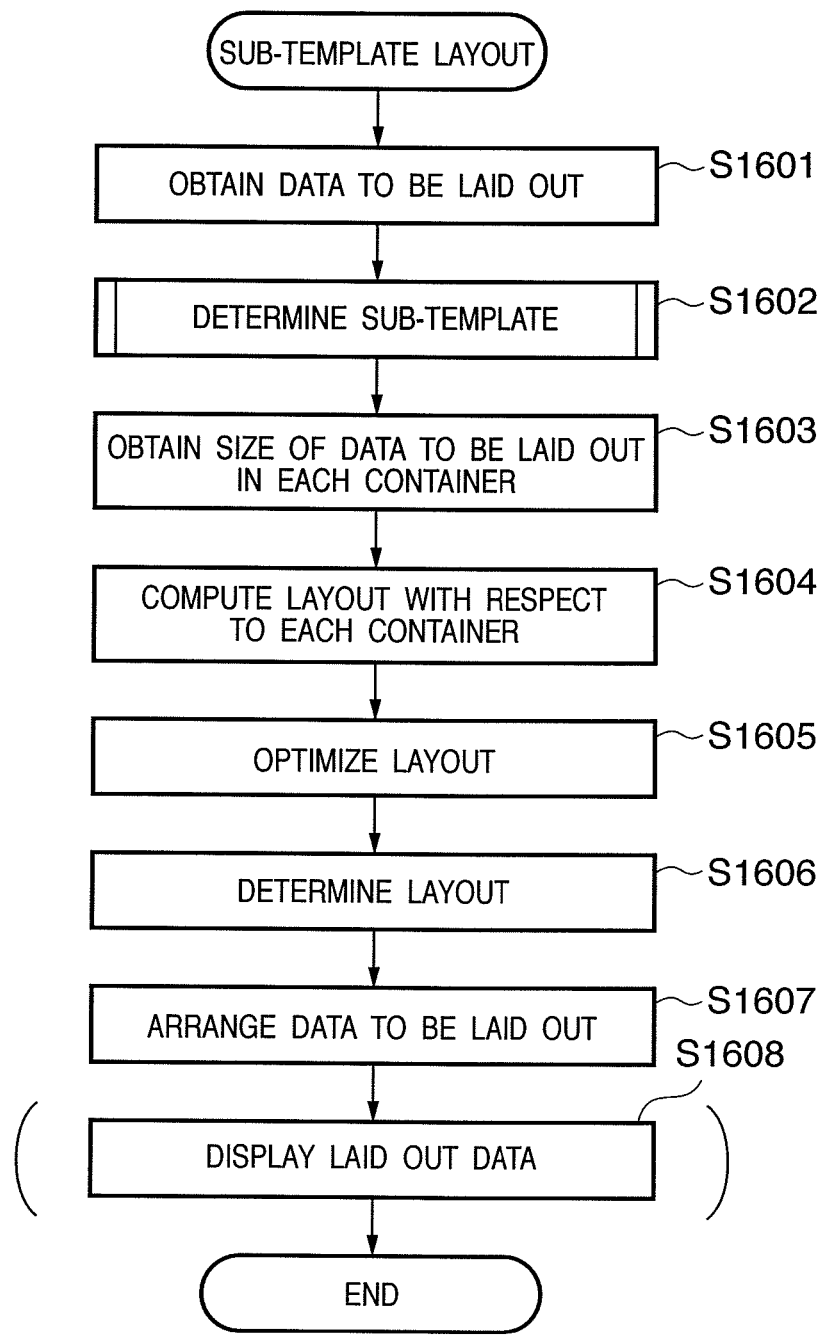
FIG. 16A is a diagram showing an example of a flow of decision with a conditional expression in the first embodiment of the present invention.
Figure 16B:
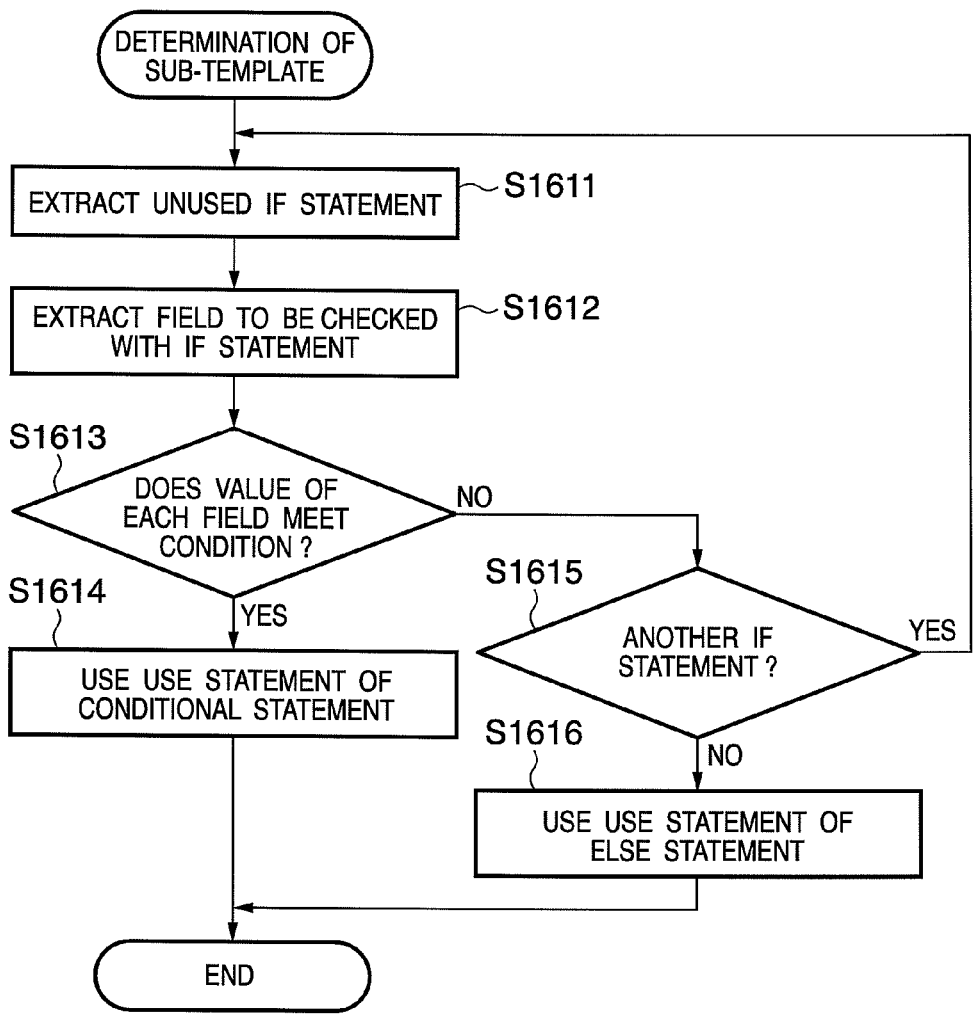
FIG. 16B is a diagram showing an example of a flow of decision with a conditional expression in the first embodiment of the present invention.

FIGS. 16A and 16B are flowcharts showing processing for selecting a sub-template for insertion of records from a database by making conditional decision in a case where a conditional expression is set with respect to a flow area in step 1708 in FIG. 17.

Referring to FIG. 16A, the layout editing application 121 first obtains data for layout from the database (S1601).

Subsequently, the layout editing application 121 determines a sub-template on which data is laid out (S1602). If contents data in the record presently checked does not meet the condition set with respect to the flow area, the next data is checked without laying out the preceding record. That is, a record having contents data meeting the conditional expression is treated as a record to be laid out. This step will be described below in detail with reference to FIG. 16B.

Subsequently, the layout editing application 121 delivers the size of data to be laid out in each container (S1603). More specifically, the layout editing application analyzes the data obtained in step 1601 to recognize the size of the data to be laid out and associates the size of the data with the container, thus performing processing in step 1603.

The layout editing application 121 performs computation of the layout in each container on the basis of the data size delivered in step 1603 (S1604) to optimize the layout (S1605). The same optimization method as that described above is carried out to perform adjustment according to the size of the contents data.

The layout editing application 121 determines the optimized layout (S1606), arranges the data to be laid out (S1607), lays out the data in the flow area and displays the data (S1608). If display is performed at a time when the document is completed, step 1608 is unnecessary.

FIG. 16B is a flowchart showing details of processing in step 1602 shown in FIG. 16A as a step of determining a sub-template.

The layout editing application 121 reads a sub-template conditional expression file on the basis of flow area information 2401 with respect to the target flow area, extracts the first IF statement of a conditional expression (S1611), and extracts the value of a field on which decision is made with the IF statement from the record received in step 1601. The value of the field of each record obtained from the database may be obtained by performing communication with the database. Alternatively, the value of the field of each record may be held in the memory unit 136 and extracted by the layout editing application referring to the memory unit 136.

The layout editing application 121 determines whether or not the value of each field extracted in step 1612 meets the condition extracted in step 1611 (S1613). That is, since the conditional expression is held in the memory unit 136, the layout editing application 121 can perform evaluation with the concrete field value by referring to the memory unit, thereby performing decision processing described as step 1613.

If the layout editing application 121 determines that the conditional expression set with respect to the flow area and the field value extracted as a decision target coincide with each other, that is, the evaluation result is true, it selects USE processing corresponding to the condition and stores in the memory unit 136 (sub-template information 2403) the sub-template name described therein (S1614). By this processing, the sub-template on which the contents data in the record presently checked and determined to meet the conditional expression should be laid out are associated and held. This associated information is also held in the memory unit as one of the above-described association information items.

If the layout editing application 121 determines noncoincidence in step 1613, it then determines whether or not another IF statement exists (S1615). If another IF statement exists, the layout editing application 121 enters processing in step 1611 so continue decision with the IF statement. With respect to a record not meeting any IF statement to the last, USE processing of the ELSE statement is selected and a corresponding sub-template name is stored (S1616).

In processing shown in FIG. 16B, a record not meeting the condition is also arranged in a sub-template because step 1616 exists. However, if no sub-template to be used is designated in the ELSE statement, arranging of a record not meeting the condition in any sub-template may be inhibited. That is, designation of no sub-template to be used in the case of ELSE has the effect of restricting records arranged in sub-templates to those meeting the conditional expression set with respect to the flow area.

In a case where a conditional expression enabling use of a plurality of sub-templates is set, a plurality of types of contents-laid-out sub-templates are laid out in the flow area by the above-described processing. Further, a conditional expression capable of selection between arranging all obtained records in a sub-template and arranging only records meeting the conditional expression in the sub-template is conceivable.

Figure 18A:
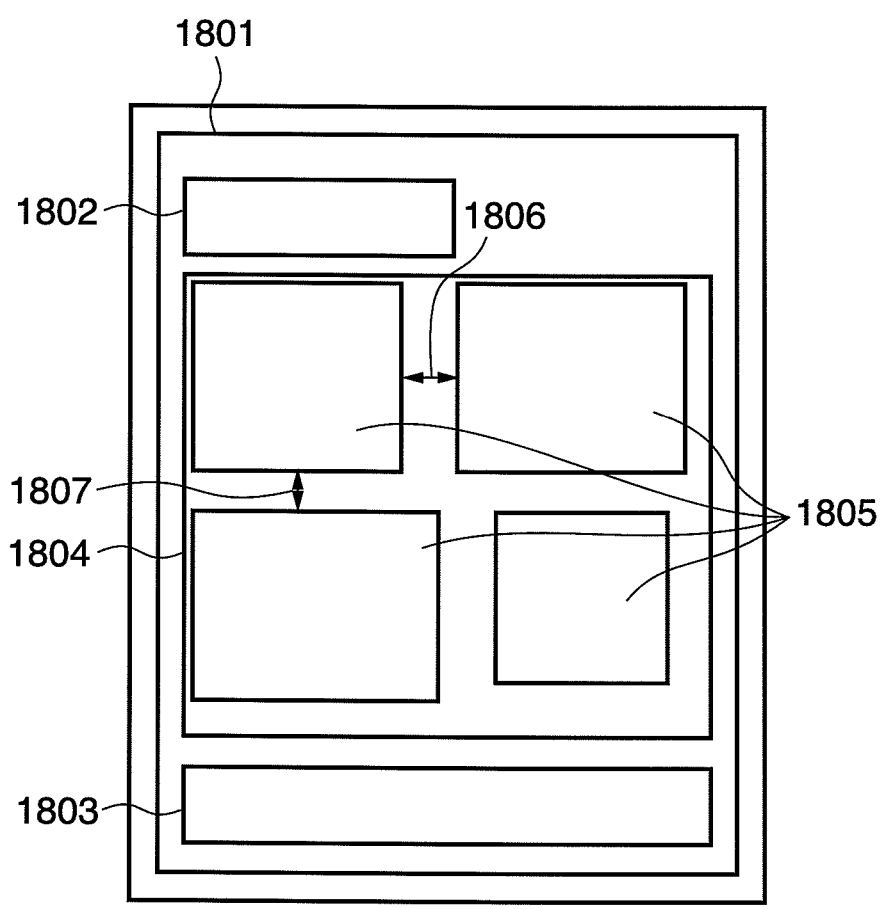
FIG. 18A is a diagram showing an example of a layout on a sub-template in the first embodiment of the present invention.

FIG. 18A shows an example of a layout of sub-templates in a flow area. In FIG. 18A, reference numeral 1801 denotes a page margin; reference numerals 1802 and 1803, fixed containers; reference numeral 1804, a flow area; reference numerals 1805, sub-templates; reference numerals 1806, a horizontal flow spacing; and reference numeral 1807, a vertical flow spacing. Four sub-templates are laid out in the flow area. The sub-templates are laid out from a starting point at the upper left corner of the flow area while leaving a suitable flow spacing set in the above-described flow area setting dialog.

Each sub-template used in the flow area is obtained as a result of processing using a conditional expression. Detailed layout designs in the sub-templates have different layout results since the contents data in records arranged in the sub-templates vary in size.

Figure 18B:
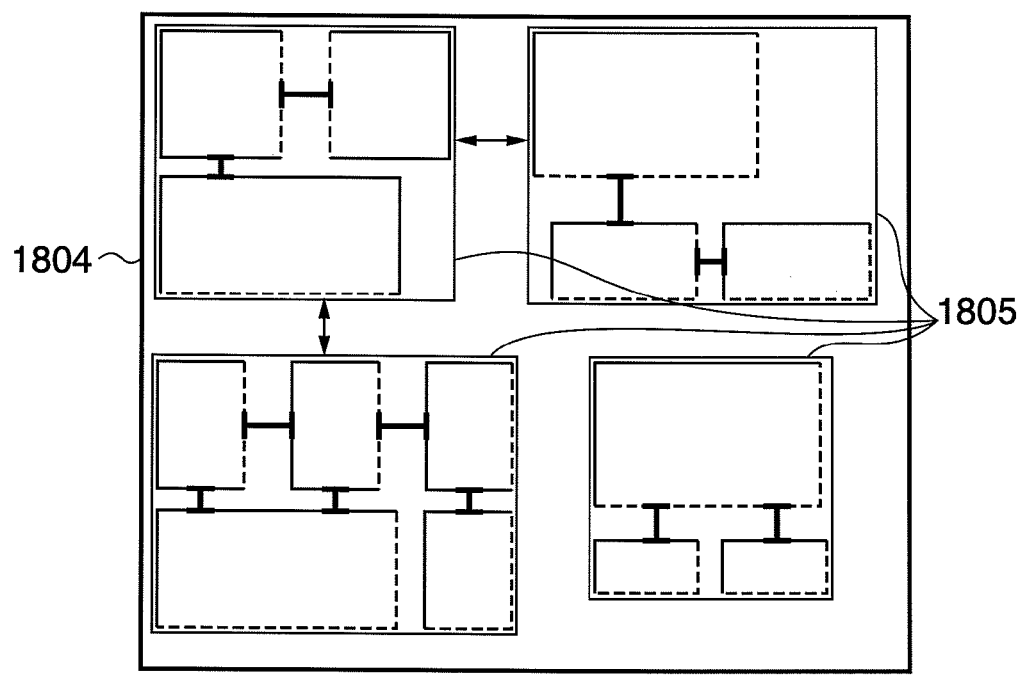
FIG. 18B is a diagram showing an example of a layout on a sub-template in the first embodiment of the present invention.

FIG. 18B shows a state of flowing in the flow area of various sub-templates obtained on the basis of such a conditional expression. In the flow area indicated by 1804, detailed layouts in sub-templates indicated by 1805 are shown. Thus, the size of the flow area is fixed regardless of the number of sub-templates laid out therein. If there is a sub-template having a laid-out size such as to overflow the size of the flow area, the overflowing portion is clipped and not displayed. The layout results are finally displayed and the process ends (S1716).

If it is determined that the sub-template overflows the flow area, it is conceivable to reduce the size of the sub-template so that the sub-template can be set within the flow area. Therefore, a dialog for designation as to whether clipping processing or reduction processing will be performed may be displayed when it is determined that the sub-template overflows the flow area. FIG. 18B shows a state in which four types of contents-laid-out sub-templates are laid out.

Through the above-described procedure, the desired sub-templates for layout of the records to be laid out in the flow area can be designated according to the value of the desired field in the records. Therefore, the degree of freedom of layout of objects in a document is improved, thus enabling preparation of a document of high quality.

Also, since a conditional expression can be used to make a setting for the flow area as to whether all records or only records meeting the conditional expression should be arranged, a layout required by a user can easily be made.

Figure 25A:
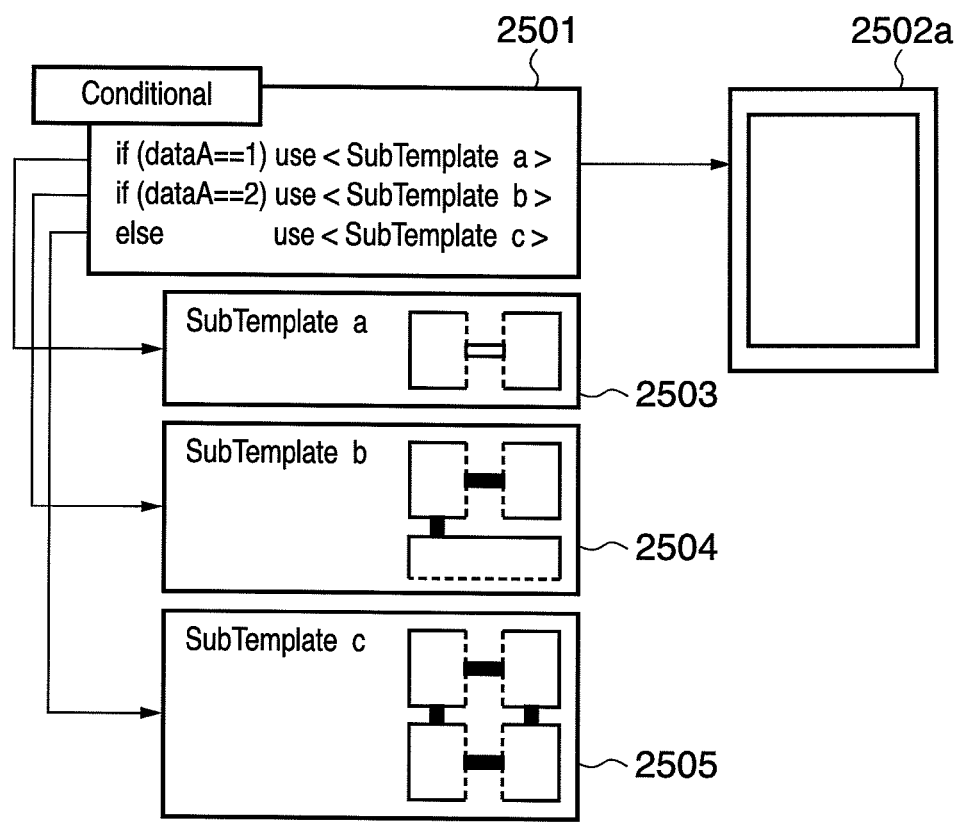
FIG. 25A is a diagram for explaining the operation of the layout editing system in the first embodiment of the present invention.
Figure 25B:
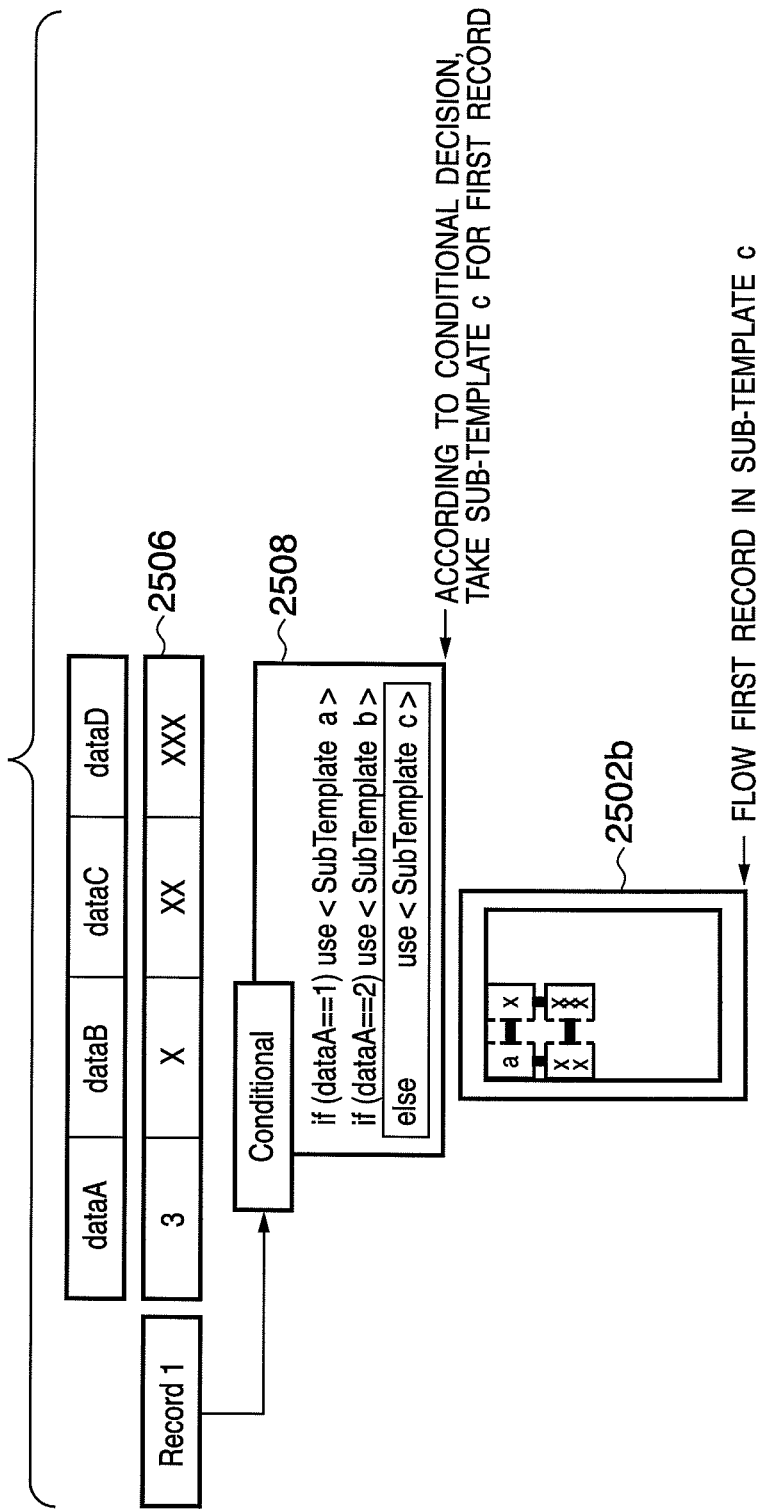
FIG. 25B is a diagram for explaining the operation of the layout editing system in the first embodiment of the present invention.
Figure 25C:
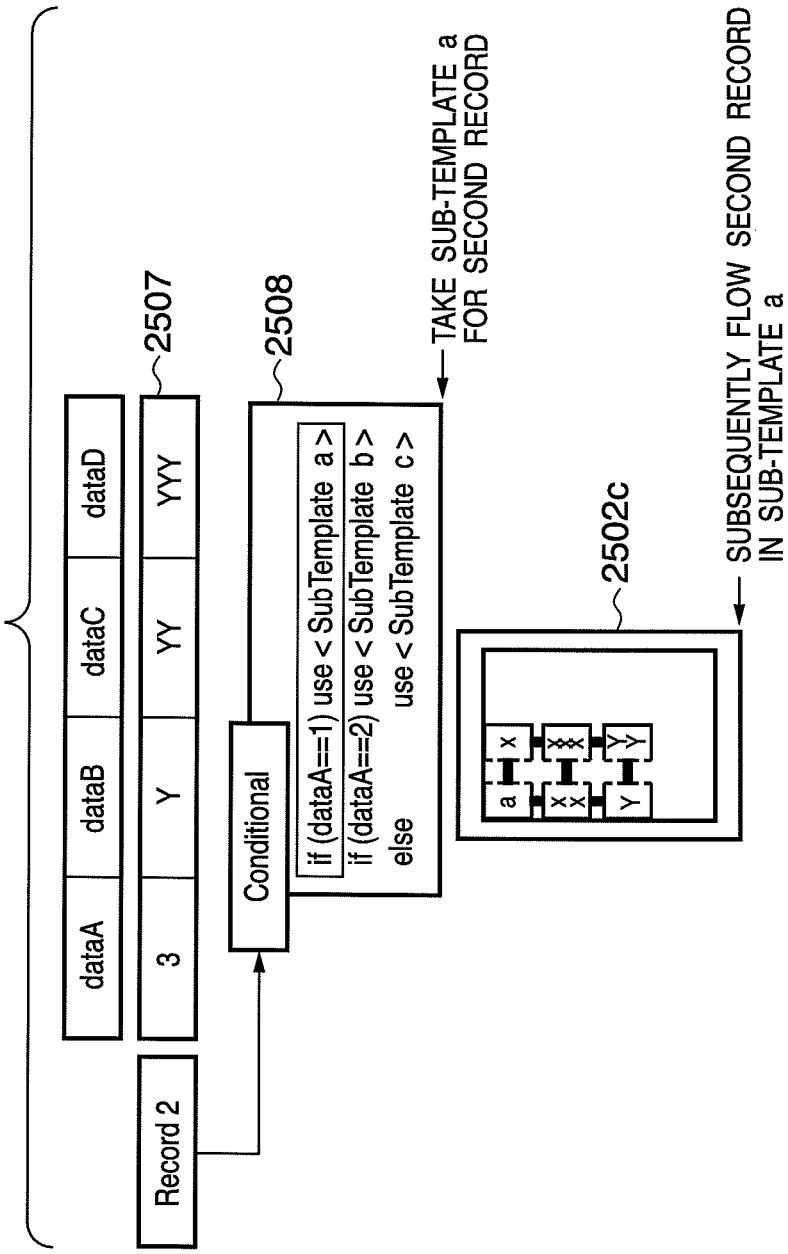
FIG. 25C is a diagram for explaining the operation of the layout editing system in the first embodiment of the present invention.

FIGS. 25A to 25C show a concrete example. In a template 2502a in which a flow area shown in FIG. 25A is defined, a conditional expression 2501 is associated with the flow area. The conditional expression 2501 is stored as sub-template information 2403. According to this conditional expression 2501, a sub-template 2503 is used for a record if field data A in the record is 1, a sub-template 2504 is used for the record if field data A is 2, and a sub-template 2505 is used for the record in other cases. Records 2506 and 2507 are contained in a layout-object database.

Record 2506 is first fetched, as shown in FIG. 25B. In this case, processing is performed according to the procedures shown in FIGS. 17, 16A, and 16B. That is, the conditional expression "field data A=1" is first evaluated. Because this condition is not true, "field data A=2" is then evaluated. Also, this condition is not true. Consequently, record 2506 is laid out by using the sub-template 2505 according to the USE statement in this case. This is an example of layout 2502b. According to the procedure shown in FIG. 17, however, arranging of the sub-templates in the flow area is performed after layout of all the records. Therefore a preview display such as shown in FIG. 25B is not produced.

Subsequently, record 2507 is fetched. In this case the conditional expression "field data A=1" is true. Therefore the record 2507 is laid out by using the sub-template 2503 according to the USE statement corresponding to this case.

Processing for decision on records 2506 and 2507 is thus completed to determine the sub-templates in which the records should be arranged. A layout 2502c is then obtained by adjusting, in associated containers in the sub-templates, layouts of contents data actually contained in the records. Thus, sub-templates which may be changed on a record-by-record basis can be used on the basis of a conditional expression set by a user.

[Second Embodiment]

Conventionally, a flow area is restricted to the area of one page and is intended to realize a layout result according to a space-limited document such as a postcard by performing processing for setting a sub-template within the area of one page. Accordingly, no consideration is given to laying out a sub-template over a number of pages. However, a situation is conceivable in which, from a need for preparing documents on a customer-by-customer basis, a document having the number of pages freely changed according to the range of customer's interest without being limited to a fixed number is prepared.

A second embodiment of the present invention will be described with respect to an automatic layout system including a method of automatically generating a new page having a flow area if a sub-template overflows the flow area when the sub-template is laid out in the flow area, and continuously laying out the overflow portion of the sub-template on the new page. Such a function will be referred to as a page repeat function.

This method is advantageous in that if one flow area is defined, all records in a database associated with the flow area can be processed to be laid out according to the definition of the flow area and combined into one document. The description for the same components of the second embodiment (figures and explanation of the figures) as those of the first embodiment will not be repeated.

<Repeated Page in Plurality of Pages>

Figure 19:
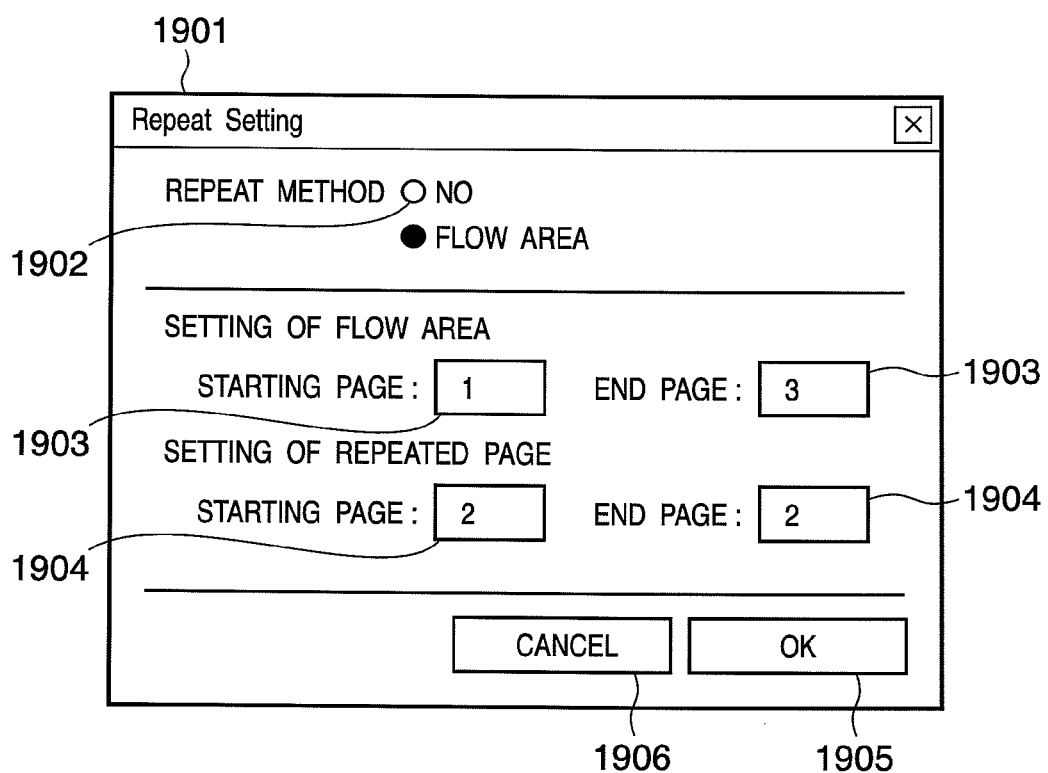
FIG. 19 is a diagram showing an example of a UI for setting a flow area extending over a plurality of pages.

FIG. 19 shows an example of a UI for a setting dialog evoked at the time of insertion of a flow area in a document having a plurality of pages in the template generation mode. ON/OFF of a flow area is selected from a radio button 1902. In the case of ON, page numbers for pages where the flow area is laid out are set in text boxes 1903. The UI has such input restrictions that a starting page number is 1 or any subsequent number and an end page number is equal to or smaller than the maximum page number of the document.

Further, a repeated-page range through which the sub-template is flowed by repeating generating an instance in the laid-out flow area is set in text boxes 1904. A repeated page will be described below. The UI has such input restrictions that a starting page number for a repeated page is larger than the starting page number for the flow area, and an end page number for the repeated page is or smaller than the end page number for the flow area. The UI also has such an input restriction that at least one repeated page exists necessarily. The reason for the above restrictions is that a header and a footer which cannot be adapted to page repeat may be contained in head and tail portions of the document.

That is, at least one non-repeated page exists in the range from the flow area starting page to the page immediately preceding the starting page in the repeated-page setting. Also, at least one non-repeated page exists in the range from the page subsequent to the end page in the repeated-page setting to the end page of the flow area.

When OK is clicked in the setting dialog, the flow area is inserted in each page according to the set page range, and information on this state is stored in the memory unit 136 as information on a plural-page template for combining a plurality of pages into one groups.

A group of pages can be treated as one group, for example, by providing information for identification of the group in template information. A flow area repeat flag indicating the set radio button 1902 and various page settings are stored in the memory unit 136 as a portion of flow area information 2401 on a page-by-page basis. However, attributes information, sub-template information and multi-record information except the flow area position are the same with respect to each page. In the information other than the flow area position, therefore, information set with respect to the top page for example is referred to with respect to templates belonging to one group.

<Control of Position of Flow Area>

A flow area laid out over a plurality of pages can occupy its position and size on each page. FIG. 20 shows an example of a UI for adjusting the position and size of a flow area on each page. Reference numeral 2001 denotes a margin area. The flow area indicated by 2004 is displayed in an expression with a certain kind of line and a color different from those for ordinary containers such as to be easily discriminable as described above. However, the size of the flow area can be changed by a size changing handle 2003, which is a well-known ordinary element in a piece of figure drawing software in the layout edit area as in FIG. 20. It is appropriate to restrict within the margin area the area in which the flow area can exist. When the flow area size is changed, the changed size is stored as flow area information in the memory unit 136.

<Repeated Page>

Figure 21A:
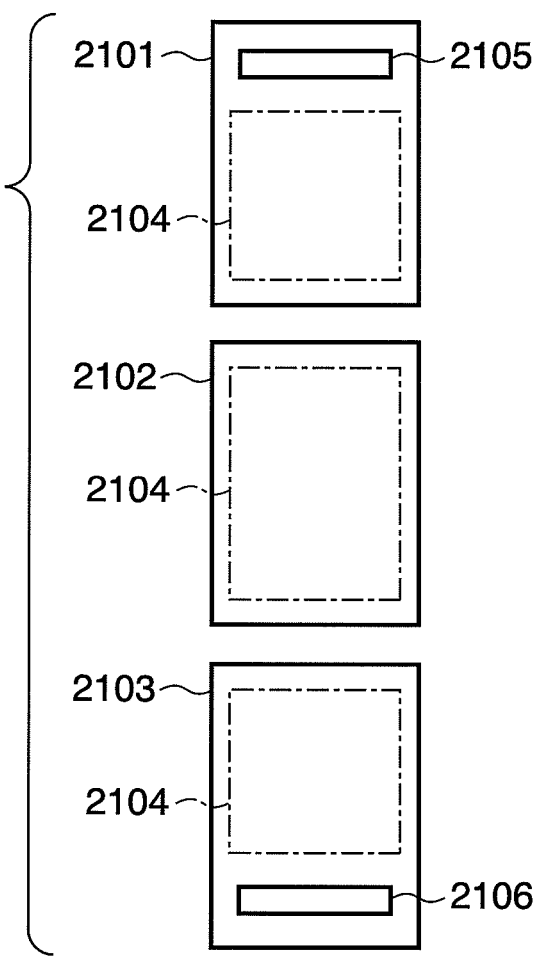
FIG. 21A is a diagram schematically showing a repeated flow area and a state where data is inserted in the flow area.

FIGS. 21A to 21B are diagrams schematically showing a state in which a flow area is laid out through a plurality of pages of one document, and a state in which content-laid-out pages are generated when actual data is inserted in the flow area.

Reference numeral 2102 in FIG. 21A denotes a page to be repeated. Reference numerals 2101 and 2103 denote pages which are not pages to be repeated, but on which a flow area exists. Reference numerals 2104 denote the flow area. That is, the template shown in FIG. 21A is formed according to the example shown in FIG. 19. Reference numerals 2105 and 2106 denote ordinary containers. These ordinary containers are not related to the flow area. The ordinary containers have contents associated with them and do not undergo multi-record processing.

The flow area 2104 extends over a plurality of pages but it is treated as one continuous area by the layout processing application. That is, flow area information other than the position and size of the flow area is referred to in common. That is, when a designation is given to repeat the flow area, it is necessary for the user to define a plural-page template corresponding to designated pages. At this time, attributes except the position of the flow area are common to the plurality of pages.

According to this arrangement, all of records in a database, inserted as actual data, are laid out by using the entire flow area extending over three pages 2101 to 2103 in the example shown in FIG. 21A.

FIG. 21B shows a state in which a contents-laid-out document is obtained by inserting actual data in the flow area set as shown in FIG. 21A. Reference numerals 2107 denote a type of sub-template. For ease of illustration, certain details of the sub-template and containers actually flowed are omitted. FIG. 21B shows a state in which the second page 2102 as shown in FIG. 21A is designated as a page to be repeated and is automatically generated and repeated depending on the number of the records. That is, referring to FIGS. 21A and 21B, while twenty-one records are to be flowed through the flow area, the sub-template on which the twenty-one records are laid out cannot be contained in the flow area limit to pages 2101 to page 2103 shown in FIG. 21A. Therefore the page 2102 designated as a page to be repeated is automatically generated until all the records are laid out in the flow area.

While this embodiment has been described with respect to a case where a page to be repeated is designated in advance, a page to be repeated may be automatically designated. In such a case, for example, a page having the largest area for the flow area is designated as a page to be repeated. This is because designating as a page to be repeated a page having the largest number of sub-templates laid out therein (i.e., a page having the largest area for the flow area) can be effective in avoiding repeated generation of a wasteful page.

In a case where a flow area exists over a plurality of pages as described above, a method of enabling selection as to which page is set as a page to be repeated according to characteristics of pages has the effect of improving document expression. In the case of the example shown in FIGS. 21A and 21B, an arrangement is conceivable in which greetings to a customer are placed in the flow area on the first page, while a name of the customer is entered in the ordinary container; record data in a multi-record is thereafter displayed in the flow area; a large number of record data items are processed on the repeated page; and a name of sales representative and a complimentary close are placed in the flow area on the third page. Thus, while a document form for laying out a multiplicity of similar record data items on a plurality of pages is taken, some of the plurality of pages can have diversified contents.

<Flow of Layout Processing>

Figure 22A:
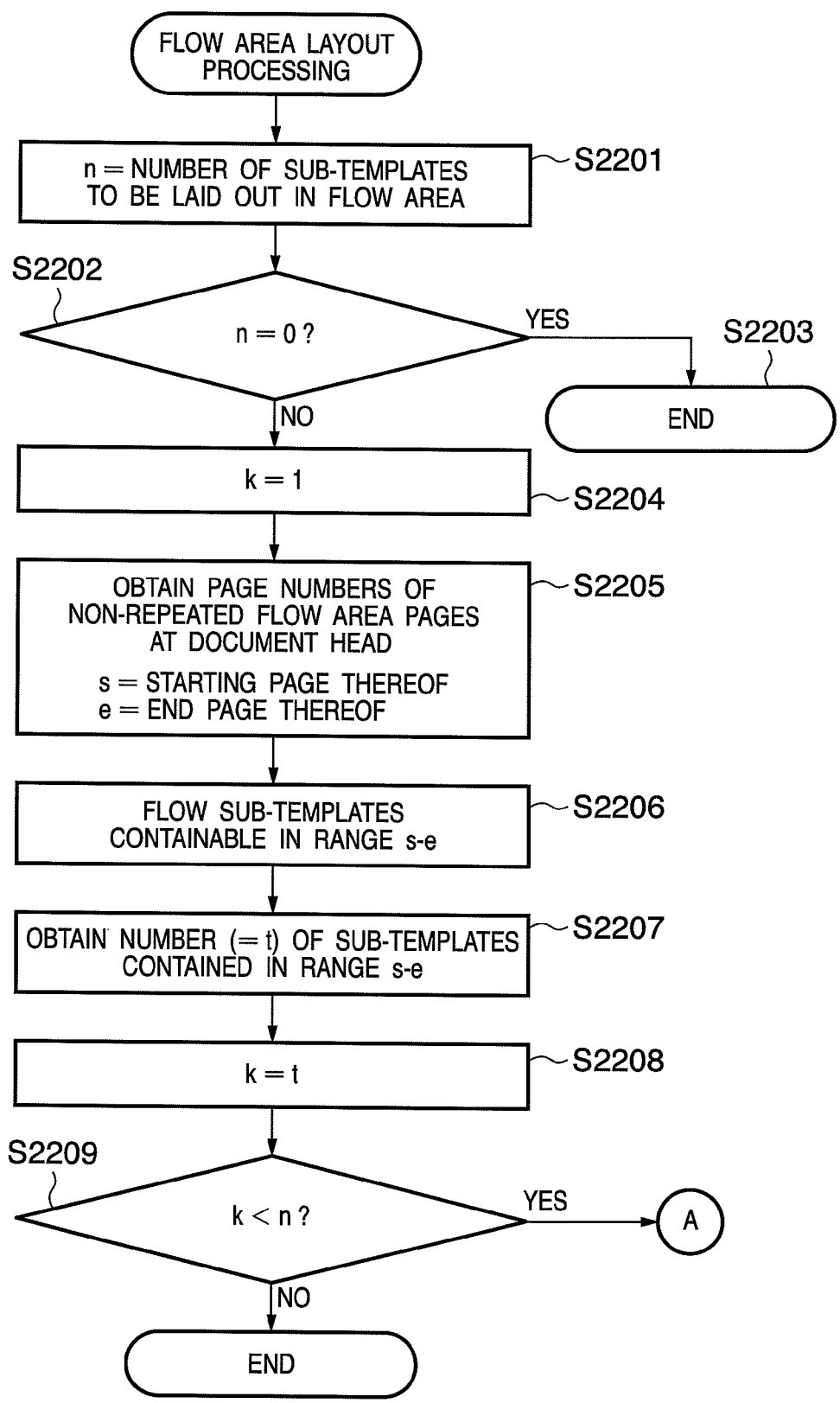
FIGS. 22A and 22B are diagrams showing an example of a flow of layout of sub-templates in a flow area extending over a plurality of pages.
Figure 22B:
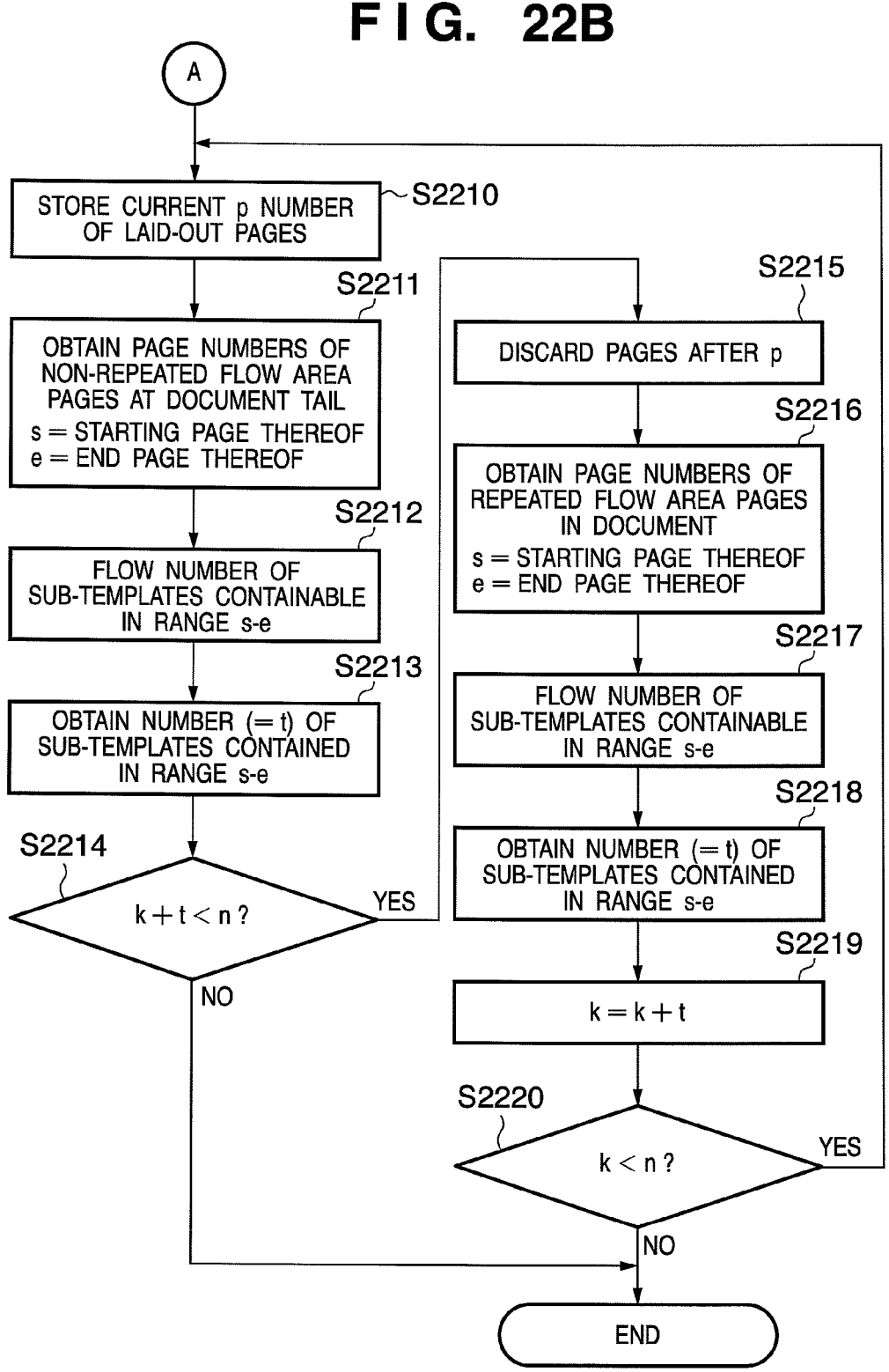

FIGS. 22A and 22B are flowcharts showing processing when laid-out contents are arranged in a flow area according to the second embodiment. Processing shown in FIGS. 22A and 22B is executed as step 1715 shown in FIG. 17 in the first embodiment. In this flowchart, a method of laying out sub-templates are laid out in a flow area on a plurality of pages is shown.

The layout editing application 121 first obtains the number of sub-templates to be laid out in a flow area and substitutes the obtained number for n (S2201). This number is k or n determined in step 1712 shown in FIG. 17. If n is 0 (S2202), there is no need for layout in the flow area and the process therefore ends without performing layout processing (S2203). Details of processing in these steps are the same as those described above, and the description for them will not be repeated.

The layout editing application 121 thereafter initializes the variable k to 1 (S2204) and obtains information as to whether or not a page or a group of pages each of which is not a page to be repeated and on which a flow area exists exist at the head of the document. If such a group of non-repeated pages exist, the layout editing application 121 reads out template information corresponding to the non-repeated pages at the head of the document from template data. The layout editing application 121 substitutes for s the page number of the starting page in the group of non-repeated pages and also substitutes for e the page number of the end page in the group of non-repeated pages (S2205). Information on these pages is read out from flow area information stored in the memory unit 136 according to a user input through the UI shown in FIG. 19.

The layout editing application 121 thereafter flows, into pages s to e, sub-templates which can be contained in the target pages (pages s to e) in sequence from the top, according to the read-out flow area information in the template data (S2206), obtains the number of sub-templates contained in the pages s to e, and sets this number as t (S2207). At this point in time, the layout editing application 121 substitutes t for k (S2208) and compares k and n with each other (S2209). The value of k is temporarily stored in the memory unit 136. If k is smaller than n, not all the sub-templates are laid out in the flow area. Therefore the process advances to step 2210. If k is equal to n, it is determined that all the sub-templates have been laid out in the flow area, and the process ends.

The layout editing application 121 temporarily stores the current number of laid-out pages p in the memory unit 136 (S2210). The layout editing application 121 thereafter reads out from the template data template information corresponding to a non-repeated portion of the document at the tail. The layout editing application 121 obtains the page numbers of non-repeated pages which include the tail end of the document and on which the flow area exists (from the page immediately after the designated repeated-page range to the final page), substitutes for s the page number of the starting page in the group of non-repeated pages and also substitutes for e the page number of the end page in the group of non-repeated pages (S2211). Information on these pages is also read out from the flow area information stored in the memory unit 136 according to a user input through the UI shown in FIG. 19.

The layout editing application 121 flows, into pages s to e, the sub-templates which can be contained in the pages s to e in sequence from the top according to the flow area information of the read template (S2212), obtains the number of sub-templates contained in the pages s to e, and sets this number as t (S2213). The layout editing application 121 then compares k+t and n with each other (S2214). The value of k is temporarily stored in the memory unit 136, as described above. The layout editing application 121 can therefore recognizes the value of k. If k+t is smaller than n, the process advances to step 2215. If k+t is equal to n, it is determined that all the sub-templates have been laid out in the flow area without using any repeated page, and the process ends.

If processing shown in the flowchart of FIGS. 22A and 22B is not completed even after the completion of processing to step 2214, it is determined that not all the records to be laid out (contents-laid-out sub-templates) can be contained in the document including the non-repeated pages at the head and the non-repeated pages at the tail.

The layout editing application 121 then discards instances of laid-out pages (laid-out data) after the number of pages p through which flowing has been completed in step 2212 (S2215). That is, processing in step 2215 is performed to arrange in the repeated page the laid-out instances after the number of pages p through which flowing has been completed in step 2212 (the laid-out instances from the page immediately after the designated repeated-page range to the final page).

The layout editing application 121 reads out the template information corresponding to the repeated page from the memory unit 136, obtains page numbers in the repeated flow area in the document, sets the starting page number in s, and sets the end page number in e (S2216). Information on these pages is also read out from the flow area information 2401 stored in the memory unit 136.

The layout editing application 121 flows the sub-templates (laid-out instances) which can be contained in the flow area on the repeated pages s to e (S2217), obtains the number of sub-templates contained in the repeated pages s to e, and substitutes this number for t (S2218), adds t to k, again substitutes k+t for k (S2219), and compares k and n with each other (S2220). If the layout editing application 121 determines "NO" in step 2220, that is, all the sub-templates obtained in step 2201 can be arranged, it ends processing shown in the flowcharts of FIGS. 22A and 22B.

If the layout editing application 121 determines "YES" in step 2220, it moves the process to step 2210 again. After entering processing in step 2210, the layout editing application 121 performs processing from step 2211 to step 2213. If the layout editing application 121 again determines "YES" in step 2214, then it determines that not all the sub-templates obtained in step 2201 (laid-out instances) can be contained even when the flow area on the non-repeated pages at the head, the first repeated page and the non-repeated pages at the tail are used. Accordingly, the process again moves to step 2215 to generate a page including the repeated flow area. The above-described processing is repeated until "NO" is determined in step 2220, thus automatically generating the repeated page until all the sub-templates can be arranged by using the repeated pages. This generation processing may be duplication of a predetermined page.

The above-described processing will be described in detail more concretely with reference to FIGS. 21A and 21B. First, the sub-templates which can be contained in the flow area on page 2101 are arranged from the sub-templates (laid-out instances) obtained in step 2201. Processing up to this stage corresponds to steps 2201 to 2208.

Subsequently, if it is determined that not all the obtained sub-templates have been arranged (S2209), the remaining sub-templates are arranged in the flow area on page 2103. Processing up to this stage corresponds to steps 2210 to 2213.

If it is determined that not all the obtained sub-templates can be arranged even when the flow area on pages 2101 and 2103 is used (S2214), the sub-template arranged in page 2103 is deleted and this sub-template is arranged in the flow area on page 2102 being a repetition page. Processing up to this stage corresponds to steps 2215 to S2219. As a result of the above-described processing, the sub-templates obtained in step 2101 are successively arranged in the flow area on pages 2101 and 2102.

In step 2101, determination is made as to whether or not all the sub-templates have been contained (S2220). If it is determined that not all the sub-templates have been contained, the sub-templates overflowing the flow area on page 2103 are again arranged. It is determined that not all the sub-templates can be arranged even by processing up to this stage (S2214—YES), the process again moves to step 2215, page 2102, which is a page to be repeated, is generated and the sub-templates are arranged in the flow area on the generated page 2102. The above-described processing is repeated to repeat duplicating (generating) only the page to be repeated, i.e., page 2102, until all the sub-templates are contained, as shown in FIG. 216.

In a case where a plurality of pages are designated as a page to be repeated, there is a possibility of generation of a blank page, depending on the number of sub-templates obtained. For example, in a case where a group of three pages is selected as a page to be repeated, the group of three pages is generated when obtained sub-template cannot be contained. The repeated pages are generated. However, there is a possibility of the obtained sub-templates being contained in the area limited to the second page in the newly generated repeated pages, with the third one of the designated repeated pages left blank. In this case, the blank page is automatically deleted according to a user setting.

Thus, in this embodiment, a new page is automatically generated when a template cannot be contained in a flow area, thereby enabling sub-templates which cannot be entirely contained in the flow area on one page to be continuously flowed. This method is intended to prepare a document without page restriction. Since the generated new page is a repeated page designated in advance by a user, a page construction in which a user's intention is reflected can be provided. Moreover, if the repeated page is automatically set as described above, the user operability can be improved.

If all the contents-laid-out sub-templates can be laid out by using the pages immediately before the repeated page and the repeated page(s) (S2220—YES), processing shown in the flowchart of FIG. 22B ends. However, if a footer page is designated and if there are contents data to be output to the footer page, the processing is terminated after adding the footer page.

This embodiment has been described by focusing attention on the effect of defining one continuous flow area over a plurality of pages, and layout of a plurality of flow areas in one document has not been particularly mentioned. Needless to say, it is also possible to lay out each of a plurality of flow areas over a plurality of pages.

According to the present invention, different sub-templates according to the contents (values) of record data extracted from a database are selected and records are inserted in the selected sub-templates. Also, processing for this insertion is repeated with respect to each record to obtain partial layouts in which the various sub-templates and the records are associated with each other. The record-laid-out sub-templates are successively flowed into the flow area to realize a flowed layout which cannot be realized by the conventional arranging, and in which a complicated layout change is repeatedly made.

In a case where sub-templates overflow one flow area as a result of flowing a multiplicity of records, a page including a layout area (flow area) is automatically generated and added to enable preparation of a document having the number of pages selected with a high degree of freedom. This effect is highly advantageous in preparing a document such as a catalog expressed by arranging partial layouts the number of which is not fixed in advance, and which are similar to each other to a certain degree but vary in detailed layout structure.

[Third Embodiment]

A third embodiment of the present invention is an evolution from the first and second embodiments. A layout editing application program capable of division between sub-templates and between a flow area and a container for example, as well as simply extending a flow area over a plurality of pages, will be described. This embodiment will be described on the model of the second embodiment with respect to points of difference from the first embodiment while omitting the description of portions common between this embodiment and the first and second embodiments.

<Sub-Template Conditional Expression>

Figure 26:
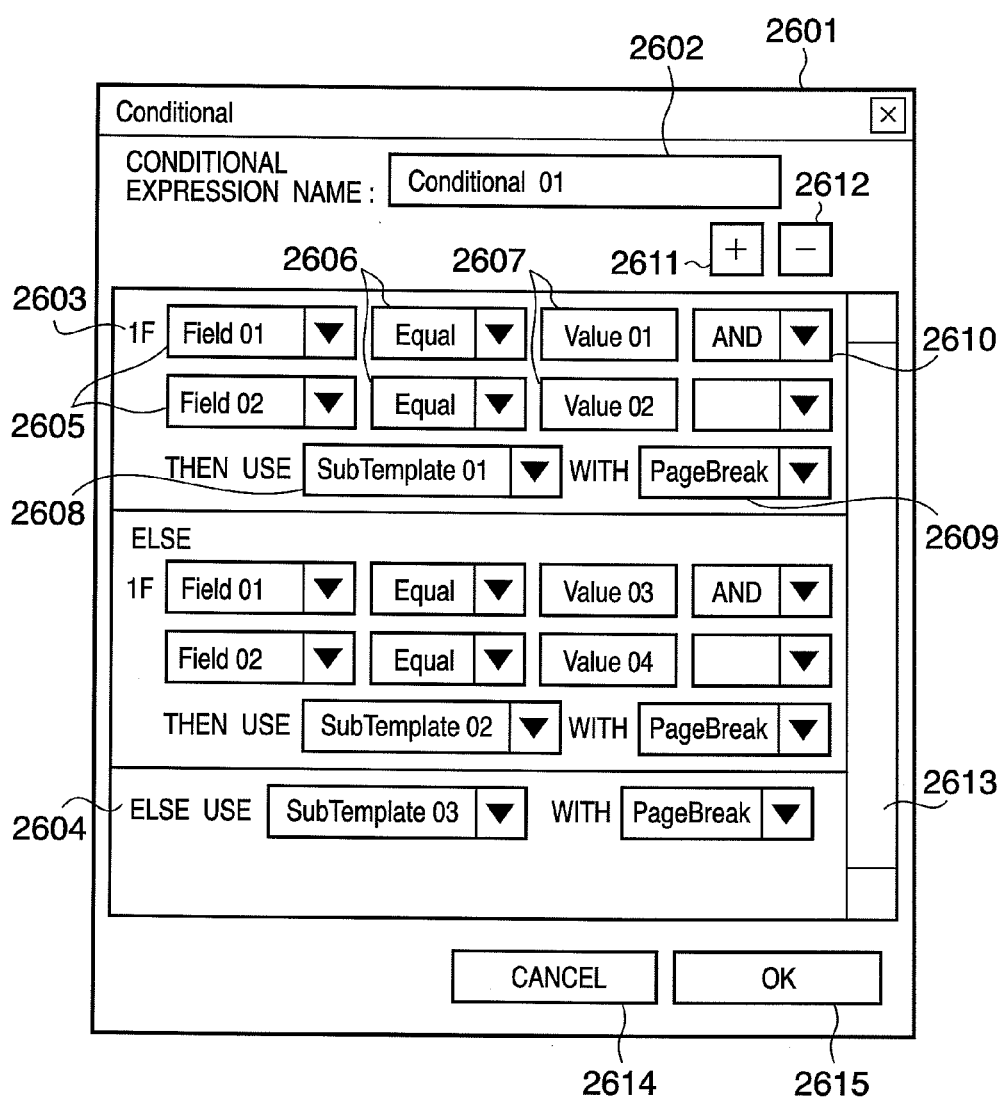
FIG. 26 is a diagram showing an example of a UI for setting a conditional expression in a third embodiment of the present invention.

A sub-template conditional expression is a device for assigning a plurality of types of sub-templates to one flow area. One of a sub-template and a conditional expression can be associated with a flow area. FIG. 26 shows an example of a UI for setting a conditional expression. This is the same as that in the first embodiment. In this embodiment, however, a conditional expression stored as sub-template information can be input while including delimitation information with the same condition as that for sub-templates.

FIG. 26 shows an example of a UI for setting a conditional expression for performing processing by receiving one record from a database. This input area at least has a text box 2602 in which a conditional expression is named and a pair of IF statement 2603 and ELSE statement 2604, which are elements constituting the most basic conditional decision.

An input area for the IF statement includes a list box 2605 for selection from fields to be checked in conditional decision, a list box 2606 for setting logical expressions for decision, a text box 2607 for inputting values used for decision, a THEN_USE processing statement 2608 for determining an operation, i.e., determining a sub-template for insertion of the corresponding record, when the conditional decision result is correct, a WITH processing statement 2609 for selecting Break processing (document division processing) accompanying a sub-template when the sub-template is changed, and an ELSE_USE statement 2604 for determining a sub-template for insertion of the corresponding record when the conditional decision result is incorrect.

As logical expressions 2606 for decision, variable conditions such as "EQUAL", "NOT_EQUAL", "LESS_THAN", "LARGER_THAN", "START_WITH" and "END_WITH" are prepared. In a case where a field value such as "FieldNN" is designated as a decision value 2607 for decision with logical expression 2606, decision is made on a Field value input at 2605 and the field value input at 2607, thereby enabling multi-record printing for generating a new document when a change in record category such as change to multi-record is made.

Further, "change" can also be set as a logical expression for decision. The logical expression "change" for decision is effective in the case of setting Break processing described below each time the data value in a certain field value is changed. A point of effectiveness of setting the decision expression "change" will be concretely described with respect by way of example.

For example, it is assumed that layout processing accompanied by a document break is executed by using a large amount of record information. There is a need to repeat setting processings by conditional expressions set by a user, e.g., "IF field01 EQUAL value01 with DocumentBreak", "IF field01 EQUAL value02 WITH DocumentBreak" and "IF field01 EQUAL value03 WITH DocumentBreak" with respect to data items supposed as "field01". If the number of supposed data items is larger, the number of conditional expressions is increased and more complicated processing results. In such a case, if the above-described "change" is used, only one conditional expression suffices. That is, "IF field01 change value with DocumentBreak" is set to execute a document break each time field value 1 data is changed. The need for setting conditional expressions corresponding to the number of supposed data items is thereby eliminated to improve user operability.

As a WITH processing statement, four kinds of Break processing are prepared: DocBreak (document break) for discontinuing current record layout processing, printing a footer page and thereafter printing a new record from a new header page; PageBreak for discontinuing a current record flow, generating a new page and thereafter starting a new record flow; LineBreak for newly starting a record flow from the next flow area; and NoneBreak (continuation) for continuing a flow without performing Break processing.

To set a complicated conditional expression, an AND/OR conjunction statement combo box 2610 for setting a composite condition in the IF statement is provided. If an AND or OR composite condition is selected in this combo box, a one condition row is added in the IF statement. Only when all of a plurality of conditions are correct in the case of AND, or only when one of the conditions is correct in the case of OR, the result of IF statement decision is true.

To set a more complicated conditional branch, an ELSE_IF statement addition button 2611 is provided. When the button 2611 is clicked, an ELSE_IF statement is newly added and inserted between the above-mentioned IF statement and ELSE statement. The contents and operation of ELSE_IF statement are the same as those of the IF statement. Decision processing is performed in sequence as described below. When the result of decision with the IF statement is incorrect, decision with the immediately subsequent ELSE_IF statement is made. When the result of decisions with this statement is incorrect, decision with the further subsequent ELSE_IF statement is made. This operation is repeatedly performed and decision with the ELSE statement is finally made. Reference numeral 2612 denotes a deletion button for deleting the selected ELSE_IF statement. In a case where the number of ELSE_IF statements is increased, a list of conditions can be displayed by using a scroll bar 2613.

If the result of decision with one of the IF and ELSE_IF statements is true, the corresponding USE processing statement and WITH processing statement are executed. Thus, a sub-template meeting a condition can be automatically selected by means of a conditional expression with respect to each of records taking various values, and various layouts can be realized by means of one conditional expression by concurrently using Break processing accompanying the selected sub-template.

This conditional expression is associated with a flow area to enable a plurality of types of sub-templates having various layouts to be laid out in the one flow area.

The user inputs the condition through the UI shown in FIG. 26 and finally clicks the OK button 2615. When the OK button 2615 is clicked, the information indicating the sub-template condition set in the UI (sub-template conditional expression) is stored in the memory unit 136 as a portion of sub-template information 2403. As this sub-template conditional expression, information enabling determination of a condition and a sub-template when the condition is satisfied, e.g., a text file in which the text described (selected) in the UI shown in FIG. 26 is stored in its very form may suffice. In the case of the example shown in FIG. 26, "IF field01 EQUAL value01 AND field02 EQUAL value02 THEN USE subtemplate01 WITH PageBreak ELSE IF field01 EQUAL value03 AND field02 EQUAL value04 THEN USE subtemplate02 WITH Page-Break ELSE USE subtemplate03 WITH PageBreak" is stored as information indicating a sub-template conditional expression. Since the information is described in conformity with a simple grammar, and since it is input through a UI such as shown in FIG. 26, it is not susceptible to grammatical error or the like even if it is stored in its very form. Therefore the description of the condition can be parsed to by a simple program to determine a sub-template which meets the condition.

<Layout Processing>

Figure 27A:
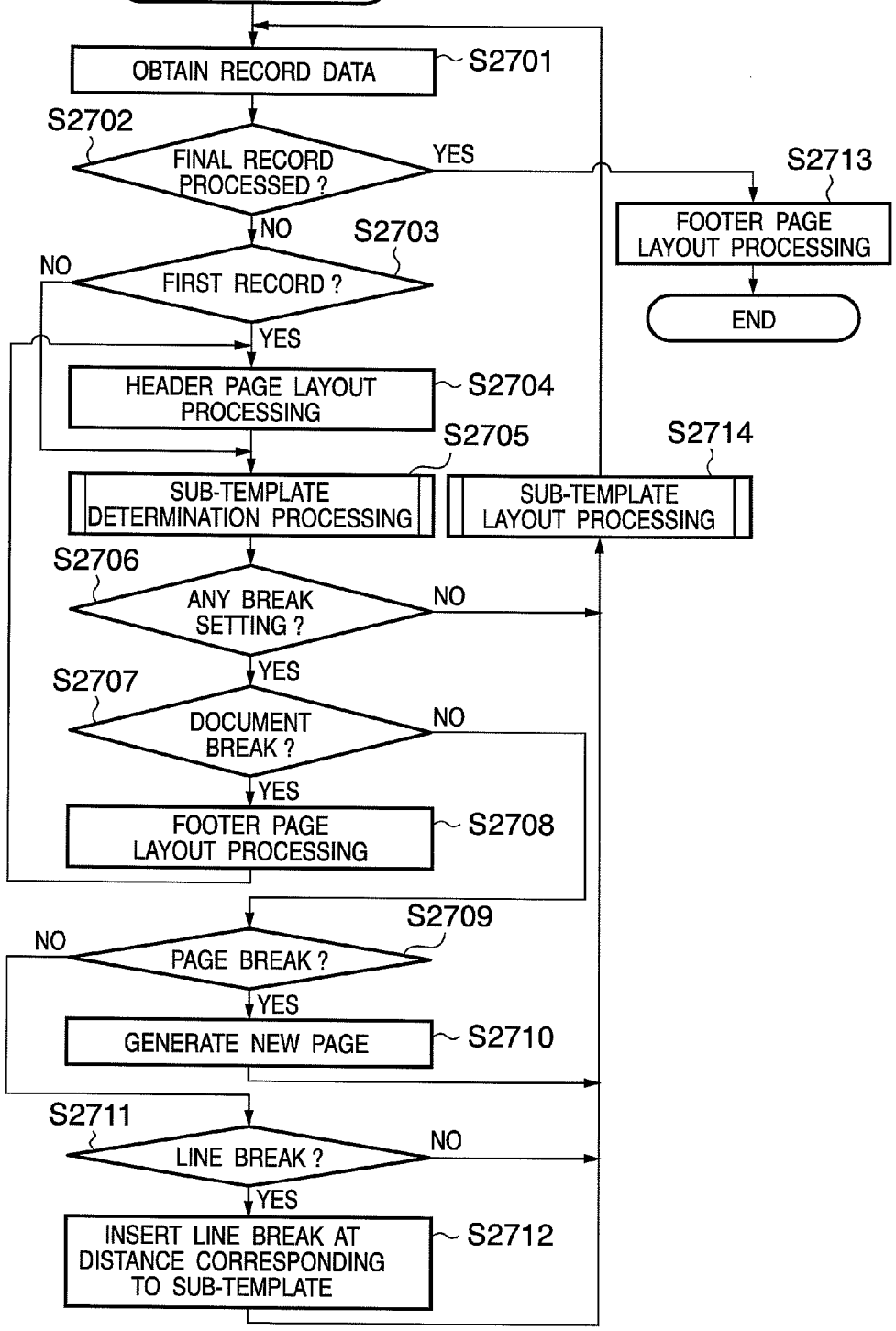
FIG. 27A is a diagram showing a flow of layout processing in the third embodiment of the present invention.

FIG. 27A is a flowchart showing layout processing executed according to a conditional expression (extraction condition and break processing) by making conditional decisions in a template with which the conditional expression is set with respect to a flow area. Processing shown in FIG. 27A includes steps 0703 and 0704 shown in FIG. 7A and steps 1009 and 1010 shown in FIG. 10 of the first embodiment.

The following description is made with respect to an example of a template constituted by a header page, a page to be repeated including a flow area, and a footer page. Referring to FIG. 27A, the layout editing application 121 first obtains data to be laid out from a database (S2701) and determines whether or not the final record has been processed (S2702). Since the layout editing application 121 performs processing while temporarily holding information as to which record is being presently processed, it can make determination in step 2702. If the layout editing application 121 determines in step 2702 that the final record has been processed, it advances the process to step 2713 to execute footer page layout processing, and ends processing shown in the flowchart of FIG. 7A. If the number of records to be laid out, obtained in step 2701, is zero, layout processing cannot be executed. The layout editing application 121 then ends processing shown in the flowchart of FIG. 7A without performing footer page layout processing.

Next, the layout editing application 121 determines whether or not the presently processed record is the first record (S2703). If the presently processed record is the first record, the layout editing application 121 executes header page layout processing (S2704). More specifically, this layout processing is processing for generating a header page by using predetermined contents data in the obtained record. This header page layout processing is performed in the same manner as processing for optimization of layout in a sub-template described above in the description of the first embodiment with reference to the flowcharts of FIGS. 7A and 14. This means that a sub-template is layout-defined, as in the case of an ordinary template, to perform layout optimization processing at the time of arranging contents from a database.

The layout editing application 121 determines, from contents data in the obtained record and a conditional expression set with respect to the flow area, whether or not contents data in the obtained record can be laid out. If it determines that the contents data should be laid out, then it determines a sub-template and Break processing on the basis of the conditional expression (S2705). More specifically, the layout editing application 121 reads out a sub-template conditional expression stored as flow area information in the memory unit 136 and recognizes the conditional expression and contents data contained in the obtained record to identify a name of a sub-template and details of Break (division) processing meeting the conditional expression.

The layout editing application 121 thereafter determines, on the basis of the identified information, whether or not a definition of Break processing exists and whether or not Break processing occurs (S2706). For determination as to whether or not a definition of Break processing exists, the layout editing application 121 can make determination as to whether or not a Break processing setting exists, since it determines Break processing in step 2705.

Determination as to whether or not Break processing occurs is made by temporarily storing contents data in the record immediately preceding the presently processed record and by comparing this contents data with the contents data in the presently processed record. More specifically, if the value in the field value (data item) designated to execute Break processing has been changed, it is determined that Break occurs.

If one of "no Break setting exists" and "no Break occurs" is determined as a result of determination in step 2706, the contents data in the presently processed record is laid out on the sub-template, layout adjustment in the sub-template is performed as described above, and the sub-template is laid out in the flow area (S2714). That is, the contents-laid-out sub-template is laid out in the flow area while leaving a space designated in the flow area information.

If the layout editing application 121 determines in step 2706 that a Break setting exists and that Break processing occurs, then it determines whether or not DocBreak (document break) has been designated (S2707). As determination processing in step 2707, determination as to which Break processing is set can be made by determining Break processing in step 2705. That is, the layout editing application 121 can determine Break processing by reading out the flow area information.

If the layout editing application 121 determines in step 2707 that DocBreak (document break) is designated, it discontinues arranging records in the flow area in order to temporarily complete the output results obtained up to the present point in time, newly generates a footer page and performs layout processing (S2708). There is a need to clear the Break setting in advance in order to avoid repeating the same processing. However, if the Break setting included in the sub-template conditional expression in the flow area information is cleared, the setting itself is changed. For this reason, a Break completion flag indicating the completion of break processing for inserting a document break with respect to the recognized record is provided and set. If this Break completion flag is set, the need for repeating processing in steps 2705 and 2706 is eliminated.

Accordingly, the layout editing application 121 also determines in step 2706 whether the Break completion flag is not set. Even when the layout editing application 121 recognizes a break setting, it determines "NO" if the Break completion flag is set. The layout editing application 121 thereafter advances the process to step 2714, lays out the presently processed record on the sub-template, and lays out the sub-template in the flow area of the target page. The break completion flag is reset after the completion of layout of the recognized record.

Footer page layout processing in step 2708 is performed as in the header page layout processing in the same manner as processing for optimization of layout in a sub-template described above in the description of the first embodiment with reference to the flowcharts of FIGS. 7A and 14.

The layout editing application 121 thereafter returns the process to header page layout processing (S2704) and repeats processing for newly preparing a document. When the process returns to step 2704 after the completion of footer layout processing in step 2708, the same processing is not repeated since the Break setting is cleared in advance (that is, the Break completion flag is set). It is determined that no Break definition exists (S2706). Accordingly, ordinary layout is executed and contents stored in the records are laid out on the page (S2711). Thus, a document break occurs in the course of record processing, thereby realizing multi-record printing.

The above-described document break setting enables insertion of a document break when contents data to be laid out are laid out. Therefore a new document is generated each time the data attribute is changed.

If the layout editing application 121 determines in step 2707 that no document break setting exists, then it determines whether or not a PageBreak (page break) setting exists (S2709). Determination processing in step 2709 is the same as that in step 2707. Therefore the detailed description for this processing will not be repeated.

If the layout editing application 121 determines that a PageBreak (page break) setting exists, then it discontinues the current flow and newly generates a page (S2710). After generating a new page including a flow area by inserting a page break, the layout editing application 121 obtains the size of contents data in the presently processed data with respect to the flow area on the new page, executes ordinary layout and lays out the contents stored in the record on the page (S2714), thereby restarting the flow of content-laid-out sub-templates as a new flow in the flow area.

Thus, a new page is generated each time the data attribute is changed. If pages are generated in this manner, for example, in a customized catalog when a plurality of commodities are proposed to a user, a group of commodities of the same kind can be arranged on one page. Also with respect to PageBreak, a Break completion flag is used in the same manner as that related to DocBreak. The Break completion flag can have a Break attribute information indicating its relationship with DocBreak or PageBreak.

If the layout editing application 121 determines in step 2709 that no PageBreak setting exists, then it determines whether or not a LineBreak (line break) setting exists (S2711). Determination processing in step 2711 is the same as that in step 2707. Therefore the detailed description for this processing will not be repeated.

If the layout editing application 121 determines that a LineBreak (line break) setting exists, then it moves the layout starting point from the present flow area to the left end of the flow area position in the flow area corresponding to the next line (S2712). More specifically, a layout engine which is one of the modules constituting the layout editing application 121 can recognize the contents data layout position. The layout engine recognizes the position of the sub-template on which the immediately preceding record is laid out, temporarily stores in the memory unit, inserts a line break at a distance corresponding to the sub-template height therefrom, and moves the layout starting point to the left end, thus realizing processing in step 2712.

Thereafter, ordinary layout is executed and contents stored in the record are laid out in the flow area on the page (S2714). The layout editing application 121 performs processing for proceeding to obtain the next record to be processed after the completion of processing in step 2714, returns to step 2701, and starts processing for obtaining the next record.

Thus, a line break occurs during flow in the flow area, and the line break in this case is moved through the distance corresponding to the height of the record laid out in the sub-template. Also with respect to LineBreak, a Break completion flag is used in the same manner as that related to DocBreak.

The above-described line break setting enables insertion of a line break when contents data having a different data attribute is laid out. Therefore sub-template data having a common data attribute can be laid out in corresponding rows.

As described above, the construction of a document constituted by a header page, a flow area and a footer page can be freely changed by various kinds of Break processing defined by a conditional expression. According to Break processing set with respect to the flow area, the document is divided by inserting a document break to generate a new document, on which contents data is laid out, or the document is divided by inserting a page break to generate a new page, on which contents data is laid out, thus obtaining various output results at the time of multi-record printing.

Figure 27B:
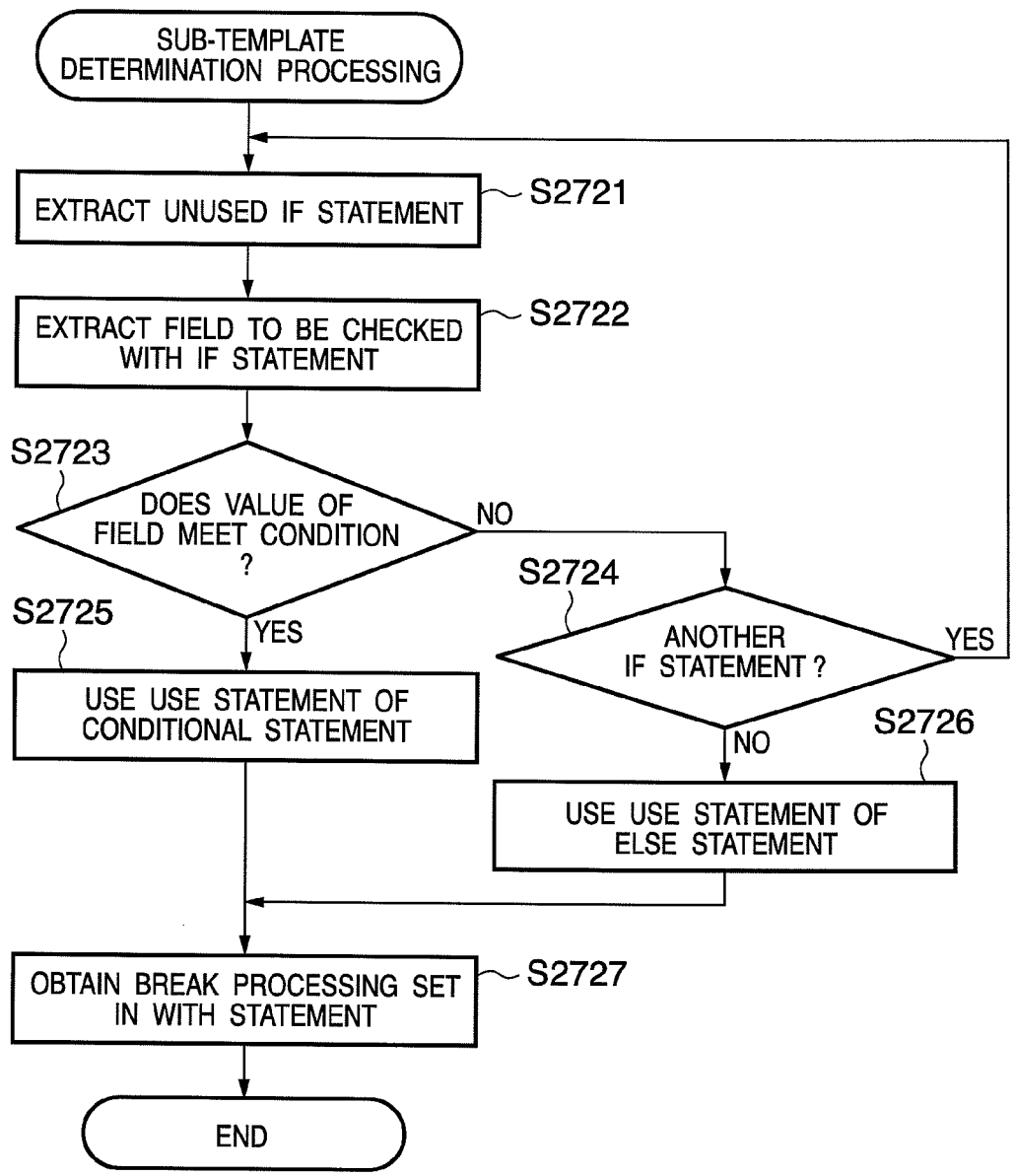
FIG. 27B is a diagram showing a flow of processing for determining a template in the third embodiment of the present invention.

FIG. 27B is a flowchart showing details of processing S2705 for determining a sub-template in processing shown in FIG. 27A. The layout editing application 121 extracts the first IF statement in the conditional expression (S2721), and extracts the value of the field on which decision is made with the IF statement from the record received in step 2701 (S2722). Since the conditional expression is stored as flow area information in the memory unit as described above, the layout editing application 121 can perform processing in steps 2721 and 2722 by referring to the memory unit.

Subsequently, the layout editing application 121 determines whether or not the value of the field in the record presently processed meets the conditional expression extracted in step 2721 (S2723). More specifically, the layout editing application temporarily stores contents data in the presently processed record in the memory unit 136 and compares the contents data with the conditional expression held as flow area information, thereby enabling processing in step 2723.

If the layout editing application determines that the field value to be checked in decision meets the conditional expression extracted in step 2121, then it selects USE processing according to a conditional statement in the conditional expression to determine a sub-template (S2725). When the sub-template to be used is determined, the layout editing application associates the presently processed record and the sub-template to be used and stores them in the memory unit 136.

If the layout editing application determines that the field value to be checked in decision does not meet the conditional expression extracted in step 2121, then it determines whether or not there is another conditional expression (S2724). Determination processing in step 2724 is the same as that in step 2723. If the layout editing application determines in step 2724 that there is another conditional expression, then it executes determination in step 2723 by using the another conditional expression similarly.

If the layout editing application determines that the contents data in the presently processed record does not meet any of the conditional expressions, then it selects USE processing of the ELSE statement to determine a sub-template (S2726). In some case, the user does not set the ELSE statement. If a conditional expression the ELSE statement does not exist, processing in step 2726 is omitted.

Finally, the layout editing application 121 obtains Break processing defined by the WITH statement and stores it in the memory unit 136 (S2727).

<Sub-Template>

Figure 28:
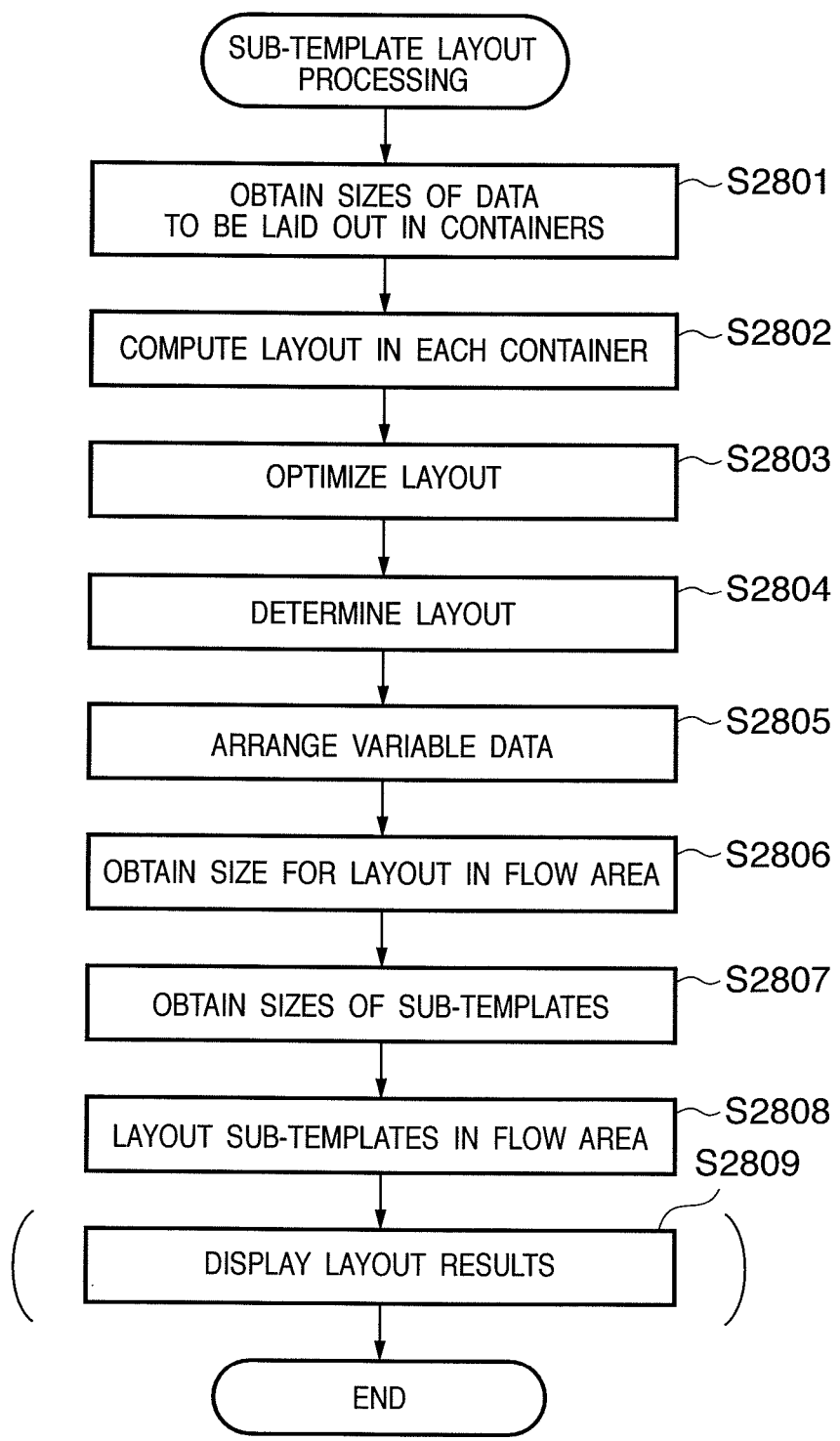
FIG. 28 is a diagram showing a flow of layout of a sub-template in the third embodiment of the present invention.

The flow of layout processing performed as sub-template layout processing in step 2714 shown in FIG. 27A will be described with reference to FIG. 28.

The layout editing application 121 first obtains the sizes of data to be laid out in each container (S2801), performs computation for layout in each container on the basis of the data size obtained in step 2801 (S2802) and optimizes the layout (S2803). Layout computation processing and the method of layout optimization in this embodiment are the same as those of the first embodiment.

The layout editing application 121 determines the optimized layout by the above-described processing (S2804) and arranges data to be laid out(S2805). This processing is also the same as that in the first embodiment.

The layout editing application 121 thereafter obtains the size of the flow area for layout of sub-templates in the flow area (S2806) and obtains the sizes of the sub-templates to be laid out (S2807). As described above, the size of the flow area and the sizes of the templates are stored in the memory unit 136 and can therefore be obtained. In this embodiment, the size of the external frame of each sub-template may be variable according to the contents of records arranged in the containers in the sub-template or may be fixed independently of arranging records.

The layout editing application 121 lays out in the flow area the sub-templates while applying a flow direction and a flow spacing being set (S2808), finally displays the layout results and ends the process (S2809). The final display processing may be performed by the program that calls up the process shown in FIG. 28 and, therefore, the final step may be omitted.

Steps 2801 to 2805 are the same as steps 1402 to 406 shown in FIG. 14, and steps 2806 to 2809 are the same as steps 1713 to 1716 shown in FIG. 17.

(Example of Break in Flow Area)

Figure 29:
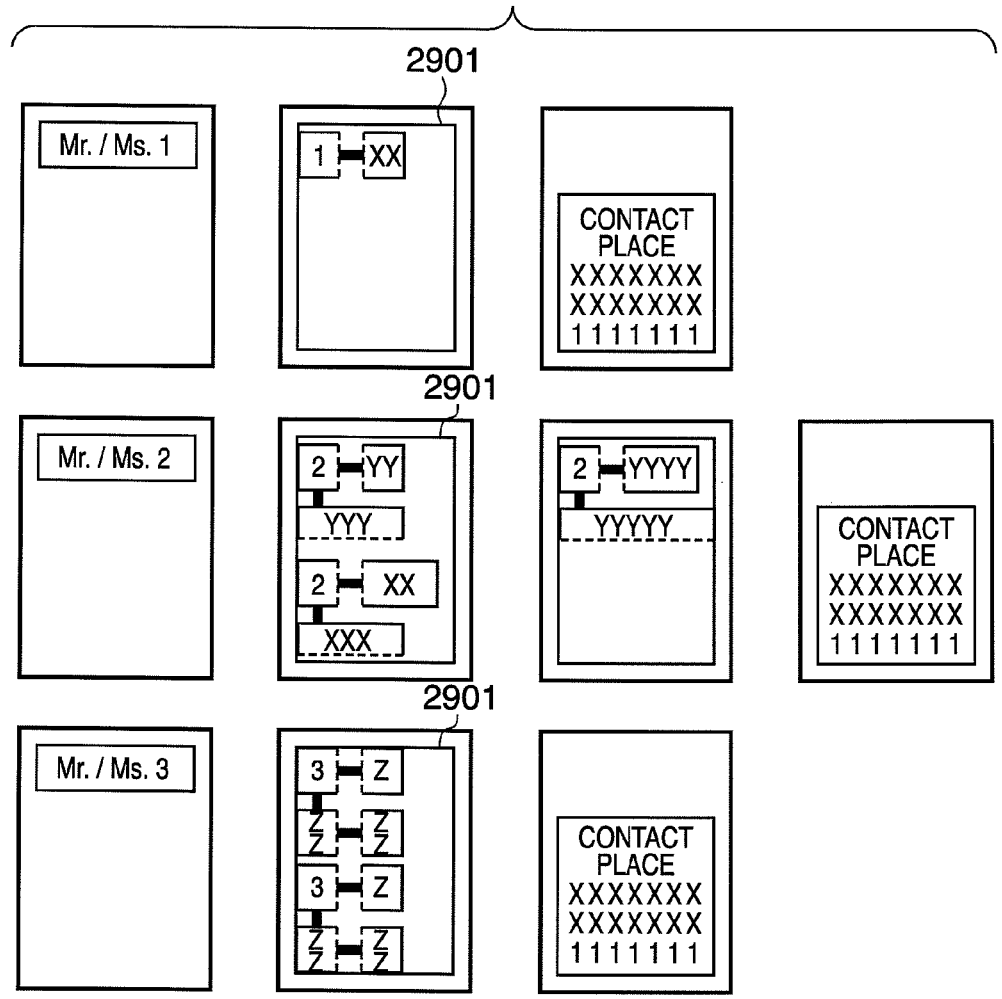
FIG. 29 is a diagram showing an example of Break processing in the third embodiment of the present invention.

Processing shown in FIG. 27 will be concretely described with reference to FIGS. 29 and 35. FIG. 29 shows an example of generation of a plurality of documents by DocBreak (document break) processing.

Referring to FIG. 29, a flow area 2901 is set, in which sub-templates are arranged. With respect to the flow area, a conditional expression for using one of the sub-templates 2902, 2903, and 2904 is set. In the conditional expression, a setting is made to execute THEN USE "sub-template 2902" WITH "DocBreak" when the destination field (data A) of a record is "1". A setting is also made to execute THEN USE "sub-template 2903" WITH "DocBreak" when the destination field (data A) of a record is "2". Further, a setting is made to execute THEN USE "sub-template 2904" WITH "DocBreak" when the destination field of a record is "3".

That is, a document break is executed according to a change in the item of data A.

The flow of processing will be described concretely with reference to FIGS. 27A and 29. The layout editing application 121 obtains "record 1" existing in data 2009. Since record 1 is the first record, "1" of data A contained in record 1 is laid out in a container on a header page according to association information. Processing up to this stage corresponds to steps 2701 to 2704 in FIG. 27.

The layout editing application 121 recognizes "data A=1" of record 1 and refers to the conditional expression in the memory unit 136 to recognize (THEN USE "sub-template 1" WITH "DocBreak" if the destination field (data A) of the record is "1"). Thus, use of sub-template 1 is determined with respect to record 1, and a document break setting is also recognized.

In processing record 1, however, Break processing, which can occur by a change in the predetermined field value in comparison with the preceding record, does not occur. Therefore the process advances to processing in step 2714 in which contents data in record 1 are arranged in the sub-template. This process corresponds to step 2706 in FIG. 27A. The contents data in the record 1 is temporarily held in the memory unit 136, as described above.

The layout editing application 121 returns to step 2701 after step 2714 and advances the process by taking the next record 2 as a record to be processed. Since the case of processing record 2 differs from the case where the final record has been processed and also from the case of processing the first record, the process advances to step 2705. The layout editing application 121 then determines that a sub-template to be used with record 2 is sub-template 2 according to THEN USE "sub-template 2" WITH "DocBreak" when the contents data of the record 2 "data A=2" and when conditional equation "Destination field (data A) of record" is "2", and also recognizes that a document break setting exists.

Further, the layout editing application 121 compares the contents data in record 1 temporarily held and the contents data in record 2 to recognize that change from "data A=1" in record 1 to "data A=2" in record 2 has occurred. Accordingly, Break processing occurs when record 2 is arranged.

In consequence of the above, the layout editing application recognizes "Break processing setting exists" and "Break processing occurs" in processing in step 2706 and therefore advances the process to step 2707. Since "document break" is set in the conditional expression corresponding to record 2, the layout editing application generates a footer page 2907 for record 1. Contents data used here are those contained in record 1. Further, the layout editing application 121 sets the above-described Break completion flag.

By the processing up to this stage, components 2905, 2906, and 2907 of document (a) shown in FIG. 29 are generated. The layout editing application 121 thereafter advances the process to step 2704 to generate a header page 2908 for record 2. Since the above-described Break completion flag is set, processing in step 2705 is omitted and the result of determination in step 2706 is "NO". As a result, the contents data in record 2 are laid out on sub-template 2 and laid out in the flow area on page 2909 of document (b) that is a new document.

Subsequently, the same processing is performed on records 3 and 4. Records 3 and 4 have "data A=2", which is the same as data A in record 2. Therefore, Break processing does not occur. Accordingly, the layout editing application 121 advances the process to step 2714 to lay out contents data in records 3 and 4 in the flow area in document (d). In ordinary cases, the contents data in record 4 should also be laid out in the flow area on page 2909 of document (b). However, the amount of contents data to be arranged is so large that the data cannot be set in one flow area. For this reason, page 2910 is newly generated by the page repeat function.

Thus, a document can be changed with change of a sub-template.

A concrete example of PageBreak (page break) will next be described with reference to FIGS. 27A, 27B, and 35. For example, a case where records contained in data 3500 area arranged is supposed.

Figure 35:
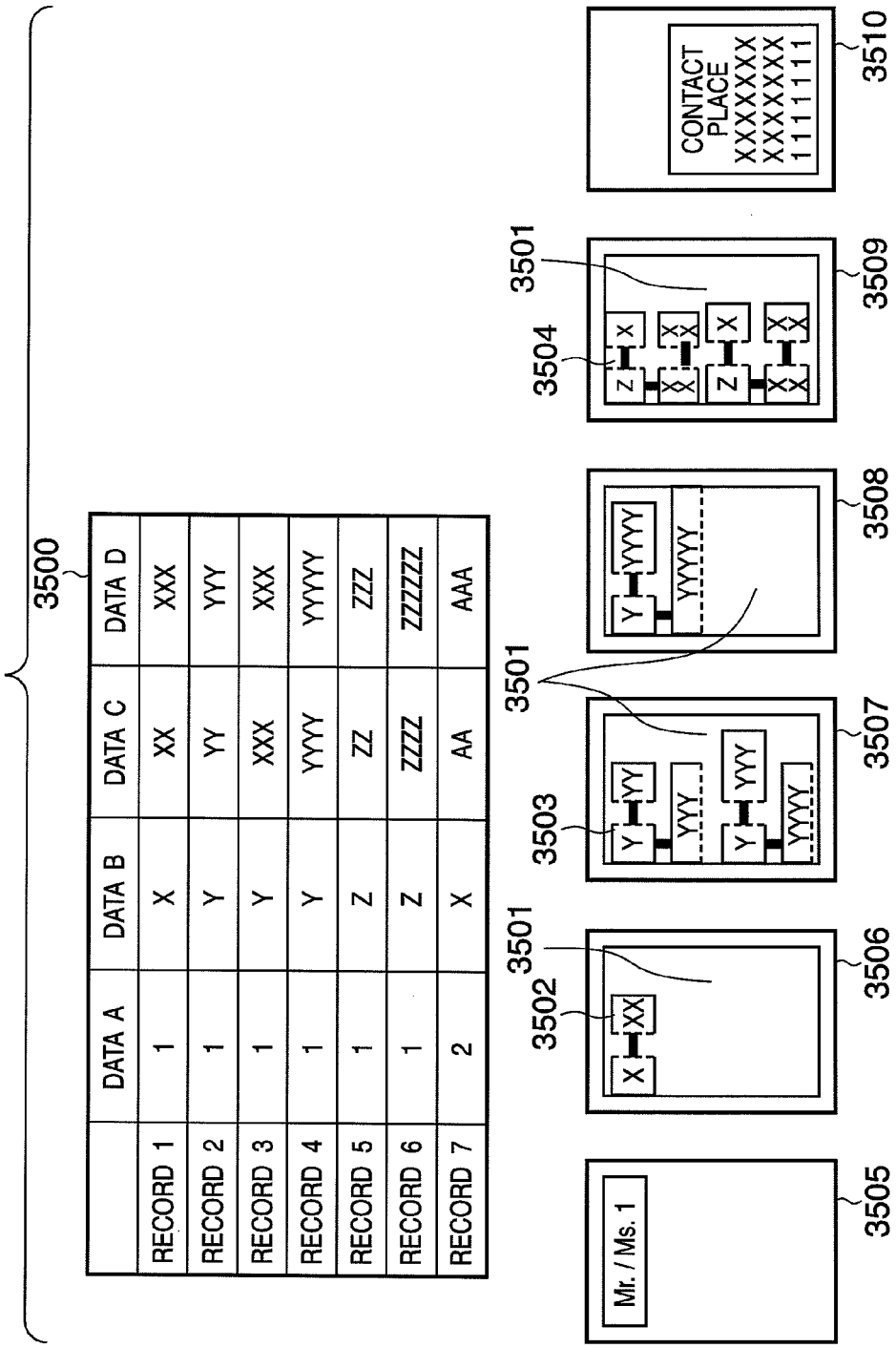
FIG. 35 is a diagram showing an example of Break processing in the third embodiment of the present invention.

Referring to FIG. 35, a flow area 3501 is set, in which sub-templates are arranged. With respect to the flow area, a conditional expression for using one of the sub-templates 3502, 3503, and 3504 is set. A first element of the conditional expression is a setting to execute WITH "DocBreak" if data A changes. That is, a document break is executed with respect to change of data A. A second element of the conditional expression is a setting to execute THEN USE "sub-template 3502" WITH "PageBreak" if data B is "X". Further, a setting is made to execute THEN USE "sub-template 3503" WITH "PageBreak" if data B is "Y", and a setting is made to execute THEN USE "sub-template 3504" WITH "PageBreak" if data B is "Z". That is, a page break is executed according to a change in the data value of data B.

The flow of processing will be described concretely with reference to FIGS. 27A and 35. The layout editing application 121 obtains "record 1" existing in data 3500. Since record 1 is the first record, "1" of data A contained in record 1 is laid out in a container on a header page according to association information.

The layout editing application 121 recognizes "data A=1" and "data B=X" of record 1 and refers to the conditional expression in the memory unit 136 to recognize (THEN USE "sub-template 3502" WITH "PageBreak" if data B is "X"). Thus, use of sub-template 3502 is determined with respect to record 1, and a page break setting is also recognized. In processing record 1, however, Break processing does not occur. Therefore the process advances to processing in step 2714 in which contents data in record 1 are arranged in the sub-template 3502. The contents data in the record 1 is temporarily held in the memory unit 136, as described above.

The layout editing application 121 returns to step 2701 after step 2714 and advances the process by taking the next record 2 as a record to be processed. Since the case of processing record 2 differs from the case where the final record has been processed and also from the case of processing the first record, the process advances to step 2705. The layout editing application 121 then recognizes "data B=Y" of record 2 and (THEN USE "sub-template 3503" WITH "PageBreak" if data B is "Y") to determine that a sub-template to be used with record 2 is sub-template 3503, and also recognizes that a page break setting exists.

Further, the layout editing application 121 compares the contents data in record 1 temporarily held and the contents data in record 2 with each other. Record 1 has "data A=1" and record 2 also has "data A=1". Accordingly, any document break does not occur. However, while record 1 has "data B=X", record 2 has "data B=Y". Therefore Break processing (page break processing) occurs. That is, the layout editing application 121 recognizes "Break setting exists" and "Break processing occurs" in processing in step 2706 and therefore advances the process to step 2707 to determine Break processing to be executed on record 2.

The conditional expression applied to record 2 is (THEN USE "sub-template 3503" WITH "PageBreak" if data B is "Y"), as mentioned above. Therefore execution of a page break can be determined. Accordingly, the layout editing application 121 determines "YES" in step 2709 and generates a new page 3507.

The layout editing application 121 lays out the contents data in record 2 on sub-template 3503 for layout on page 3507 newly generated in step 2710.

Records 3 and 4 have "data A=1" and "data B=Y". Therefore, a document break and a page break are not executed. Accordingly, the layout editing application 121 lays out contents data in records 3 and 4 in the flow area on page 3507. In ordinary cases, the contents data in record 4 should also be laid out in the flow area on page 3507. However, the amount of contents data to be arranged is so large that the data cannot be set in one flow area. For this reason, page 3508 is newly generated by the page repeat function.

The above-described processing is also executed on record 5. Record 5 has contents data: "data A=1" and "data B=Z". Therefore, a document break is not executed but a page break processing is executed.

Accordingly, the layout editing application 121 lays out the contents data in record 5 by laying out the contents data in record 5 on sub-template 3504 for layout in the flow area on page 3509 newly generated by page break processing.

The layout editing application 121 advances the process by taking record 7 as a record to be processed. Record 7 has contents data: "data A=2", different from data A in data value in records 1 to 6. Therefore, a conditional expression 1: data A change WITH "DocBreak" is applied to determine a document break. That is, the layout editing application recognizes "Break processing setting exists" and "Break processing occurs" with respect to record 7 and therefore advances the process to step 2707.

Further, because the set Break processing is document break, the layout editing application 121 generates a footer page 3510 and sets the above-described Break completion flag.

Thus, the layout editing application generates one document constituted of pages 3505 to 3510 by using records 1 to 6 and starts processing for generating a new document from record 7. When a line break setting is made as Break processing, the same processing as that described above is performed.

In a case where a flow area is divided by a break, layout processing and other processings are performed on each divided flow area assumed to have the same attribute information.

[Fourth Embodiment]

A fourth embodiment of the present invention will be described as processing when a conditional expression defined in a template is used as an external conditional expression file capable of overwriting. A conditional expression is described in a template in XML-compliant format such as shown in FIG. 30. The definition of the template itself is in XML-compliant tag format. The format of the template itself is not related to the present invention and will not be described.

FIG. 30 shows the format of a conditional expression file formed as an external conditional expression file. The format of this file corresponds to the form in which details of settings in the conditional expression setting UI shown in FIG. 26 are stored. The tag format correctly mirrors the contents of the on-screen UI. The conditional expression in this format is constituted by <CONDITIONAL> tag, <IF> tag, <ELSEIF> tag, and <ELSE> tag. <IF> tag includes <FIELD> tag for description of a decision expression and <USE> tag for description of decision results. In <USE> tag, a kind of Break is described in a WITH identifier. A name for identification of the conditional expression is described in <CONDITIONAL> tag. A set of Field names, decision statements and decision values are defined in <FIELD> tags in <IF> tag. If a plurality of decision statements exists, these can be connected by an AND identifier or an OR identifier. <ELSEIF> tag is described in the same way as <IF> tag. <ELSEIF> tag is a destination of branching from <IF> tag. Finally, <ELSE> tag is a branching destination when none of decision statements is met. Only <USE> tag is described in <ELSE> tag.

Figure 31:
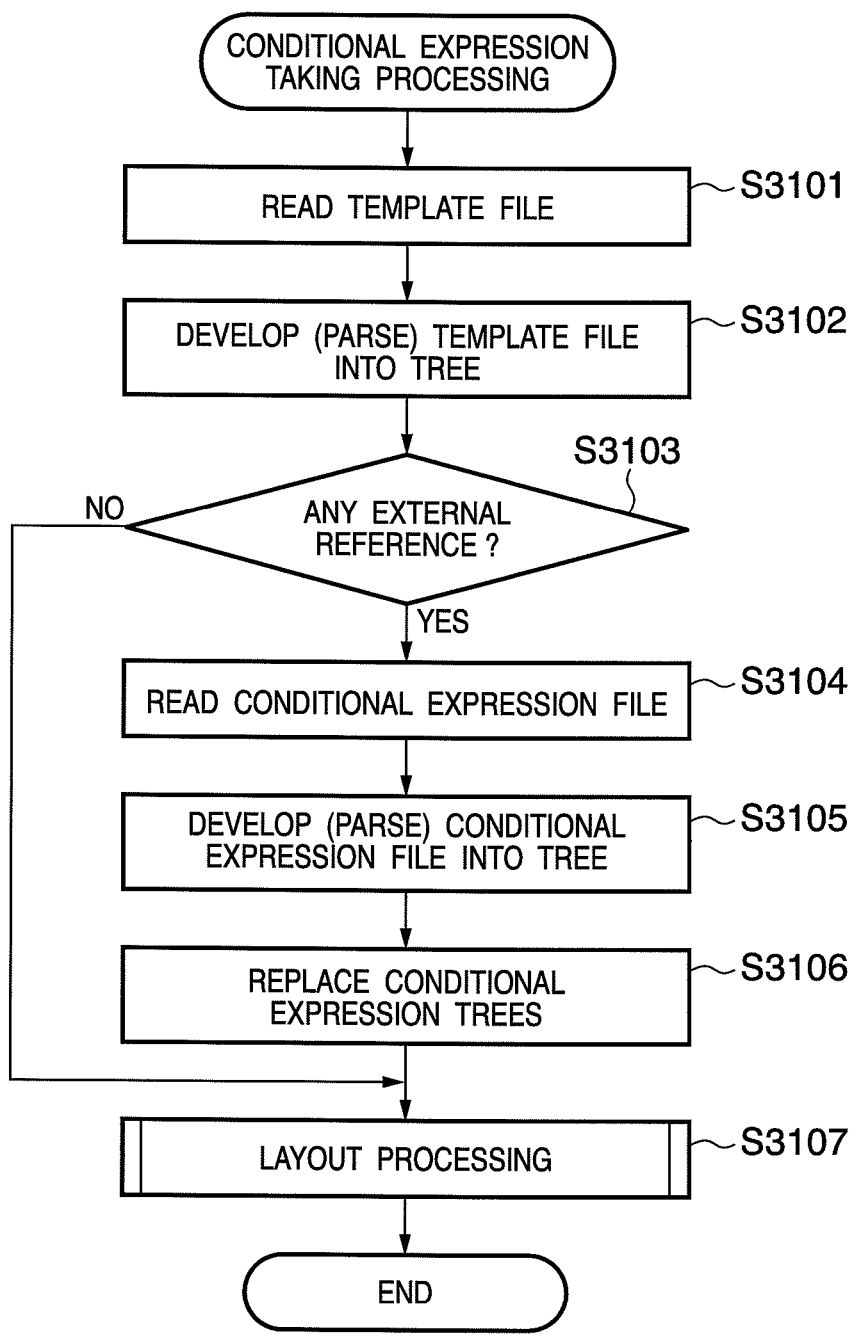
FIG. 31 is a diagram showing a flow of processing for reading an external conditional expression in the fourth embodiment of the present invention.

FIG. 31 is a flowchart showing processing of overwriting the external conditional expression file. Processing shown in FIG. 31 is performed at the start of processing shown in FIG. 27A in the third embodiment.

The layout engine 225, which is one of the modules constituting the layout editing application, reads to the memory 136 a template designated with input parameters (S3101). Because the template is represented by data in the XML-compliant file format, the layout engine 225 parses the template file to develop the template file into an XML object tree (S3102). Next, the layout editing application 121 determines whether or not there is an external conditional expression file for the input parameters (S3103). This determination can be realized, for example, by providing a particular extension or a name for an external conditional expression file. If the layout editing application 121 determines that an external conditional expression exists, it reads to the memory 136 the conditional expression file (S3104) and parses the conditional expression and develops the conditional expression into a conditional expression object tree (S3105). Next, the layout editing application 121 overwrites the conditional expression object tree described on the template read in step 3101 with the conditional expression object tree read by external reference (1906). Since the object tree is XML-compliant, replacement processing on an object-by-object basis is enabled by a known technique. Thereafter, Break processing described above with reference to FIG. S27A is executed (S3107) to enable the conditional expression set on the template to be dynamically changed at the time of printing and to enable sub-template change conditions to be changed according to arrange variable data. As a result, extensive variable printing can be realized.

Evaluation of the conditional expression tree can be realized by executing operators according to the tree structure with a stack machine. In the above-described procedure, the conditional expression may be parsed after overwriting with the conditional expression in the very XML format in the unparsed state.

If the conditional expression is configured as described above, it can be set by being edited, for example, by a text editor or the like.

According to the layout editing system in any of the embodiments of the present invention, one of different sub-templates is selected according to contents (field value) of record data extracted from a database, and the record is inserted in the selected sub-template. This insertion processing is repeated with respect to each of records to obtain partial layouts in which the various types of sub-templates and records are connected. The various types of partial layouts are successively flowed into a layout area, thus realizing a flowed layout in which complicated layout change, not realized by conventional arranging, is repeated.

The above-described layout may be page-controlled by page break processing, with the various types of partial layouts liken to chapters in bookbinding. In this way, a document such as a booklet can be formed. Also, a method of performing document break processing on a template forming a header or footer ensures that customer-by-customer documents can be simultaneously generated by using one template for a multi-record.

This is highly effective in performing on-demand printing to generate at a time documents of different merchandize categories respectively appealing to customers as in a customized catalog.

Figure 36:
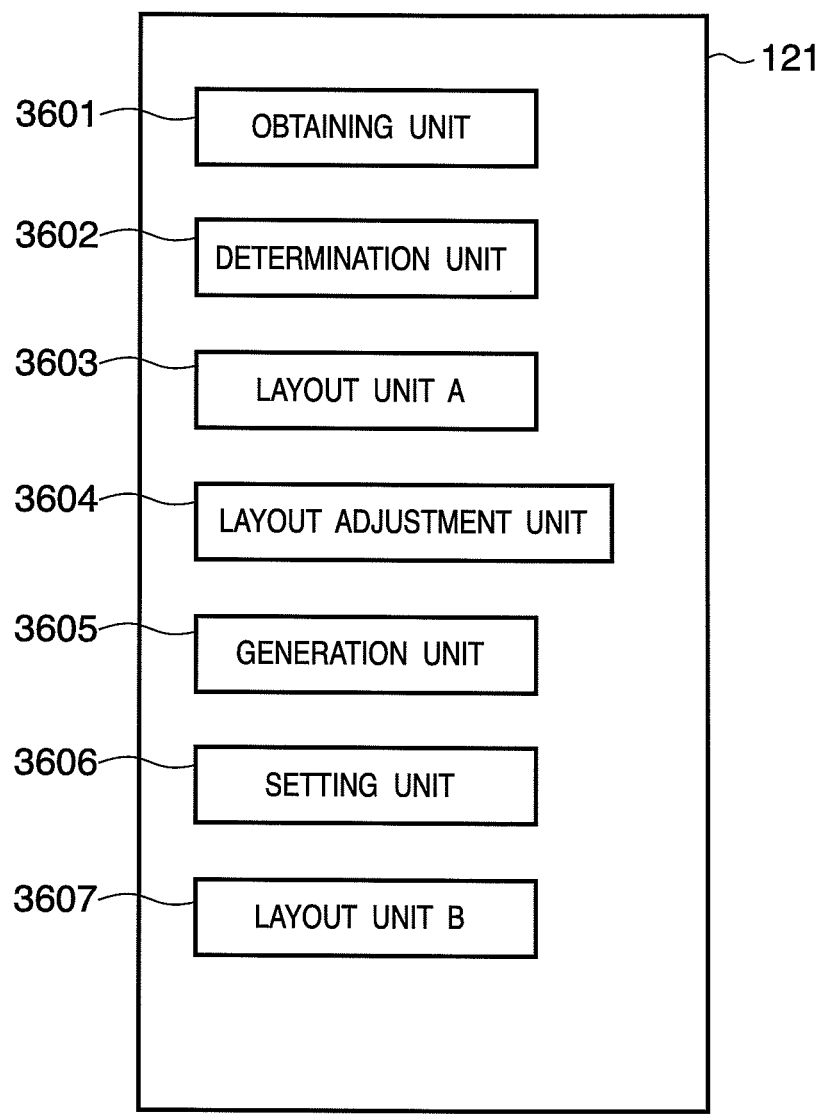
FIG. 36 is a block diagram showing an example of a functional configuration for layout editing processing based on a layout editing application.

The functional configuration of the above-described automatic layout system (layout editing application 121) is, for example, as shown in FIG. 36.

Referring to FIG. 36, the layout editing application 121 is capable of dynamically changing, according to contents data to be laid out, a layout on a template having an area where an extraction condition for extraction of the contents data from a database is set.

An obtaining unit 3601 obtains contents data satisfying the extraction condition from the database. A determination unit 3602 determines one or more of a plurality of sub-templates on which groups of contents data obtained by the obtaining unit should be laid out, from association information on association between the groups of contents data and one or more sub-templates for layout of the contents data.

A layout unit A 3603 lays out the groups of contents data by laying out the groups of contents data on the one or more sub-templates determined by the determination unit 3602, and thereby produces output results.

A layout adjustment unit 3604 lays out in the sub-templates the contents data obtained by the obtaining unit 3601, and adjusts the layout of the contents data.

A generation unit 3605 newly generates a page having the area in a case where the contents data obtained by the obtaining unit 3601 cannot be laid out in the area.

A setting unit 3606 sets one of a plurality of division methods.

A layout unit B 3607 lays out the contents data obtained by the obtaining unit 3601, by dividing a document by one of the division methods set by the setting unit 3606, when the contents data is laid out in the area, and thereby generates document data.

While the components constituting the layout editing application 121 are shown in FIG. 36, the layout editing application 121 may have the obtaining unit 3601, the determination unit 3602 and the layout unit A 3603 to achieve the object of the present invention. The layout editing application 121 may alternatively have the obtaining unit 3601 and the generation unit 3605 to achieve the object of the present invention. The layout editing application 121 may alternatively have the obtaining unit 3601, the setting unit 3603 and the layout unit B 3607 to achieve the object of the present invention.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-054534, filed Feb. 28, 2005, which is hereby incorporated by reference herein in its entirety.

What is claimed is:

1. An information processing apparatus comprising a processor which executes a program stored in a memory and execute a layout processing for a document including the first, second and third page, wherein the processor functions as:
   a setting unit which sets a repeated page setting to the second page;
   a first obtaining unit which obtains the first and third pages to which the repeated page setting is not set from the document;
   a first layout unit which lays out a sub-template selected from a plurality of sub-templates in the first and third pages;
   a first determining unit which determines whether all the sub-templates are laid out in the first and third pages;
   a deleting unit which deletes the third page when all the sub-templates are not laid out in the first and third pages, wherein the sub-templates laid out in the third page are deleted by deleting the third page;
   a second obtaining unit which obtains the second page to which the repeated page setting is set;
   a second layout unit which lays out the sub-templates deleted by the deleting unit in the second page;
   a second determining unit which determines whether all the sub-templates are laid out in the first and second pages,
   wherein, when it is determined that all the sub-templates are not laid out in the first and second pages, the first layout unit lays out the remaining sub-templates which are not laid out in any page in the third page and the first determining unit determines whether all the sub-templates are laid out in the first, second and third pages, and
   wherein, when it is determined that all the sub-templates are not laid out in the first, second and third pages, the process of deleting the third page by the deleting unit, the process of obtaining the second page by the second obtaining unit, the process of laying out the deleted sub-templates to the second page by the second layout unit, and the process of laying out the remaining sub-templates in the third page by the first layout unit are repeatedly executed to create one or more additional second pages until all the sub-templates are laid out.

2. The apparatus according to claim 1, wherein the setting unit sets a flow area over the first to third pages.

3. The apparatus according to claim 2, wherein the sub-templates are laid out in the flow area set by the setting unit.

4. An information processing method which is performed by an information processing apparatus, comprising:
   setting a repeated page setting to the second page;
   obtaining the first and third pages to which the repeated page setting is not set from the document;
   laying out a sub-template selected from a plurality of sub-templates in the first and third pages;
   determining whether all the sub-templates are laid out in the first and third pages;
   deleting the third page when all the sub-templates are not laid out in the first and third pages, wherein the sub-templates laid out in the third page are deleted by deleting the third page;
   obtaining the second page to which the repeated page setting is set;
   laying out the deleted sub-templates in the second page;
   determining whether all the sub-templates are laid out in the first and second pages,
   wherein, when it is determined that all the sub-templates are not laid out in the first and second pages, the remaining sub-templates which are not laid out in any page are laid out in the third page and it is determined whether all the sub-templates are laid out in the first, second and third pages, and
   wherein, when it is determined that all the sub-templates are not laid out in the first, second and third pages, the steps of deleting the third page, obtaining the second page, laying out the deleted sub-templates to the second page, and laying out the remaining sub-templates in the third page are repeatedly executed to create one or more additional second pages until all the sub-templates are laid out.

5. The method according to claim 4, wherein a flow area is set over the first to third pages.

6. The method according to claim 5, wherein the sub-templates are laid out in the flow area.

7. A non-transitory computer-readable medium storing a program therein for causing a computer to perform an information processing method, the method comprising:
   setting a repeated page setting to the second page;
   obtaining the first and third pages to which the repeated page setting is not set from the document;
   laying out a sub-template selected from a plurality of sub-templates in the first and third pages;
   determining whether all the sub-templates are laid out in the first and third pages;
   deleting the third page when all the sub-templates are not laid out in the first and third pages, wherein the sub-templates laid out in the third page are deleted by deleting the third page;
   obtaining the second page to which the repeated page setting is set;
   laying out the deleted sub-templates in the second page;
   determining whether all the sub-templates are laid out in the first and second pages,
   wherein, when it is determined that all the sub-templates are not laid out in the first and second pages, the remaining sub-templates which are not laid out in any page are laid out in the third page and it is determined whether all the sub-templates are laid out in the first, second and third pages, and wherein, when it is determined that all the sub-templates are not laid out in the first, second and third pages, the steps of deleting the third page, obtaining the second page, laying out the deleted sub-templates to the second page, and laying out the remaining sub-templates in the third page are repeatedly executed to create one or more additional second pages until all the sub-templates are laid out.

8. The non-transitory computer-readable medium according to claim 7, wherein a flow area is set over the first to third pages.

9. The non-transitory computer-readable medium according to claim 8, wherein the sub-templates are laid out in the flow area.

\* \* \* \* \*